US009703465B2

(12) United States Patent
Otsuka et al.

(10) Patent No.: US 9,703,465 B2
(45) Date of Patent: Jul. 11, 2017

(54) ELECTRONIC DEVICE

(71) Applicant: PANASONIC INTELLECTUAL PROPERTY CORPORATION OF AMERICA, Torrance, CA (US)

(72) Inventors: Yu Otsuka, Osaka (JP); Hiroshi Fujita, Osaka (JP); Kazuhiro Aihara, Osaka (JP); Goro Hisatake, Osaka (JP); Takashi Isobe, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 324 days.

(21) Appl. No.: 14/403,685

(22) PCT Filed: Dec. 27, 2013

(86) PCT No.: PCT/JP2013/007697
§ 371 (c)(1),
(2) Date: Nov. 25, 2014

(87) PCT Pub. No.: WO2015/049714
PCT Pub. Date: Apr. 9, 2015

(65) Prior Publication Data
US 2016/0266772 A1     Sep. 15, 2016

(30) Foreign Application Priority Data

Oct. 4, 2013  (JP) .................................. 2013-208718

(51) Int. Cl.
*G06F 1/16*     (2006.01)
*G06F 3/0481*   (2013.01)
(Continued)

(52) U.S. Cl.
CPC .......... *G06F 3/04845* (2013.01); *G04F 10/00* (2013.01); *G04G 21/00* (2013.01);
(Continued)

(58) Field of Classification Search
CPC .... G06F 3/048; G06F 3/0481; G06F 3/04817; G06F 3/0482; G06F 3/0488; G06F 1/163;
(Continued)

(56) References Cited

U.S. PATENT DOCUMENTS 7,665,032 B2 *  2/2010  Fisher ................... G06F 9/4443
                                                          715/779
9,104,301 B2   8/2015  Kim et al.
(Continued)

FOREIGN PATENT DOCUMENTS

CN     101527745     9/2009
CN     102004610     4/2011
(Continued)

OTHER PUBLICATIONS

China Office Action, issued by the State Intellectual Property Office (SIPO) on Dec. 30, 2015, in the corresponding Chinese Patent Application No. 201380028783.8 (together with a partial English language translation).
(Continued)

*Primary Examiner* — Ting Lee
(74) *Attorney, Agent, or Firm* — Greenblum & Bernstein, P.L.C.

(57) ABSTRACT

An electronic device that increases both visibility and selectability of executable programs. The electronic device includes a touch panel display having an elongated shape, a memory storing programs, and a processor controlling program execution and the display. The touch panel includes a first display region and a second display region contiguous with and narrower than the first display region. The display displays an execution image of a first program in the first display region and an icon image of a second program in the second display region in a smaller display area than the execution image. When the processor detects contact at the
(Continued)

icon image and detects that the contact moves towards the first display region, the processor causes the display to display an execution image of the second program in the first display region.

23 Claims, 49 Drawing Sheets

(51) Int. Cl.
| | |
|---|---|
| G06F 3/0482 | (2013.01) |
| G06F 3/0486 | (2013.01) |
| G06F 3/0485 | (2013.01) |
| G06F 3/0488 | (2013.01) |
| G06F 3/01 | (2006.01) |
| G04G 21/00 | (2010.01) |
| G04G 21/08 | (2010.01) |
| G04F 10/00 | (2006.01) |
| G06F 3/0484 | (2013.01) |
| G06F 3/041 | (2006.01) |

(52) U.S. Cl.
CPC ............ *G04G 21/08* (2013.01); *G06F 1/163* (2013.01); *G06F 3/011* (2013.01); *G06F 3/0416* (2013.01); *G06F 3/0482* (2013.01); *G06F 3/0485* (2013.01); *G06F 3/0488* (2013.01); *G06F 3/04817* (2013.01); *G06F 3/04883* (2013.01); *G06F 3/04886* (2013.01); *G06F 3/0486* (2013.01); *G06F 2200/1637* (2013.01); *G06F 2203/04803* (2013.01); *G06F 2203/04808* (2013.01)

(58) Field of Classification Search
CPC .... G06F 3/0486; G06F 3/04886; G06F 3/011; G06F 3/0416; G06F 3/0485; G06F 3/04845; G06F 3/04883; G06F 2203/04803; G06F 2203/04808; G06F 2200/1637; G04F 10/00; G04G 21/00; G04G 21/08
USPC ......................................................... 715/769
See application file for complete search history.

(56) References Cited

U.S. PATENT DOCUMENTS

| | | | | |
|---|---|---|---|---|
| 2005/0149879 | A1* | 7/2005 | Jobs ...................... | G06F 3/0481 715/796 |
| 2006/0010394 | A1* | 1/2006 | Chaudhri ............... | B60K 35/00 715/779 |
| 2006/0143574 | A1 | 6/2006 | Ito et al. | |
| 2008/0276200 | A1 | 11/2008 | Bamford et al. | |
| 2008/0318636 | A1 | 12/2008 | Kim | |
| 2009/0125833 | A1* | 5/2009 | Abernethy, Jr. ...... | G06F 9/4443 715/779 |
| 2009/0228820 | A1 | 9/2009 | Kim et al. | |
| 2009/0298546 | A1 | 12/2009 | Kim et al. | |
| 2010/0029327 | A1 | 2/2010 | Jee | |
| 2010/0313156 | A1* | 12/2010 | Louch ................... | G06F 3/0481 715/769 |
| 2011/0113363 | A1* | 5/2011 | Hunt ..................... | G06F 3/0481 715/800 |
| 2012/0013562 | A1 | 1/2012 | Jyonoshita et al. | |
| 2012/0139952 | A1 | 6/2012 | Imai et al. | |
| 2013/0050124 | A1 | 2/2013 | Helot | |
| 2014/0351748 | A1 | 11/2014 | Xia et al. | |
| 2015/0286358 | A1 | 10/2015 | Kim et al. | |

FOREIGN PATENT DOCUMENTS

| | | |
|---|---|---|
| CN | 102811881 | 12/2012 |
| CN | 103294402 | 9/2013 |
| CN | 103324435 A | 9/2013 |
| EP | 2 129 085 | 12/2009 |
| EP | 2 150 031 | 2/2010 |
| JP | 4915684 | 4/2002 |
| JP | 2006-185273 | 7/2006 |
| JP | 2007-080219 | 3/2007 |
| JP | 2009-217815 | 9/2009 |
| JP | 2010-231463 | 10/2010 |
| JP | 2010-231464 | 10/2010 |
| JP | 2012-119945 | 6/2012 |
| WO | 2010/028405 | 3/2010 |

OTHER PUBLICATIONS

Extended European Search Report, mailed Jun. 2, 2015, from the European Patent Office in European Patent Application No. 13884946.8.
Lyons et al., "Facet: A Multi-Segment Wrist Worn System", UIST '12 Proceedings of the 25th annual ACM symposium on User interface software and technology, Oct. 7-10, 2012, pp. 123-129.
Search report from PCT/JP2013/007697, mail date is Apr. 8, 2014.
Office Action, dated Oct. 11, 2016, from the European Patent Office (EPO) for European Patent Application No. 13884946.8.

* cited by examiner

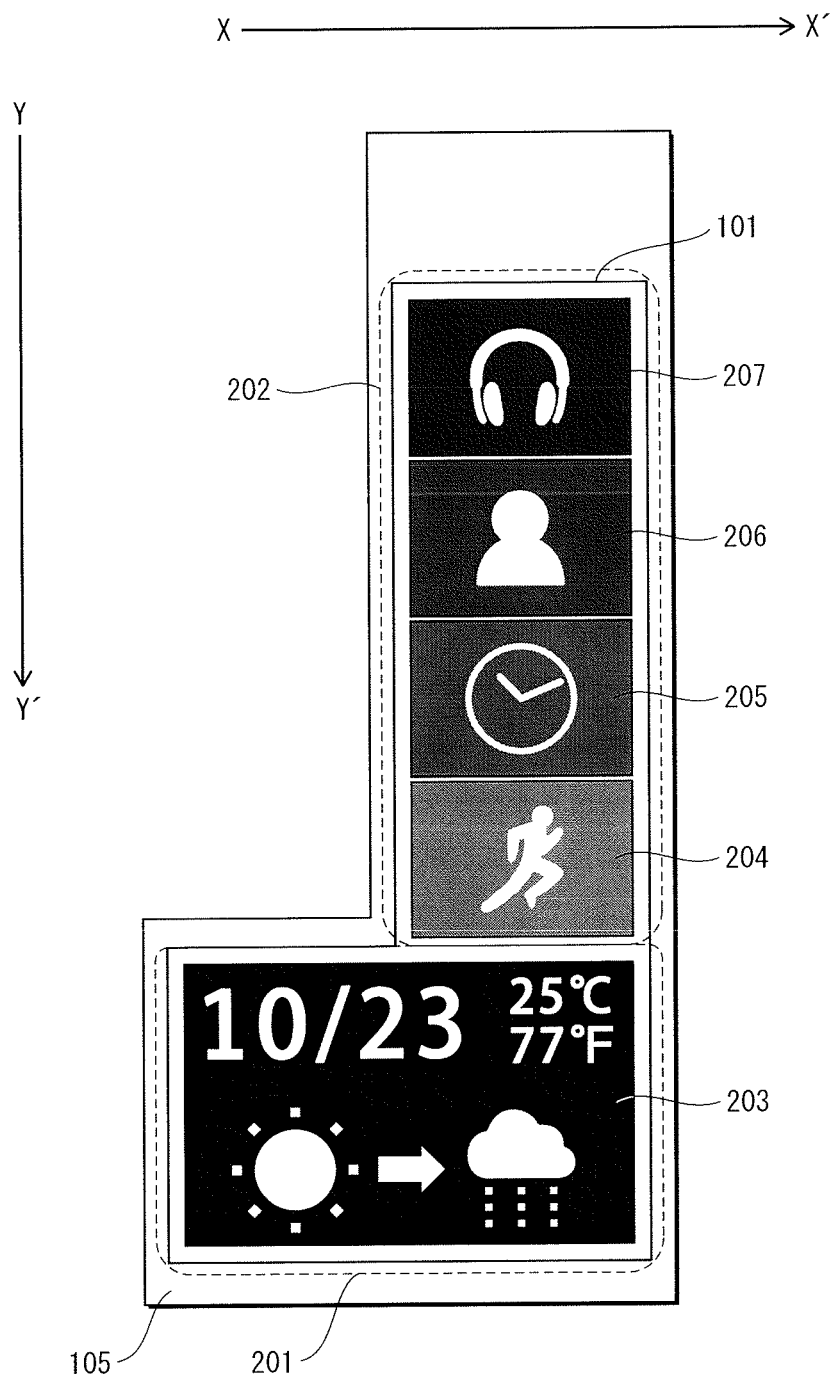

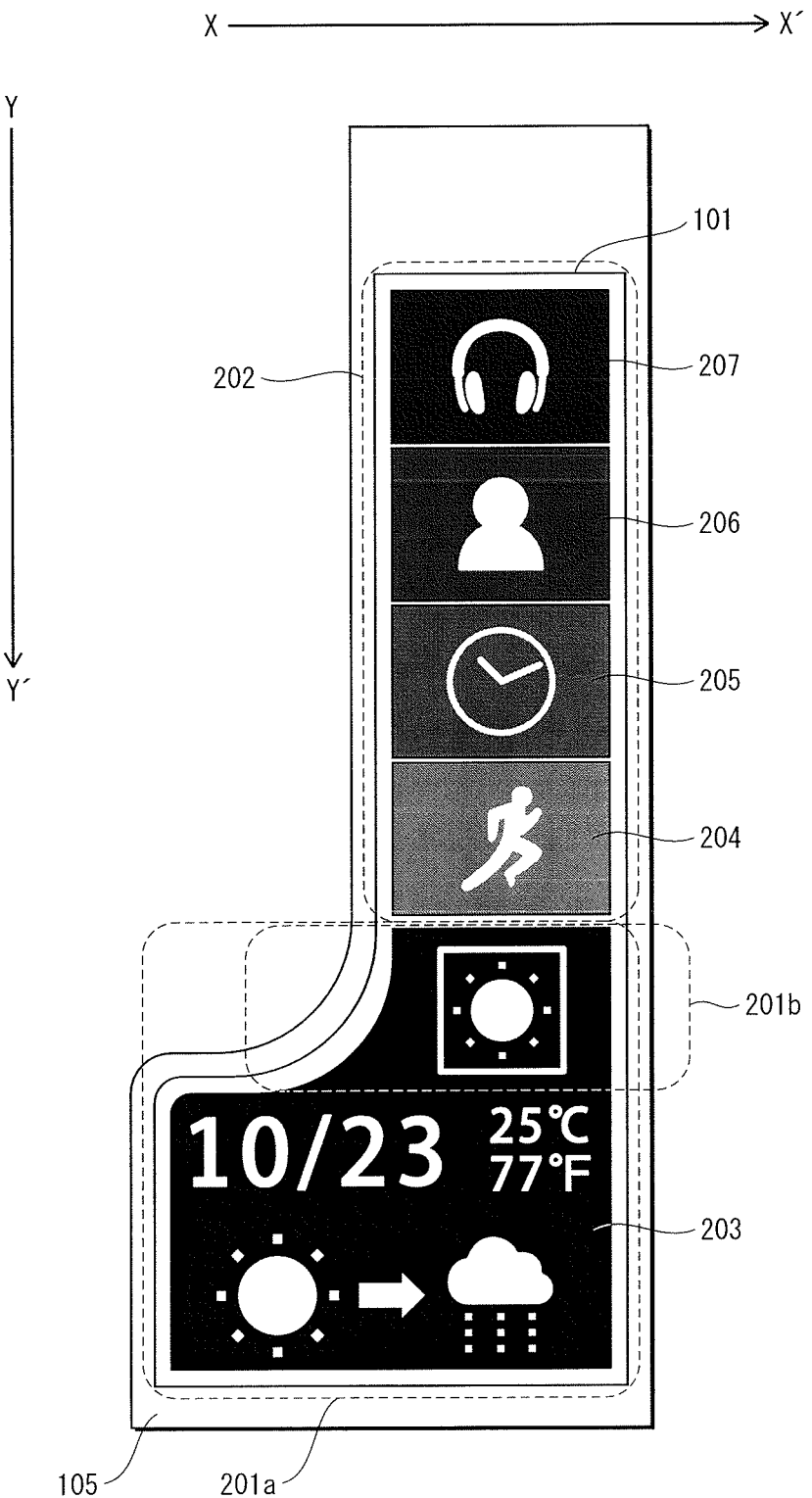

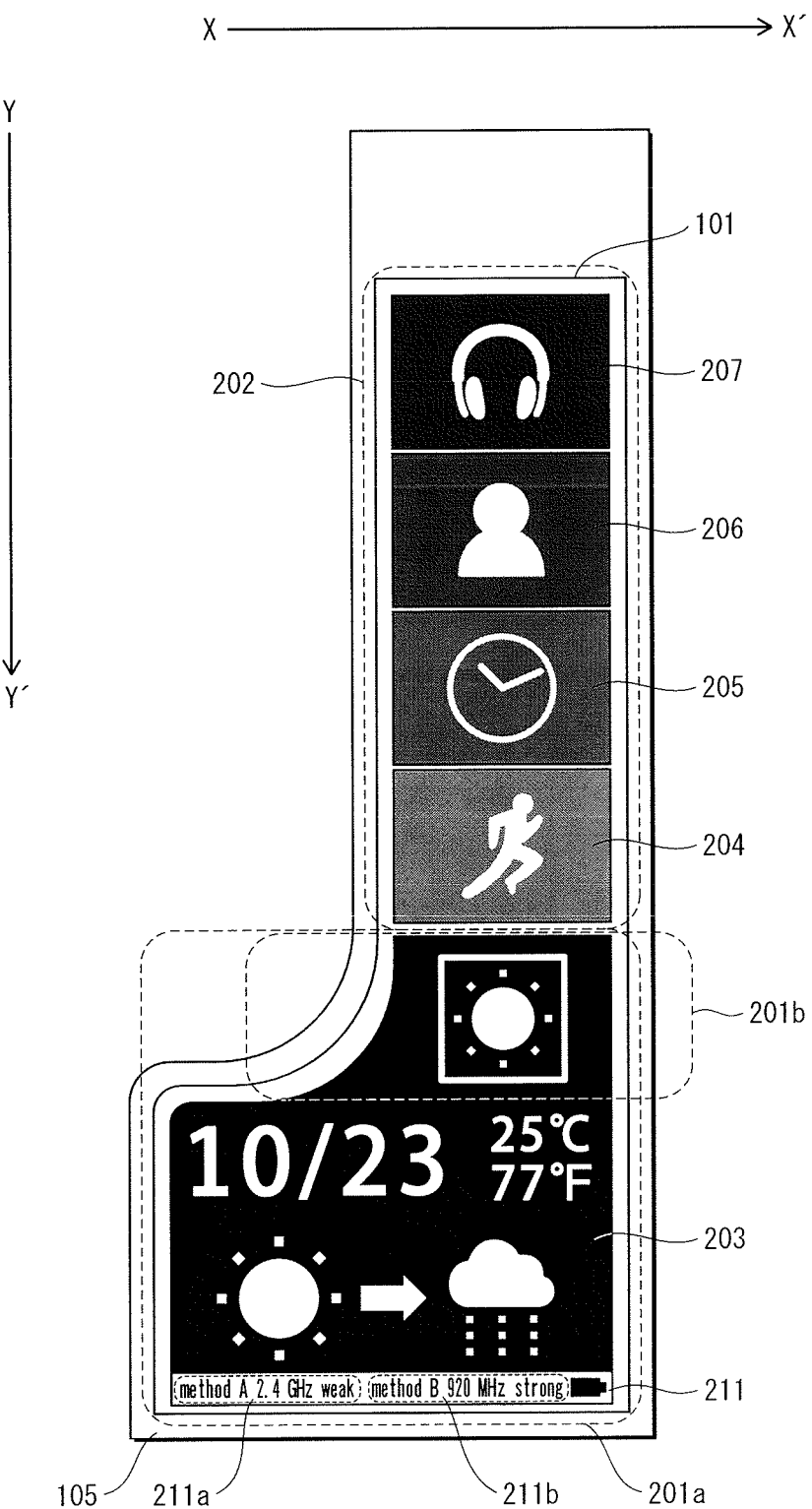

Arrangement table

| ID:A | ID:B | ID:C | ID:D | ID:E |
|------|------|------|------|------|
| P0   | P1   | P2   | P3   | P4   |

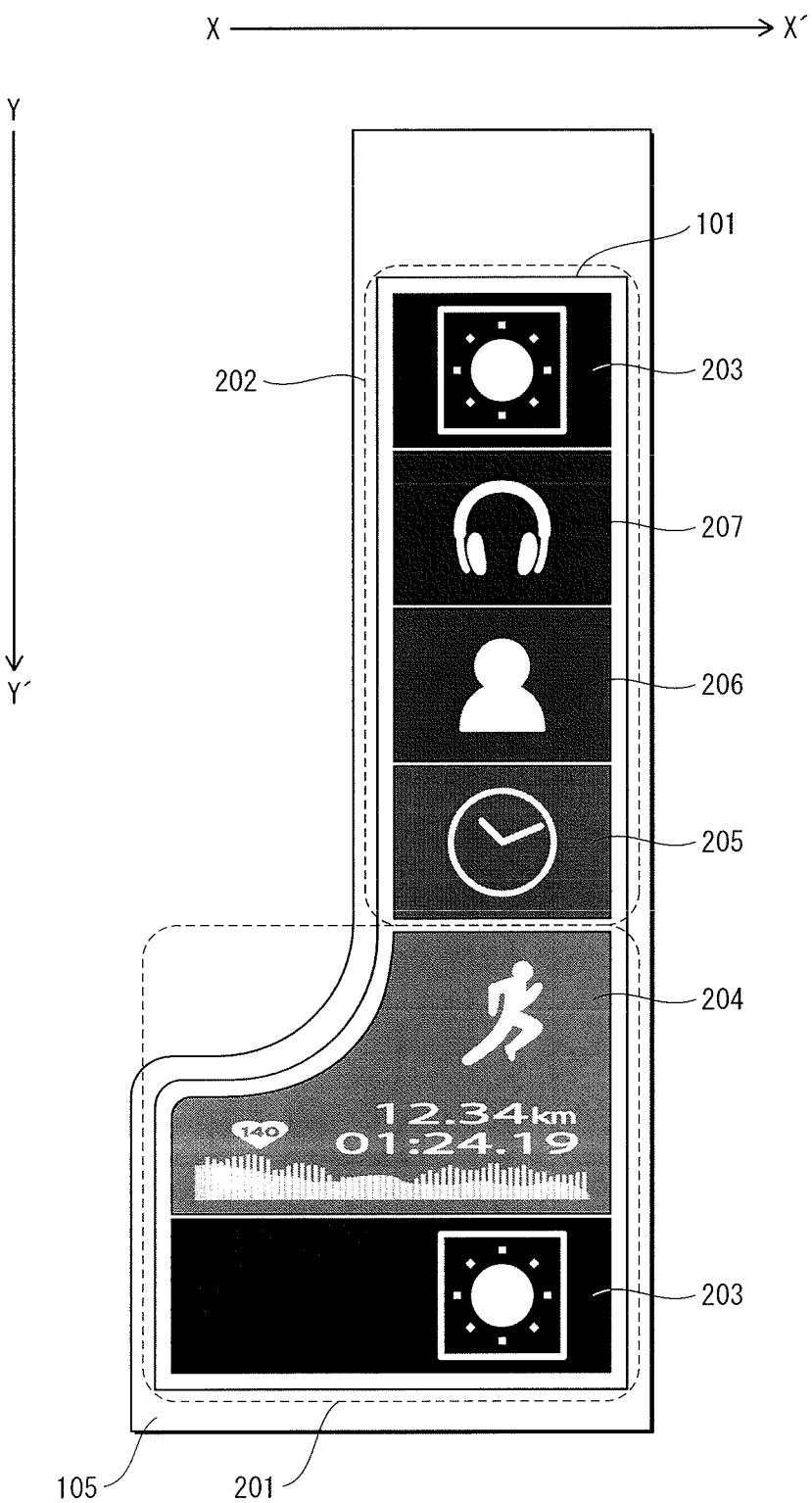

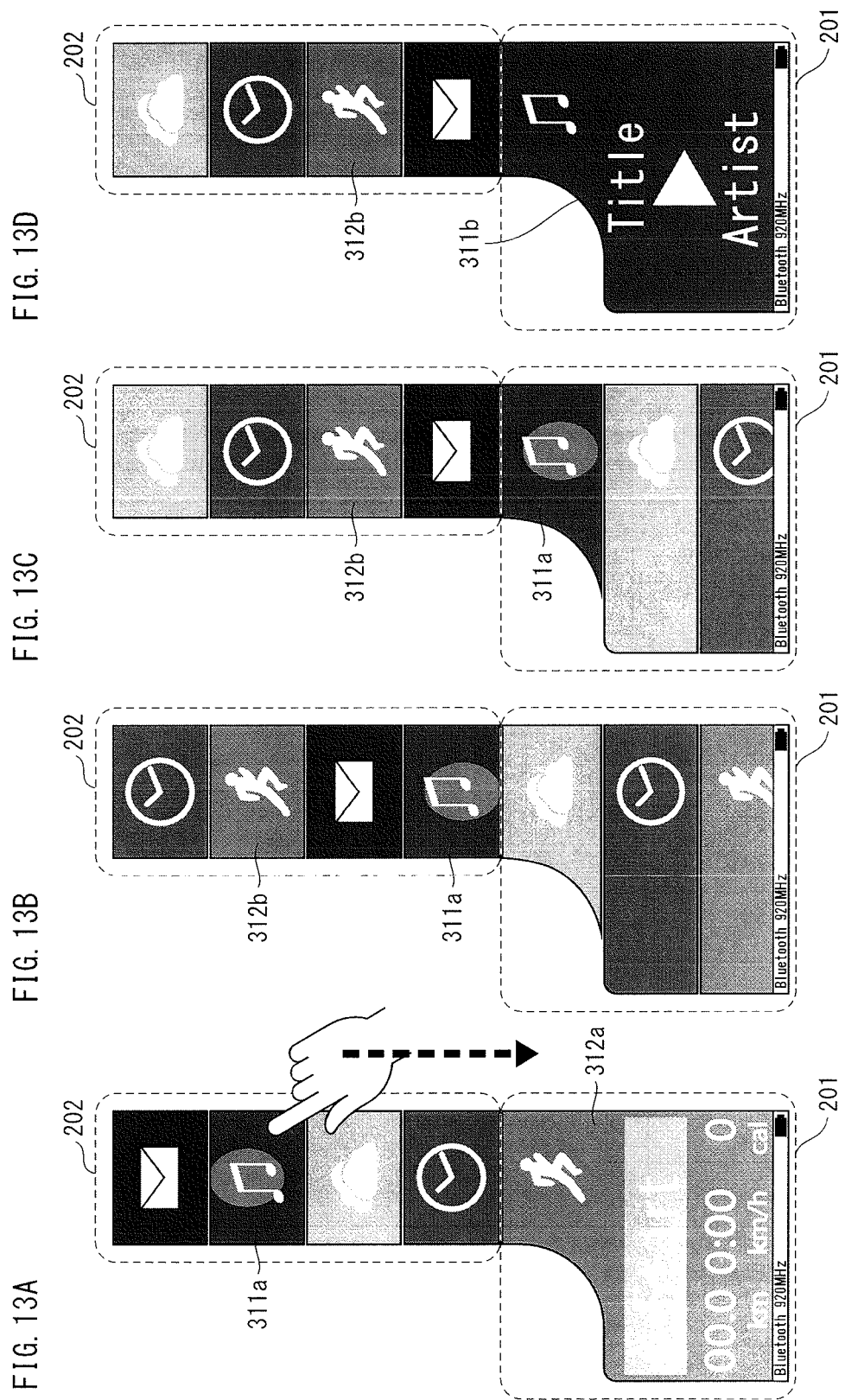

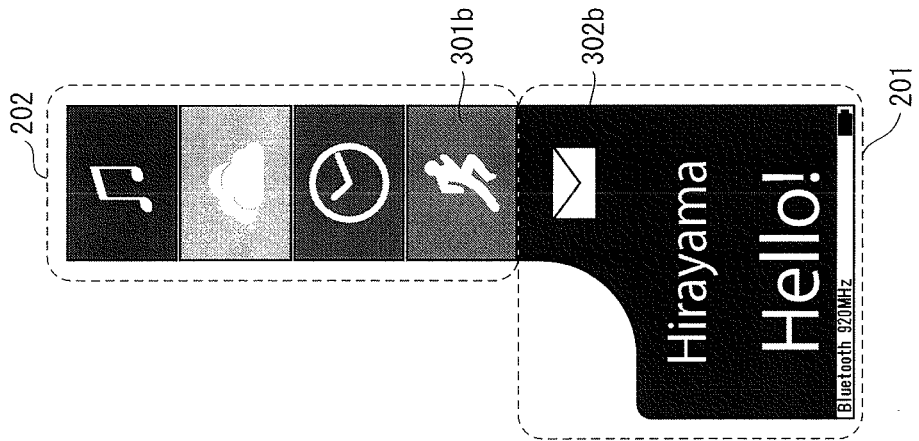
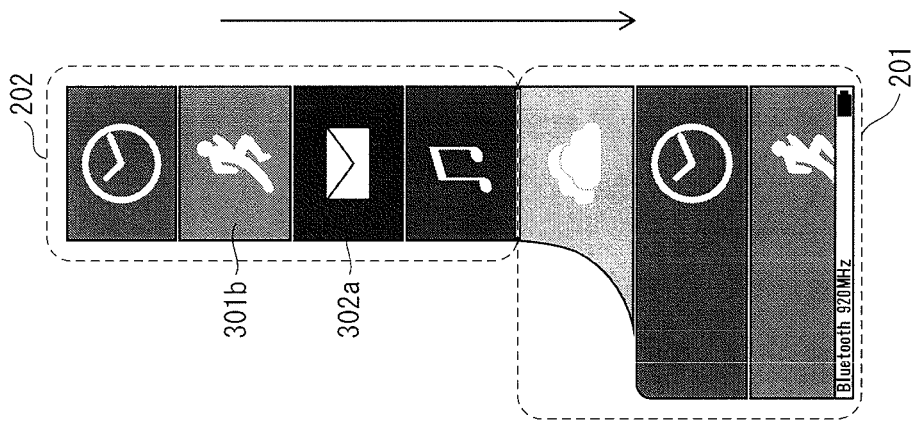
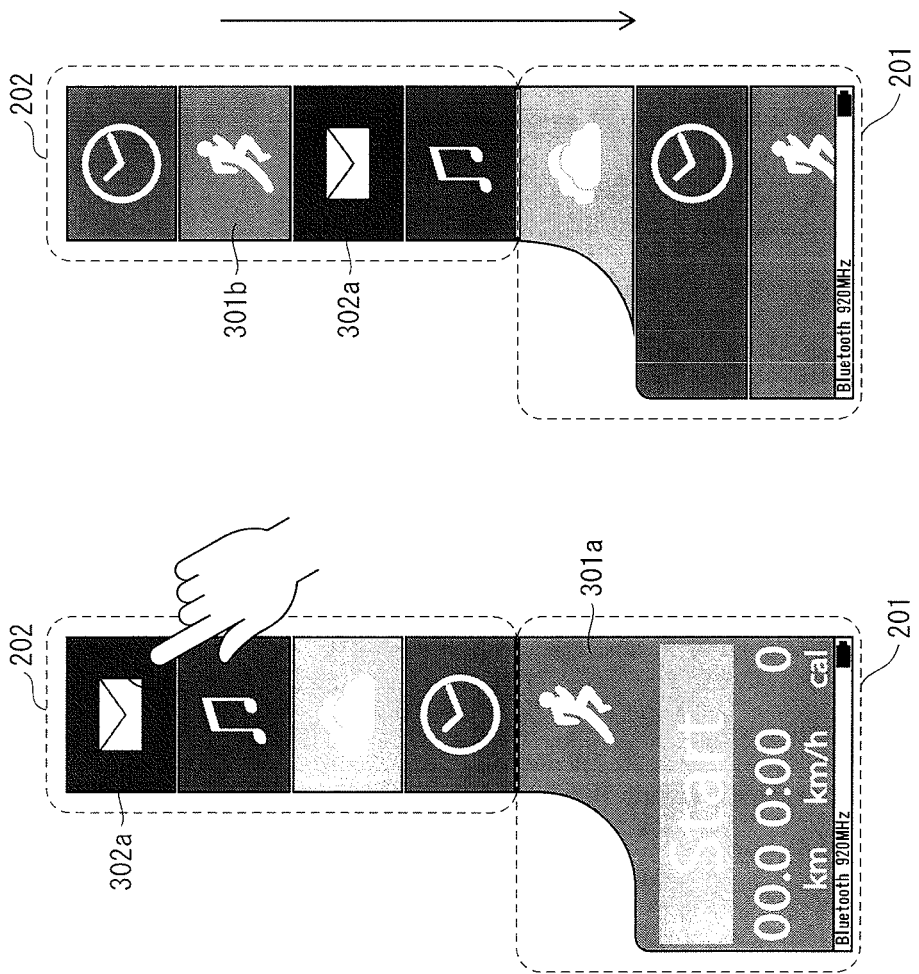

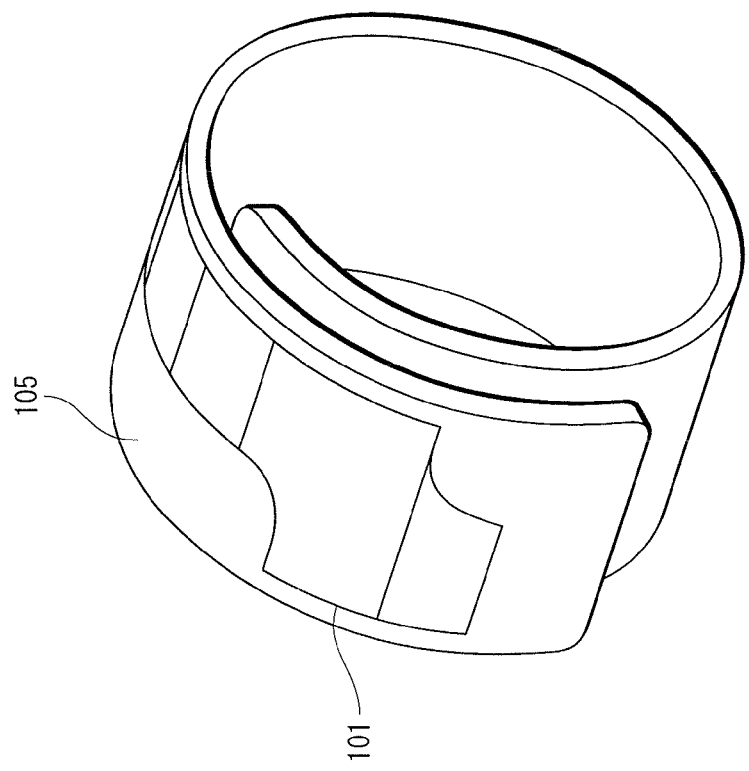
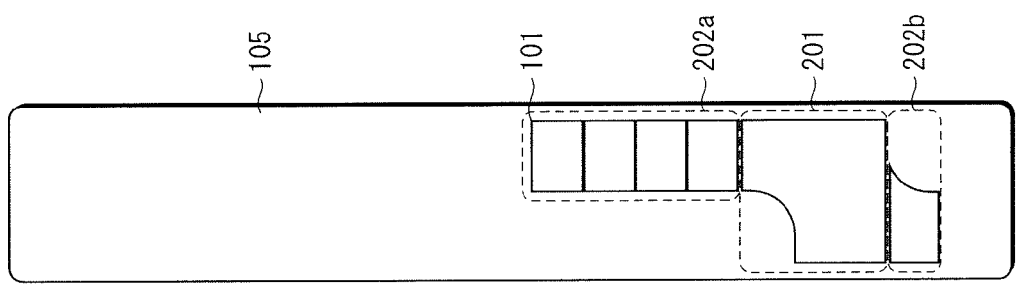

ELECTRONIC DEVICE

TECHNICAL FIELD

The present invention is related to electronic devices that have a display.

BACKGROUND ART

Among electronic devices that have a display there are electronic devices used as multimedia devices on which a variety of programs are installed. Using such an electronic device, a user may select a program that they wish to use quickly from among the variety of programs, and in order to display a selected program in a way that is easy for the user to use, a variety of graphical user interfaces have been made (for example, see Patent Literature 1).

FIG. 35A and FIG. 35B illustrate a graphical user interface of a conventional electronic device disclosed in Patent Literature 1. In FIG. 35A, due to a touch operation on a touch panel overlaid on a display screen, an icon 1710 corresponding to one program among a plurality of programs displayed within a region 120 is dragged to a wide region on the display screen, causing a program corresponding to the icon 1710 to be started up. As a result, as illustrated in FIG. 35B, an image 1720 is displayed on the display screen, showing that the application is being executed.

CITATION LIST

Patent Literature

[Patent Literature 1]
Japanese Patent Application Publication No. 2009-217815

SUMMARY OF INVENTION

Technical Problem

However, a display of an electronic device does not necessarily have a large screen area like a display of a television, smartphone, tablet terminal, etc. Thus, further improvements are needed for electronic devices having a limited display screen, for example.

In view of the above problem, the present disclosure provides an electronic device that increases both visibility and selectability of executable programs.

Solution to Problem

In order to achieve the above aim, an electronic device pertaining to an aspect of the present disclosure comprises: a display having a touch panel and an elongated shape, the display including a first display region and a second display region, the second display region being contiguous with the first display region in a longitudinal direction of the elongated shape and being narrower than the first display region in a lateral direction of the elongated shape; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, a display area of the first display image being larger than a display area of the first icon image, and when the processor detects a contact at the first icon image in the second display region and detects that the contact at the first icon image moves in a direction towards the first display region, the processor causes the display to display in the first display region a second display image generated by execution of the second program.

Advantageous Effects of Invention

According to the above aspect, a display surface of a display having a limited display region is effectively and fully utilized.

BRIEF DESCRIPTION OF DRAWINGS

FIG. 3A is a diagram illustrating, in plan view, a shape and display state of a display included in the electronic device pertaining to embodiment 1.

FIG. 3B is a diagram illustrating, in plan view, a shape and display state of a display included in an electronic device pertaining to modification 1 of embodiment 1.

FIG. 3D is a diagram illustrating, in plan view, a shape and display state of a display included in an electronic device pertaining to modification 3 of embodiment 1.

FIG. 8E is a diagram illustrating a change of display state of the display in response to a flick operation in the longitudinal direction.

FIGS. 13A, 13B, 13C, and 13D are diagrams illustrating changes in display state of the display in response to a drag operation in which a contact position moves from a second region 202 to a first region 201.

FIGS. 20A, 20B, and 20C are diagrams illustrating changes in display state of a modification causing scrolling of a display in response to a tap operation.

FIG. 25A is a plan view of the electronic device pertaining to modification 1 of a shape of a display, and FIG. 25B is an external view of the electronic device illustrated in FIG. 25A, in a state of deformation into a cylindrical shape.

Figure 1:
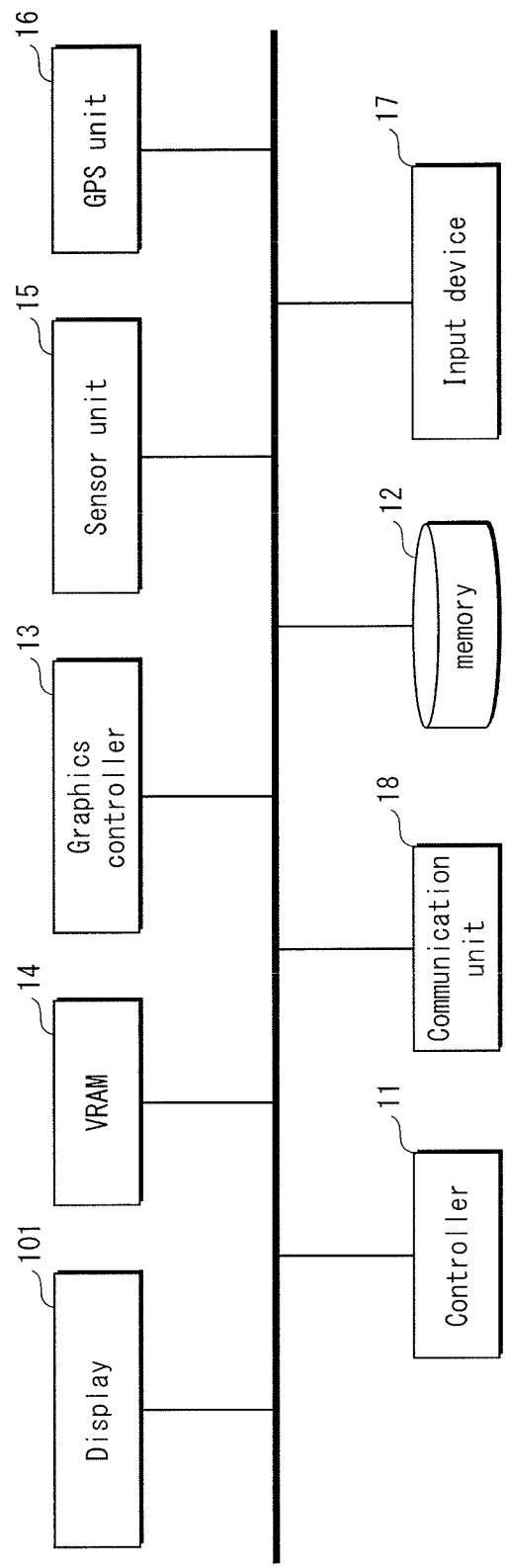
FIG. 1 is a diagram illustrating a hardware configuration of an electronic device pertaining to embodiment 1.

EMBODIMENTS (Circumstances that LED to Invention of One Aspect Pertaining to the Present Disclosure)

As described above, a display of an electronic device does not necessarily have a large display area such as in a television, smartphone, and tablet terminal. For example, electronic devices such as wristwatches have been proposed that have multiple functions provided by multiple programs, but a screen area of a display that can be provided for such an electronic device is limited. The conventional technology disclosed in Patent Literature 1 has an execution image showing that a program is being executed and a list of selectable programs accommodated on a single screen of a smartphone. However, when applied to a further truncated screen area of a display of an electronic device, display content of each program on the display tends to become small and hard to distinguish. Thus, visibility of the execution image of the program cannot be said to have been taken into account.

However, if, among multiple programs, a single program to be executed is allocated the display so that only the execution image of the single program is displayed, other selectable programs are not presented to the user, and therefore selectability of other programs cannot be said to have been maintained.

The above led the inventors to arrive at each aspect pertaining to the present disclosure.

In other words, an electronic device pertaining to an aspect of the present disclosure comprises: a display having a touch panel and an elongated shape, the display including a first display region and a second display region, the second display region being contiguous with the first display region in a longitudinal direction of the elongated shape and being narrower than the first display region in a lateral direction of the elongated shape; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, a display area of the first display image being larger than a display area of the first icon image, and when the processor detects a contact at the first icon image in the second display region and detects that the contact at the first icon image moves in a direction towards the first display region, the processor causes the display to display in the first display region a second display image generated by execution of the second program.

According to the present aspect, a display is used that has the elongated shape, including the first display region and the second display region that is contiguous with the first display region in the longitudinal direction of the elongated shape and narrower than the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be shown to a user of the electronic device.

Further, by detecting movement of contact at the first icon image towards the first display region, instead of simply causing display of the first icon image to move, the second display image generated by execution of the second program is displayed in the first display region, and therefore displaying operation buttons, etc., for executing the second program is not required. In other words, simply by causing contact at the first icon image to move towards the first display region, the second display image can be displayed in the first display region. As a result, a display surface of a display having a limited display region is effectively and fully utilized.

The following is a description of each aspect of the electronic device pertaining to the present disclosure, with reference to the drawings.

Embodiment 1

FIG. 1 is a diagram illustrating a hardware configuration of an electronic device pertaining to embodiment 1 of the present disclosure. The electronic device illustrated in FIG. 1 includes a display 101, a controller 11, a memory 12, a graphics controller 13, VRAM 14, a sensor unit 15, a GPS unit 16, an input device 17, and a communication unit 18.

The display 101 is an organic EL display. As illustrated in FIG. 3A, a display surface of the display 101 forms an elongated shape and includes a first region 201 and a second region 202 aligned in a longitudinal direction indicated by Y-Y'. A width of the display surface in an X-X' direction perpendicular to the longitudinal direction is different in the first region 201 and the second region 202. A width of the second region 202 is equal to or less than the narrowest portion of the first region 201.

Figure 2:
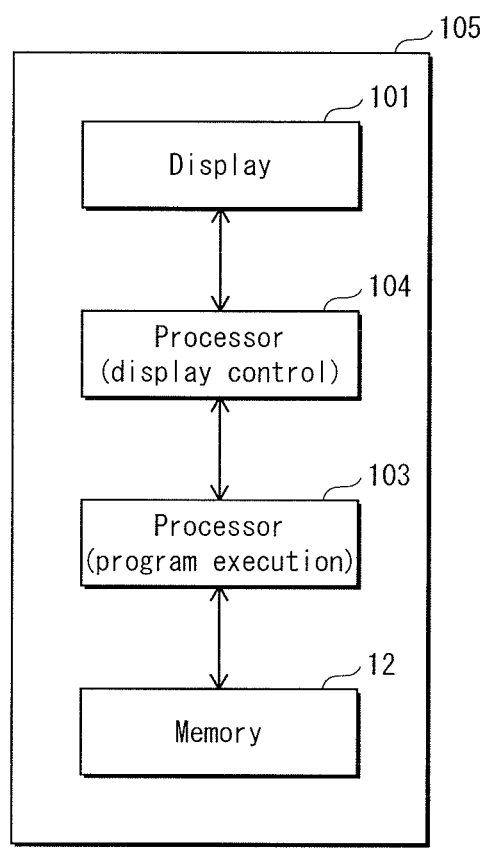
FIG. 2 is a diagram illustrating an example of the electronic device pertaining to embodiment 1 that includes a multiprocessor.

The controller 11 has RAM and a processor such as a CPU. By executing in the CPU a control program stored in the memory 12, the controller 11 implements functions controlling operations of the electronic device. Functions implemented by execution of a control program by the controller 11 include a control function related to executing an application program and a control function related to display on the display 101. The functions above may all be implemented by a single processor, or a plurality of processors may each implement a different function. FIG. 2 is a diagram illustrating a multiprocessor configuration in which a function of program execution controls and a function of display controls are each implemented by a different processor. Program execution controls implemented by the processor 103 include, for example, specifying one application program from a plurality of application programs as a main program, specifying the other application programs as sub-programs, executing the main program, and stopping sub-programs. Display controls implemented by the processor 104 include, for example, generating image data for display on the display 101 and writing the image data to the VRAM 14.

The memory 12 is a nonvolatile memory that stores control programs that are an OS of the electronic device, a plurality of application programs (hereafter, "programs"), and icon images that are managed by IDs that each correspond to one of the programs. In the present embodiment, five programs (programs A-E) managed by IDs A-E are stored in the memory 12.

The graphics controller 13 periodically reads image data written to the VRAM 14 by the controller 11, generates an image signal, and outputs the image signal to the display 101.

The VRAM 14 has a storage region to which the image date to be displayed on the display 101 can be written.

The sensor unit 15 includes a temperature sensor, pressure sensor, etc. Sensing data obtained via each sensor of the sensor unit 15, GPS data obtained via the GPS unit 16, and user operation data obtained via the input device 17 can be used in execution of the programs of the controller 11.

The communication unit 18 includes a first communication unit that performs 1-to-1 data transmission via a communication scheme (method A) for peer-to-peer mobile communication, and a second communication unit that performs 1-to-N data transmission via a communication scheme (method B) for specified low-power wireless communication. The method A corresponds to peer-to-peer communication between mobile terminal devices such as smartphones and iPhones, for example Bluetooth (registered trademark) communication. The method B is for 1-to-N communication between one information processing device and N wristband electronic devices. A communication control program of the electronic device, in response to an instruction from a program being executed, specifies one of the method A and the method B, and orders the communication unit to perform data transmission. Among programs indicated by program icons in the second region and executed by the electronic device, a program having a sports watch function is assumed to exist. When a time count is requested from a user, the program begins count processing, and subsequently, intermittently, transmits measurement data linked with an ID of the user to the information processing device and a mobile terminal. The information processing device and the mobile terminal receive the measurement data and sort the measurement data for each user. In this way, a score for each user can be managed.

When executing the above intermittent data transmission, the communication control program may also perform a status display to visualize data transmission being executed in a lower end of the first region. The status display includes an indicator of the method A and an indicator of the method B, and indicates whether communication being executed corresponds to one of the method A, the method B, and both the method A and the method B. The indicator includes a character string display that indicates a name of a communication method, a logo display, a battery level display, a signal strength display, and a use frequency display. A user can refer to the character string display, logo display, battery level display, signal strength display, and use frequency display from which the method A indicator and/or method B indicator is composed, and thereby understand what data transmission is being executed in the background.

The above describes a hardware configuration of the electronic device pertaining to embodiment 1. The following is a description of display states of the display 101.

FIG. 3A is a diagram in plan view illustrating an example of a shape and display state of the display 101 included in the electronic device pertaining to embodiment 1 of the present disclosure. In FIG. 3A, 105 is a casing that holds the display 101. In a first display region 201 of the display 101 (hereafter, "first region 201"), an image 203 is displayed that corresponds to a program A that is specified as the main program. In a second display region 202 (hereafter, "second region 202"), images 204-207 are lined up in the longitudinal direction of the display surface and displayed, corresponding to a plurality of programs B-E that are specified as sub-programs.

The image corresponding to the program A that is specified as the main program and displayed in the first region 201 is, for example, a visualization of information generated by execution of the program A, i.e., a display image generated by execution of the program A. Further, the images corresponding to the plurality of programs B-E that are specified as sub-programs and displayed in the second region 202 are, for example, icon images indicating information of the programs B-E, respectively.

Figures 4A, 4B:
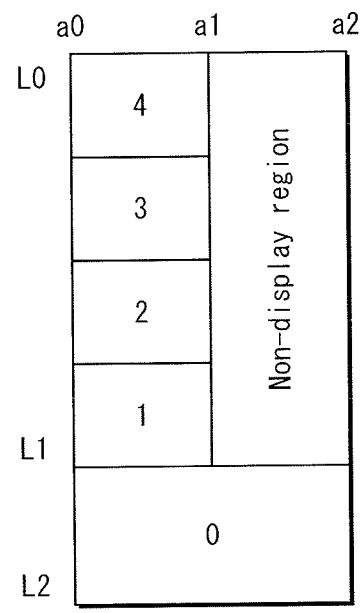
FIG. 4A is a schematic diagram illustrating a display region of a display 101 in association with a storage region of VRAM 14.
FIG. 4B is a diagram illustrating one example of an arrangement table linking each storage region of the VRAM 14 to a corresponding program ID.

In order to implement such display states, the VRAM 14 has, as illustrated in FIG. 4A, a storage region 0 where image data to be rendered in the first region 201 is stored, and storage regions 1, 2, 3, and 4 where image data to be rendered in the second region 202 is stored. The graphics controller 13 reads data stored at addresses from a0 to a1, on lines from L0 to L1, which make up the storage regions 1-4 of the VRAM 14, and generates from the data an image signal to display in the second region 202. The graphics controller 13 reads data stored at addresses from a0 to a2, on lines from L1+1 to L2, which make up the storage region 0, and generates from the data an image signal to display in the first region 201.

The plurality of the programs and each corresponding icon image are managed by common IDs, and the IDs are associated with storage regions of the VRAM 14 according to the arrangement table illustrated in FIG. 4B. Specifically, the arrangement table is stored in the memory 12, and five IDs of programs are registered at P0-P4, which correspond to the storage regions 0-4 of the VRAM 4. In the program execution control executed at the processor 103, a program to be specified as the main program is determined by acquiring from the arrangement table the ID registered at P0. Further, programs to be specified as sub-programs are determined by acquiring from the arrangement table the IDs registered at P1-P4.

In the example illustrated in FIG. 4B, in correspondence with the display state illustrated in FIG. 3A, the IDs A-E of programs are registered at P0-P4.

The following is a description of specific examples of the programs A-E in the present embodiment.

The program A that is managed by the ID A is a program related to a weather forecast. The image generated by executing the program A is, for example, an image showing weather forecast content using sensing data obtained by using a temperature sensor and an air pressure sensor. An icon image showing information of the program A is, for example, a symbol of a sun that is an abstracted representation of weather.

A program B is a program used in management of running distance, etc., by using the program B while jogging. An image generated by executing the program B is, for example, an image showing running time, running distance, etc., measured using GPS data. An icon image showing information of the program B is, for example, a symbol that is an abstracted representation of a running person.

A program C is a program related to time. An image generated by executing the program C is, for example, an image showing a current time. An icon image showing information of the program C is, for example, a symbol that is an abstracted representation of time.

A program D is a program used in management of personal information. An image generated by executing the program D is, for example, an image showing a personal facial photo and profile. An icon image showing information of the program D is, for example, a symbol that is an abstracted representation of a bust of a person.

A program E is a program related to music playback. An image generated by executing the program E is, for example, an image showing buttons for music operations such as playback, fast-forward, rewind, etc. An icon image showing information of the program E is, for example, a symbol that is an abstracted representation of headphones. Note that in the case of the program E, executing the program does not only display an image, but can also playback music and output audio. In such a case, the electronic device is provided with a speaker and/or provided with an earphone jack.

Aside from the examples of programs indicated above, the electronic device may be provided with a communication function and programs such as a program for communicating between external terminals and a program for performing communication via text data such as e-mail.

Figure 5:
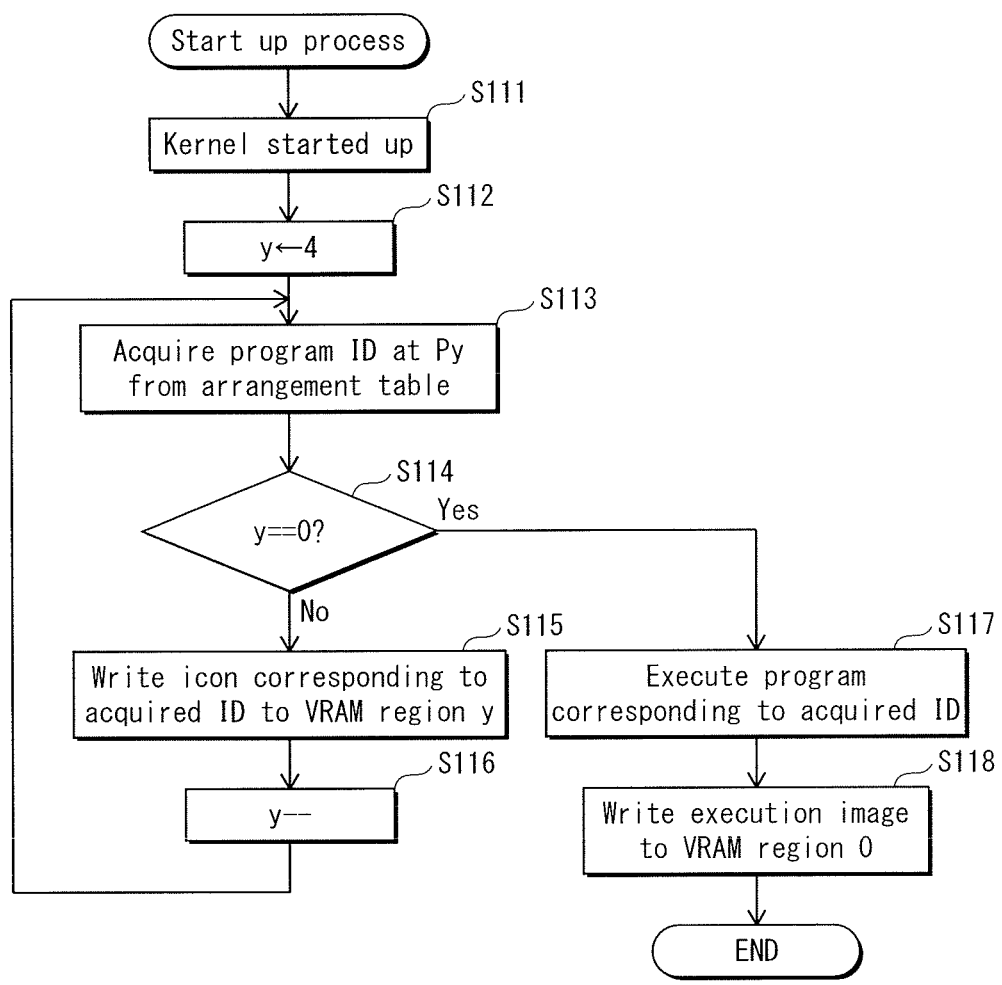
FIG. 5 is a flowchart illustrating a start up process of the electronic device pertaining to embodiment 1.

The following is a description, using FIG. 5, of how display of an image is included in a start-up process executed by the controller 11 when the electronic device is powered on.

In the start-up process, each processor of the controller 11 loads a control program from the memory 12, and a kernel of the control program is started up (step S111). According to control by the kernel that is started up, the processor 103 initializes a variable y that indicates a storage region number of the VRAM 14, setting y to four (step S112). Subsequently, according to control by the kernel, a loop process of steps S113-S166 is executed.

In the loop process, first, the processor 103 acquires an ID stored at Py, from the arrangement table registered in the memory 12 (step S113). When y has a value of 4-1, the process of step S113 causes a program managed by the ID so acquired to be specified as a sub-program by acquiring the ID registered at P4-P1 of the arrangement table. Further, when y has a value of 0, the process of step S113 causes a program managed by the ID so acquired to be specified as the main program by acquiring the ID registered at P0 of the arrangement table.

Subsequent to step S113, whether or not the variable y has a value of 0 is determined, i.e. whether or not a processing target is storage region 0, (step S114). If the variable y does not have a value of 0 ("No" at step S114), the processor 104 reads the icon image corresponding to the ID acquired at step S113 from the memory 12, and writes the icon image to the storage region y of the VRAM 14 (step S115). Subsequently, the variable y is decremented and processing returns to step S113.

If the variable y has a value of 0 in the determination at step S114 ("Yes" at step S114), the processor 103 executes the program corresponding to the ID acquired at step S113 (step S117), the processor 104 generates an image visualizing information generated by the execution of the program, and writes the generated image to the storage region 0 of the VRAM 14 (step S118). Start-up processing is completed by the above order, and the display of the display 101 is determined based on the image date stored by the VRAM 14.

Figure 6:
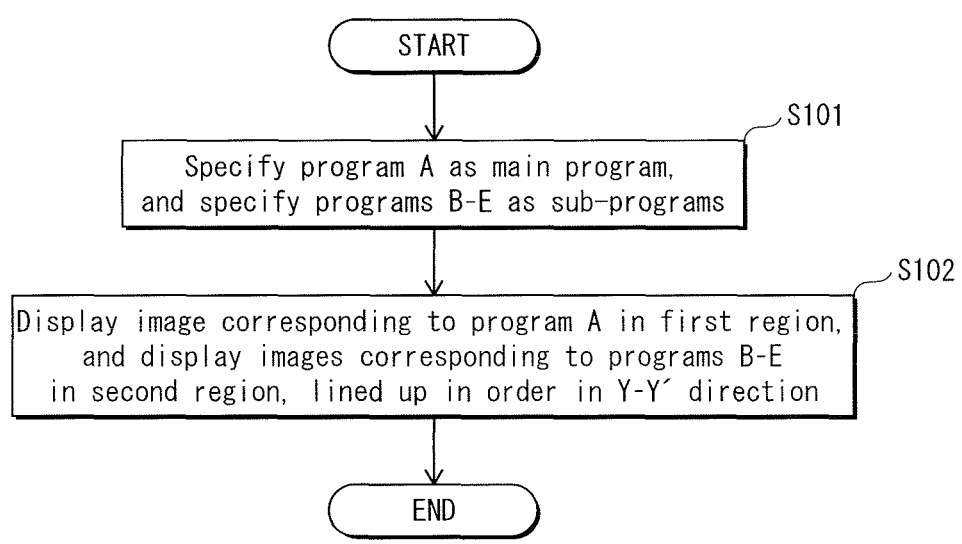
FIG. 6 is a flowchart illustrating display processing of the electronic device pertaining to embodiment 1.

Next is a description, using FIG. 6, of specific display processing by the electronic device pertaining to embodiment 1 of the present disclosure. FIG. 6 is a flowchart illustrating display processing of the electronic device pertaining to embodiment 1.

First, the processor 103, which controls execution of programs, reads the programs A-E stored in the memory 12, references the arrangement table, specifies the program A from among the programs A-E as the main program, and specifies the programs B-E as sub-programs (step S101).

Subsequent to specifying the main program and sub-programs, the processor 104, which controls display of the display, displays the image 203 that corresponds to the program A that is specified as the main program in the first region 201, and displays the images 204-207 that each correspond to a respective one of the programs B-E that are specified as sub-programs in the second region 202, lined up in the longitudinal direction (Y-Y' direction) (step S102). At this time, the images 204-207 are displayed in sequence from an end of the second region 202 nearest to the first region 201 towards the other end of the second region 202, so as to be in an order of the IDs registered at P1-P4 of the arrangement table. As a result, the display 101 shows a display illustrated in FIG. 3A.

Note that in the present embodiment, an example is given in which a program to be specified as the main program is set in advance in the arrangement table, and according to this setting the processor 103 specifies the program A as the main program. However, as a method of selecting the program A as the main program, a user may perform selection by operating the electronic device via the input device 17.

Further, in the present embodiment, an example is given in which the images corresponding to the programs B-E that are specified as sub-programs are displayed lined up in the longitudinal direction in the order E, D, C, B from Y towards Y' in the second region 202. However, an ordering of the images in the second region 202 is not necessarily an order set by the IDs in the arrangement table that is stored in advance in the electronic device. For example, the electronic device may be configured such that the ordering of the images in the second region 202 is random. The electronic device may also be configured such that a user sets any order by operating the electronic device. Alternatively, from the end of the second region 202 nearest to the first region 201 towards the other end of the second region 202, in a sequence of descending or ascending order of the IDs of corresponding programs, the processor 104 may line up and display the images corresponding to the programs B-E.

Further, an example is given in which the processes of step S101 and step S102 are each executed by a corresponding one of the processor 103 and the processor 104, but the electronic device is not limited in this way. The electronic device may be configured such that all processing is executed by a single processor. Further, at least one of the processes of step S101 and step S102 may use a plurality of processors, and the electronic device may be configured such that the processes of step S101 and step S102 are executed by three or more processors.

(Summary)

In the electronic device pertaining to embodiment 1 of the present disclosure as described above, in an atypical non-rectangular display having a wide first region and a narrow second region, visibility of the execution image of the main program is increased by causing the image generated by execution of the program specified as the main program to be displayed in the first region. Further, by displaying the icon images of the programs specified as sub-programs in the second region, sub-programs are made easy to understand and usability related to switching between the main program and sub-programs is increased.

Note that in FIG. 3A, four images 204-207 are displayed in the second region 202, corresponding to the programs B-E specified as sub-programs, but the number of images displayed in the second region 202 is not limited to four, and may be less than or greater than four. For example, the electronic device may be configured to display three icon images corresponding to three sub-programs lined up in the longitudinal direction in the second region. Alternatively, the electronic device may be configured to display five icon images corresponding to five sub-programs lined up in the longitudinal direction in the second region.

Further, in FIG. 3A, an example of the display 101 in which the first region 201 and the second region 202 each have a rectangular shape is illustrated, but the shape of the display is not necessarily limited to being rectangular. For example, at least one of the first region 201 and the second region 202 may have a polygonal shape having five or more sides whose vertices form an angle other than 90 degrees. Alternatively, the shape of the display may have at least one corner formed by a curved line rather than a right angle.

Further, in FIG. 3A, a right side of the first region 201 and the second region 202 are aligned along the same straight line and a left side of the first region 201 projects farther outward than an extension of the left side of the second region 202. However, the shape of the display is not limited in this way. For example, the shape of the display may be a mirror image of the shape illustrated in FIG. 3A. Alternatively, the shape of the display may be such that both the left side and the right side of the first region 201 project farther outward than both an extension of the left side and the right side of the second region 202, respectively.

(Modification)

Referring to FIG. 3B, the following is a description of a shape and display state of the display with respect to an electronic device pertaining to modification 1 of embodiment 1. FIG. 3B is a diagram illustrating, in plan view, an example of the shape and the display state of the display included in the electronic device pertaining to modification 1. In FIG. 3B, elements that are the same as those illustrated in FIG. 3A have the same symbols and are not described here. Only characterizing features that are different from FIG. 3A are described here.

In FIG. 3B, a characterizing feature is that the shape of the first region 201a is different from the shape of the first region 201 in FIG. 3A. In the first region 201a, an end of a portion 201b that connects to the second region 202 has a width that is the same as the width of the second region 202. In the longitudinal direction from Y towards Y', i.e. from the end of the portion 201b that connects to the second region 202 away from the second region 202, the width of the portion 201b gradually increases. In modification 1, viewing a display surface of the display 101 in plan view, a left side of the portion 201b that is a portion of the first region 201a is curved. By making the display 101 such a shape, the first region 201a and the second region 202 are connected smoothly.

Note that in FIG. 3B, the portion 201b that gradually increases in width has a shape such that one side widens outwards, but the other side may also widen outwards. Further, the left side of the portion 201b has a shape that widens outwards in a curve, but the left side is not limited in this way and may have a shape that widens outwards in a straight line.

The following is a description of the display state of the display in modification 1. As illustrated in FIG. 3B, in the display state of the display in modification 1, as an image 203a corresponding to the program A that is specified as the main program, not only an image generated by execution of the program A, but also an icon image managed by the same ID as the program A is displayed in the first region 201a. In the display state, the icon image is displayed in the portion 201b that gradually increases in width, and the image generated by the execution of the program A is displayed in a remaining portion of the first region 201a that has a constant width.

Figure 3C:
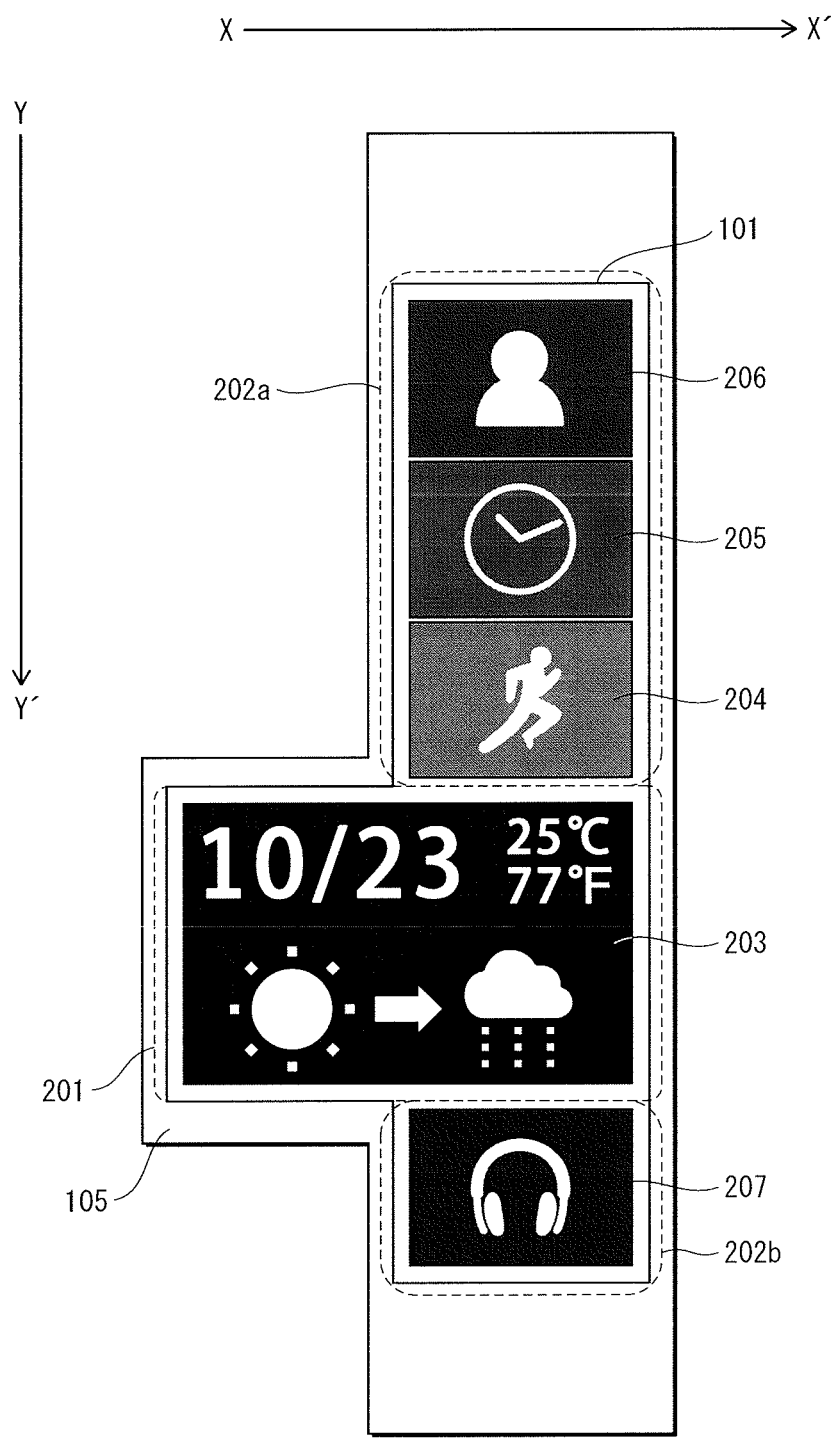
FIG. 3C is a diagram illustrating, in plan view, a shape and display state of a display included in an electronic device pertaining to modification 2 of embodiment 1.

Referring to FIG. 3C, the following is a description of a shape and display state of the display with respect to an electronic device pertaining to modification 2 of embodiment 1. FIG. 3C is a diagram illustrating, in plan view, an example of the shape and the display state of the display included in the electronic device pertaining to modification 2. In FIG. 3C, elements that are the same as those illustrated in FIG. 3A have the same symbols and are not described here. Only characterizing features that are different from FIG. 3A are described here.

In modification 2 illustrated in FIG. 3C, a characterizing feature is that a region showing images corresponding to programs specified as sub-programs is composed of two portions, a second region 202a and a second region 202b. In the longitudinal direction, lined up from Y and towards Y', the display 101 is composed of the second region 202a, the first region 201, and the second region 202b. In other words, the first region 201 is positioned between the second region 202a and the second region 202b. A width of the second region 202a and a width of the second region 202b are narrower than a width of the first region 201. The width of the second region 202a and the width of the second region 202b may be the same, or one may be wider than the other.

The following is a description of the display state of the display in modification 2. In the display state of the display in modification 2, icons corresponding to the programs specified as sub-programs are displayed divided up between the second region 202a and the second region 202b. In the example illustrated in FIG. 3C, images corresponding to the programs B-D that are specified as sub-programs are displayed in the second region 202a, and an image corresponding to the program E that is specified as a sub-program is displayed in the second region 202b.

Note that in FIG. 3C, an example is illustrated in which, among the four icons corresponding to the four programs that are specified as sub-programs, three are displayed in the second region 202a, and only one is displayed in the second region 202b. However, the number of icon images corresponding to sub-programs displayed in the second region 202b is not limited to one. Multiple icon images corresponding to programs specified as sub-programs may be displayed in the second region 202b. In such a case, the multiple icon images corresponding to programs specified as sub-programs displayed in the second region 202b are displayed lined up in the longitudinal direction of the display surface of the display 101 (in the Y-Y' direction).

Referring to FIG. 3D, the following is a description of a shape and display state of the display with respect to an electronic device pertaining to modification 3 of embodiment 1. FIG. 3D is a diagram illustrating, in plan view, an example of the shape and the display state of the display included in the electronic device pertaining to modification 3. In FIG. 3D, elements that are the same as those illustrated in FIG. 3B have the same symbols and are not described here. Only characterizing features that are different from FIG. 3B are described here.

In modification 3, illustrated in FIG. 3D, the shape of the display 101 is the same as in modification 1, illustrated in FIG. 3B, but the display state in the first region 201 is different from that of modification 1.

The difference between the display state of the display in modification 3 and the example illustrated in FIG. 3B is that a status display 211 is displayed at an end opposite the end of the first region 201 that connects to the second region 202.

The status display 211, when intermittent data transmission is being executed via the communication unit 18, is a region in which a status is displayed for visualizing data transmission being executed by the communication control program. The status display 211 includes an indicator 211a of the method A and an indicator 211b of the method B, and indicates whether communication being executed corresponds to one of the method A, the method B, and both the method A and the method B. The indicators include a character string display that indicates a name of a communication scheme, a logo display, a battery level display, a signal strength display, and a use frequency display.

Common features of the shape of the display in the examples illustrated in FIGS. 3B, 3C, and 3D as modifications 1-3, and in the example illustrated in FIG. 3A, are that (i) in plan view of the display surface, the first region and the second region are arranged and lined up in the longitudinal direction (the direction Y-Y'), and (ii) in the display surface, the width of the first region and the second region in a direction perpendicular (the direction X-X') to the longitudinal direction (the direction Y-Y'), are different; in particular, the width of the second region is less than or equal to the narrowest width of the first region.

Further, common features of the display state of the examples illustrated in FIGS. 3B, 3C, and 3D as modification 1-3, and in the example illustrated in FIG. 3A, are that (i) the image corresponding to the program specified as the main program is displayed in the first region, and (ii) the images corresponding to the programs other than the main program that are specified as sub-programs are displayed lined up in the longitudinal direction (the direction Y-Y') in the second region.

Figure 3E:
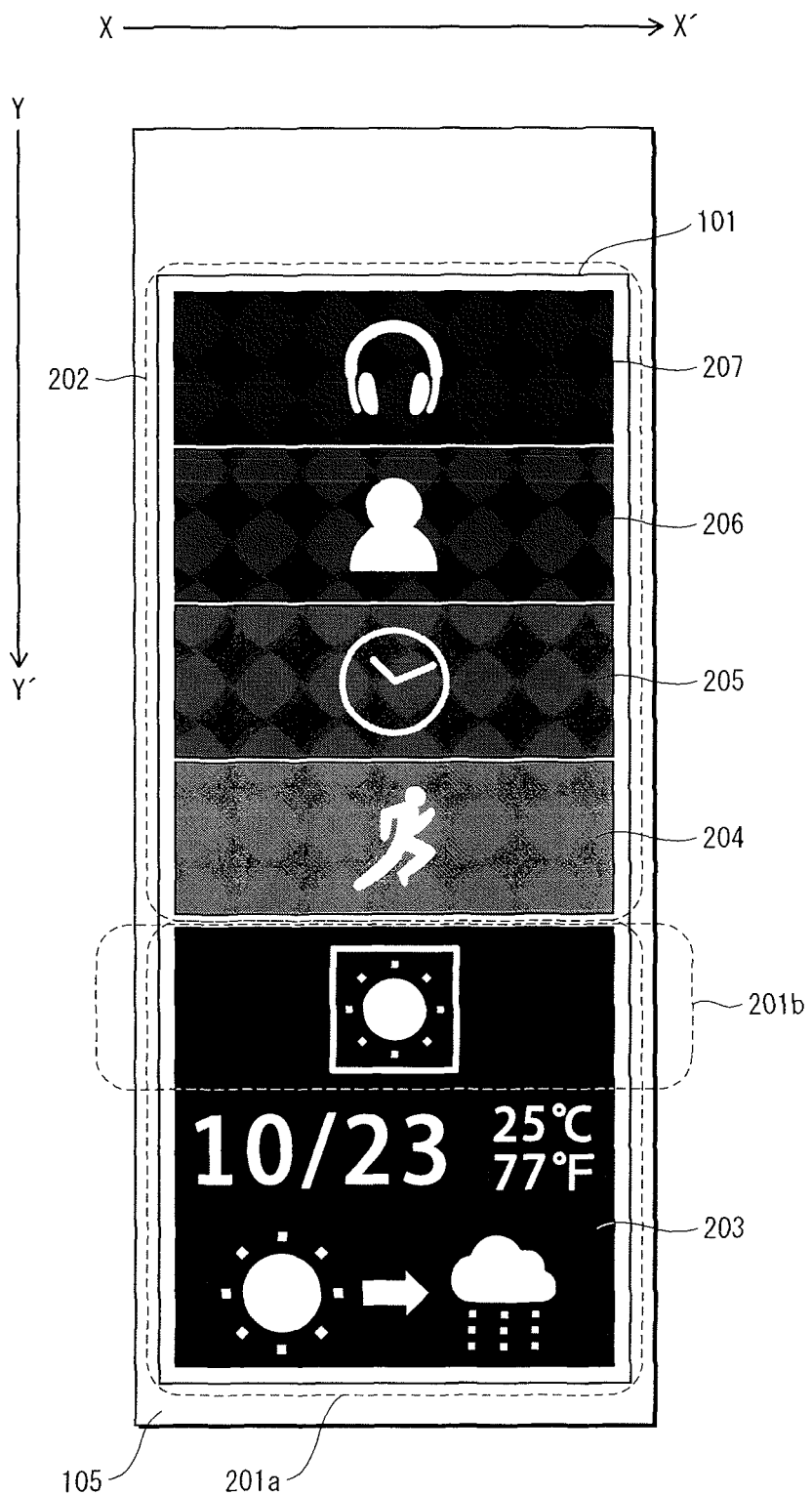
FIG. 3E is a diagram illustrating, in plan view, a shape and display state of a display included in an electronic device pertaining to modification 4 of embodiment 1.

Referring to FIG. 3E, the following is a description of a shape and display state of the display with respect to an electronic device pertaining to modification 4 of embodiment 1. FIG. 3E is a diagram illustrating, in plan view, an example of the shape and the display state of the display included in the electronic device pertaining to modification 4. In FIG. 3E, elements that are the same as those illustrated in FIG. 3B have the same symbols and are not described here. Only characterizing features that are different from FIG. 3B are described here.

Modification 4, illustrated in FIG. 3E, is characterized in that the first region 201 and the second region 202 have the same width in the X-X' direction perpendicular to the longitudinal direction of the display 101. The display state of the display in modification 4 is the same as the display state of the display in modification 2, illustrated in FIG. 3B.

Embodiment 2

Figure 7:
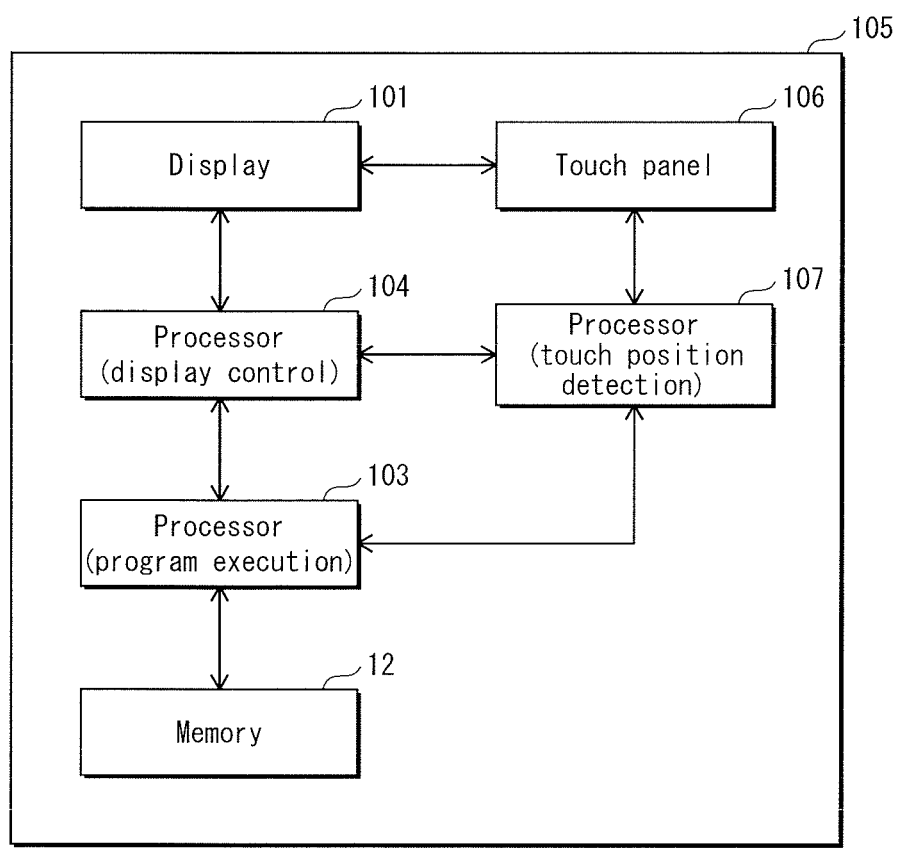
FIG. 7 is a diagram illustrating a configuration of an electronic device pertaining to embodiment 2.

The following is a description of embodiment 2, in which, by an operation of the electronic device, any sub-programs can be switched to being the main program. FIG. 7 is a diagram illustrating a configuration of an electronic device pertaining to embodiment 2. The configuration illustrated in FIG. 7, compared to the configuration illustrated in FIG. 2, has the additions of a touch panel 106 and a processor 107 held in the casing 105. In FIG. 7, elements that are the same as those illustrated in FIG. 2 have the same symbols and are not described here. Only characterizing features that are different from FIG. 2 are described here.

The touch panel 106 detects touch operations on the display surface of the display 101 made by an object such as a finger, a stylus, etc. As a method of detection of touch operations on the touch panel 106, a capacitive method, resistive method, surface acoustic wave method, etc., may be applied.

The processor 107, by execution of a control program and based on detection by the touch panel 106 of a touch operation, implements a function of detecting a touch position and changes thereto.

Further, as functions implemented by execution of a control program in the processor 103 and the processor 104, functions are added in addition to the functions described in embodiment 1.

An image movement control is added to display control functions of the processor 104, whereby the display is controlled such that, depending on detection of a touch operation by the touch panel 106, any of the icon images displayed in the second region 202 can be moved to the first region 201. Movement of an image due to the image movement control is implemented by moving image data stored by the VRAM 14 within the storage regions of the VRAM 14. For example, to move an image so as to scroll the image in one of the longitudinal direction and the width direction, processing is repeated that shifts the image data stored in the VRAM 14 one line at a time or multiple lines at a time in a scroll direction.

In the program execution control implemented in the processor 103, a function is added as a main program switching process, of switching the main program by specifying a new main program from among programs for which an icon is displayed in the second region 202, according to detection of a touch operation by the touch panel 106. In the main program switching process, by specifying a program corresponding to an image that is moved to the first region in the image movement control as the new main program, the display after the image movement control is performed and the new main program after the switching are made to correspond with each other.

Many examples are possible for specific touch operations and display changes of the display 101 for switching the main program. The following is a description of operations "flick", "drag", "tap", "long tap", and "double-tap" as specific examples of touch operations.

Note that "flick" is an operation to quickly move an object on the screen surface, "drag" is an operation to move an object while pushing the object on the screen surface, and "tap" is an operation to lightly hit an object on the screen surface. "Long tap" is an operation in which an object on the screen surface contacts the screen surface for a period of time greater than a predefined threshold. "Double-tap" is an operation in which an object is quickly tapped twice on the screen surface.

(1) Flick Operation 1

The following is a description, using FIGS. 8A-10, of states of main program switching and display changes of the display 101 due to a flick operation, which is one type of touch operation.

FIGS. 8A-8G illustrate, in plan view of the display, transitions and display changes of the display due to a flick operation until switching of the main program is complete. The basic configuration is the same as in FIG. 3B, and description of each symbol is omitted here.

Figure 9:
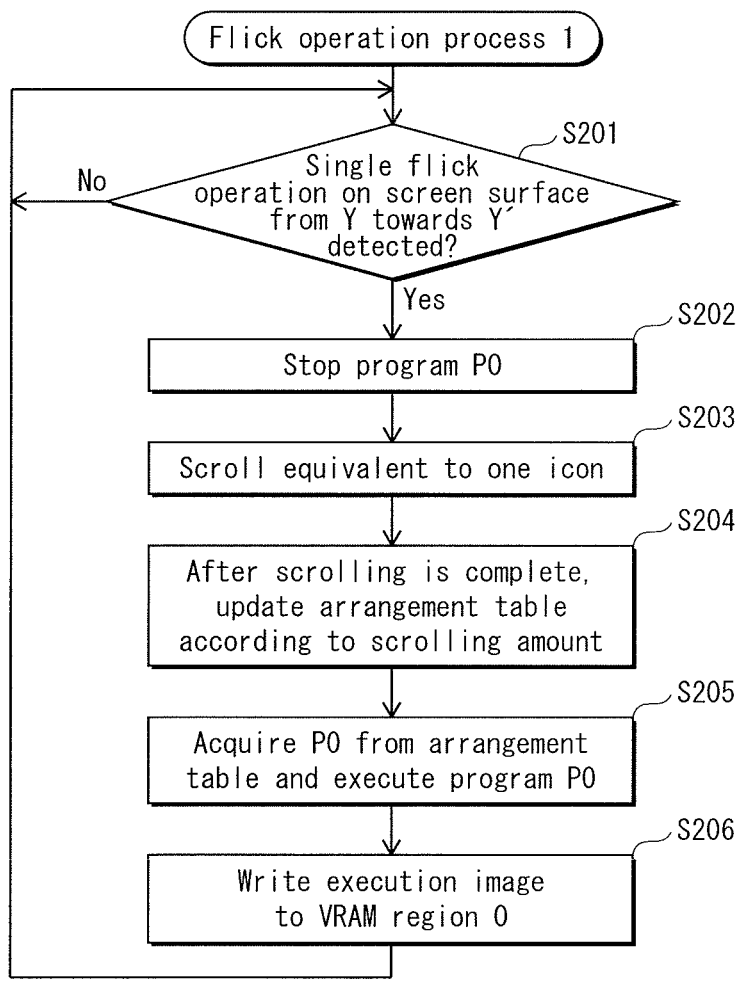
FIG. 9 is a flowchart illustrating processing when a flick operation in the longitudinal direction is detected.

FIG. 9 is a flowchart illustrating processing due to a flick operation. The following is a description, using the flowchart illustrated in FIG. 9, of processing due to a flick operation.

First, in an initial state, due to the processing described in embodiment 1, the image 203 corresponding to the program A that is specified as the main program is displayed in the first region 201 of the display 101, and the images 204-207 corresponding to the programs B-E that are specified as sub-programs are displayed lined up in the longitudinal direction in the second region 202 of the display 101.

Figure 8A:
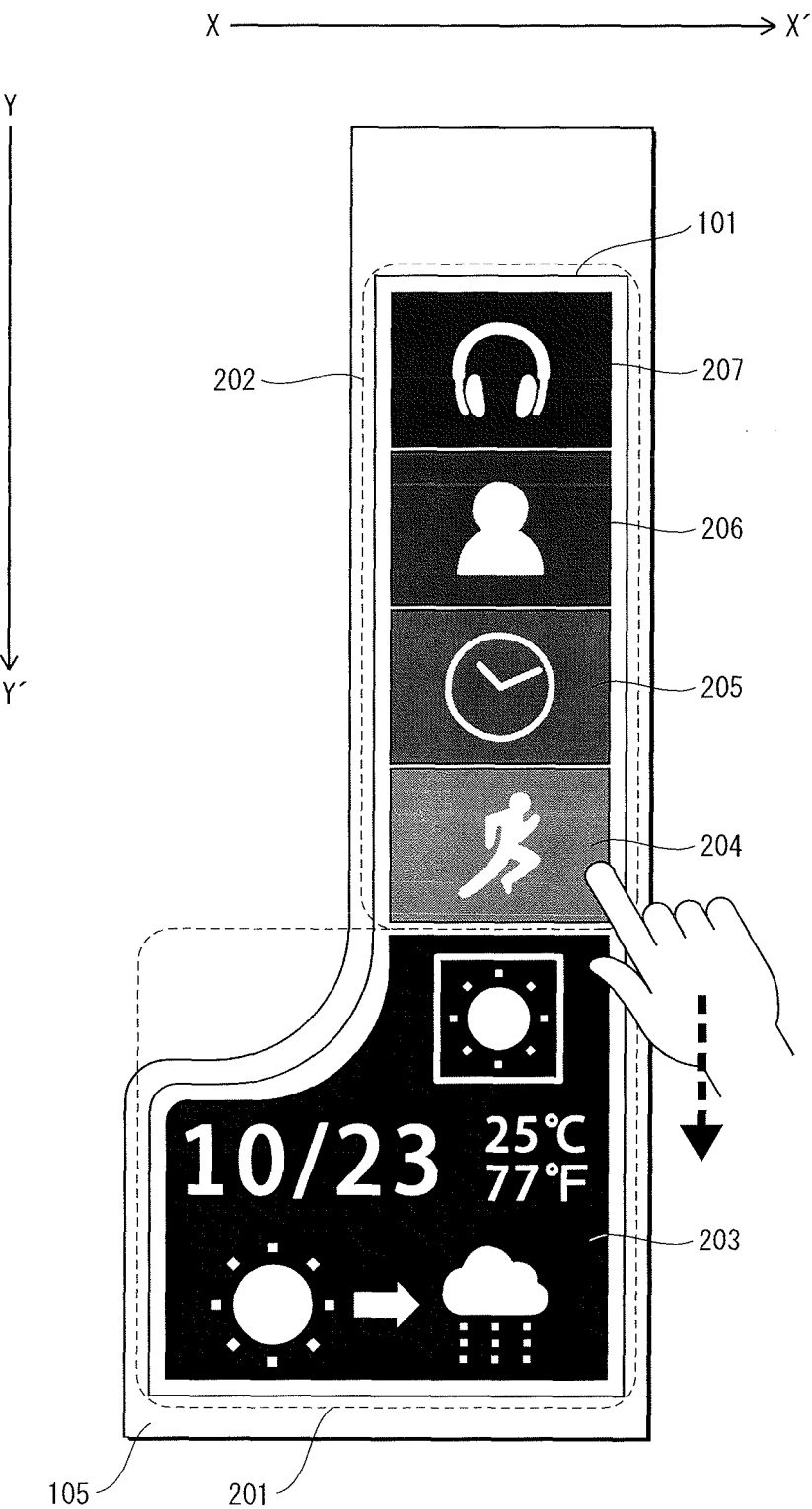
FIG. 8A is a diagram illustrating a change of display state of a display in response to a flick operation in a longitudinal direction.

Here, as illustrated in FIG. 8A, a user contacts the screen surface of the display 101, i.e. the touch panel 106, with a finger, and upon performing a single flick operation in the longitudinal direction from Y towards Y', in the direction indicated by the dashed arrow, the touch panel 106 detects the flick operation ("Yes" at step S201). Note that in order to distinguish the flick operation described here from a tap operation, etc.; a flick operation may be detected as such only when a contact position changes at a speed greater than or equal to a certain amount. Based on the touch detection result of the touch panel 106, the processor 107 calculates a touch position, a speed of movement of the touch position, etc., and notifies the processor 103 and the processor 104 of the results of the calculation.

Upon receiving notification of detection of a flick operation, the processor 103 stops execution of the program A, which is the main program and has an ID registered at P0 in the arrangement table (step S202). The processor 104 performs image movement control so as to scroll the images 203-207 corresponding to the programs A-E from Y towards Y' on the display of the display 101 (step S203).

In the image movement control, a scrolling amount is determined such that the icon image 204 corresponding to the program B, which is displayed at a position closest to the first region 201 in the second region 202 prior to scrolling beginning, is moved to the first region 201 after the scrolling ends. Due to the scrolling, the image 203 corresponding to the program A, which is displayed in the first region 201 prior to the scrolling beginning, is moved towards the bottom of the display 101, and is drawn disappearing from a bottom end of the display 101. Further, the images 205-207 corresponding to the programs C-E that are specified as sub-programs each move in the second region 202 a distance of one icon image in the direction from Y towards Y'. Further, an icon image of the program A, which was specified as the main program, is drawn so as to appear from a top end of the second region.

When the scrolling due to the image movement control of the scrolling amount equal to a distance of one icon image ends, the processor 103 updates the arrangement table illustrated in FIG. 4B by shifting the IDs registered therein one item to the left (step S204). Note that the ID registered at P0, which is at a left end of the arrangement table, is moved to a right end at P4.

Note that a method may be used by which the ID of each icon image written to each storage region of the VRAM 14 is acquired to update the arrangement table. Such a method involves the processor 104 notifying the processor 103 of the ID of each icon image written to each storage region of the VRAM 14 after the scrolling has ended, enabling updating of the arrangement table by the processor 103.

After updating the arrangement table, the processor 103 acquires the ID registered at P0 and executes the program corresponding to the acquired ID (step S205). The processor 104 generates image data for an image visualizing information generated by the execution of the program, and writes the generated image data to the VRAM 14 (step S206).

According to the processing order described above with reference to FIG. 9, in response to a single flick operation in the longitudinal direction (Y-Y' direction) detected by the touch panel 106, the image 204, which was positioned closest to the first region among the images 204-207 displayed in the region 202 prior to the flick operation, is moved to the first region 201, and the program B that corresponds to the image 204 is specified as the new main program.

FIGS. 8B-8F illustrate, in order, the transition of the display of the display 101 due to the execution of the processing order described above.

Figure 8B:
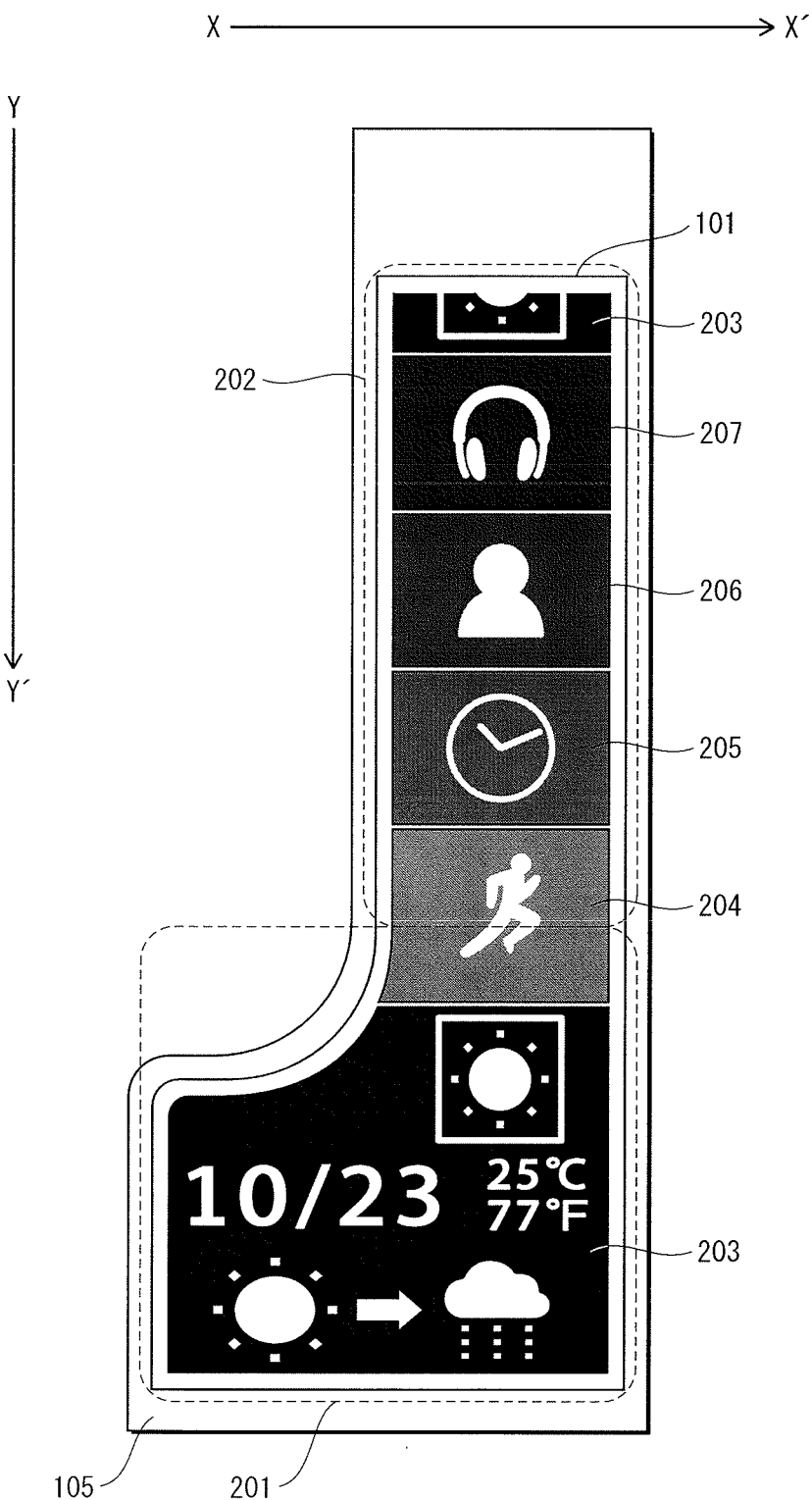
FIG. 8B is a diagram illustrating a change of display state of the display in response to a flick operation in the longitudinal direction.

In the state illustrated in FIG. 8B, the image 204 corresponding to the program B, positioned in the second region 202 prior to the scrolling starting, has scrolled from Y towards Y', such that a portion of the image 204 has moved into the first region 201. In this state, the portion of the image positioned in the first region 201 has increased in width in a lateral direction (X-X' direction), along with an increase in width of the first region 201 beyond the width of the second region 202 in the lateral direction (X-X' direction). Further, the image 203 corresponding to the program A that was positioned in the entire first region 201 prior to the scrolling has also scrolled in the direction from Y towards Y'. A portion of the image 203 displayed in the region 201 that shows the icon image has moved from Y towards Y'. A portion of the image 203 that shows the image generated by execution of the program A has shrunk in the longitudinal direction (Y-Y' direction) along with the scrolling of the icon image. On the other hand, an icon image is drawn as if appearing from the top end of the second region 202, as the image 203 corresponding to the program A.

Figure 8C:
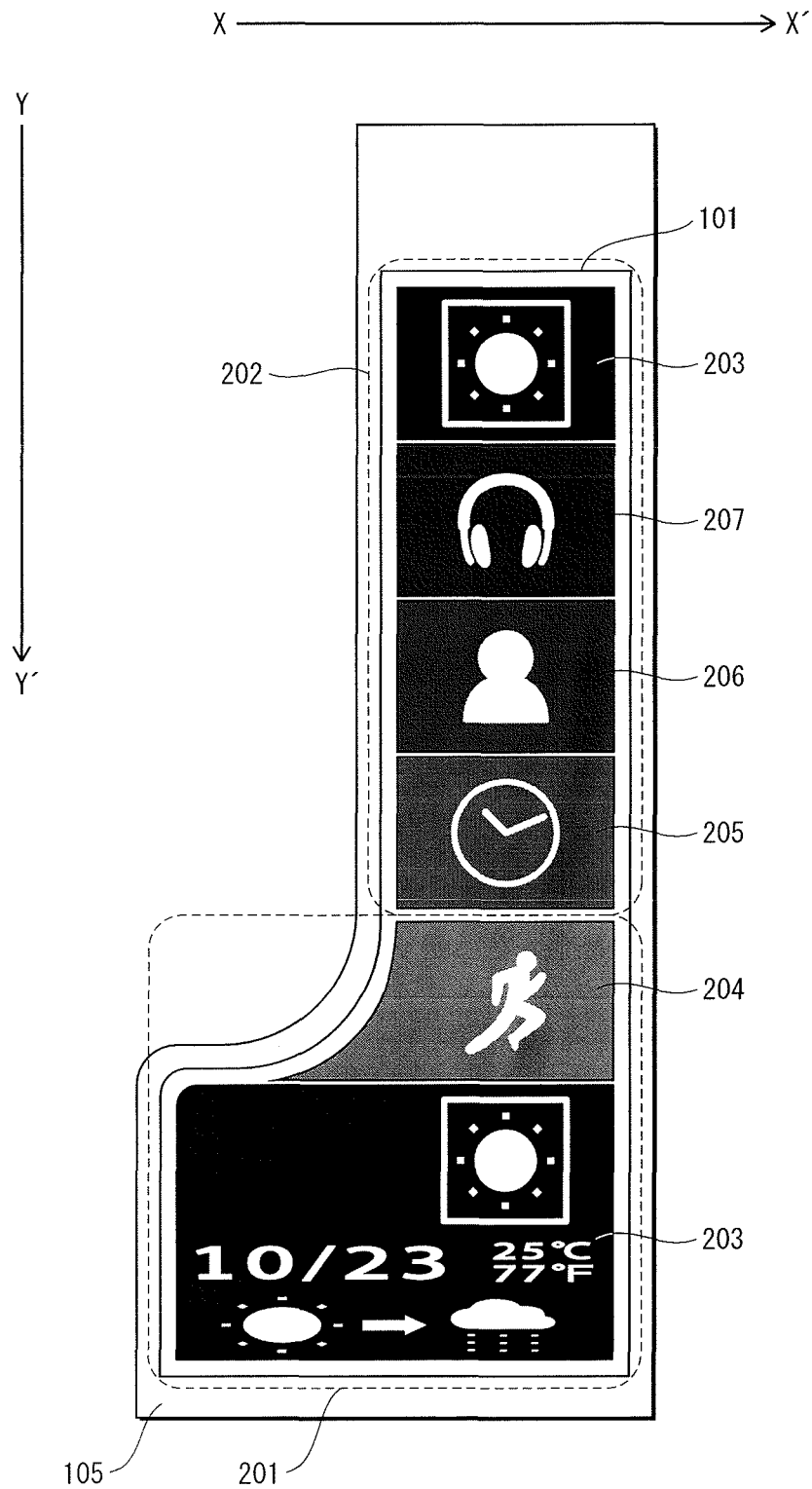
FIG. 8C is a diagram illustrating a change of display state of the display in response to a flick operation in the longitudinal direction.

Upon transitioning from the state illustrated in FIG. 8B to the state illustrated in FIG. 8C, the image 204 that scrolled from the second region 202 is positioned in the portion of the first region 201 that gradually increases in width. The icon image showing information of the program A corresponding to the image 203 and the image generated by execution of the program A that corresponds to the image 203 that is further shrunk in the longitudinal direction (Y-Y' direction) are displayed in the portion of the first region 201 that has a constant width. The icon image for the image 203 corresponding to the program A is fully displayed at the top end in the second region 202. In the states illustrated in the subsequent FIGS. 8D-8G, the display in the second region 202 is fixed, and only the display in the first region 201 transitions.

Figure 8D:
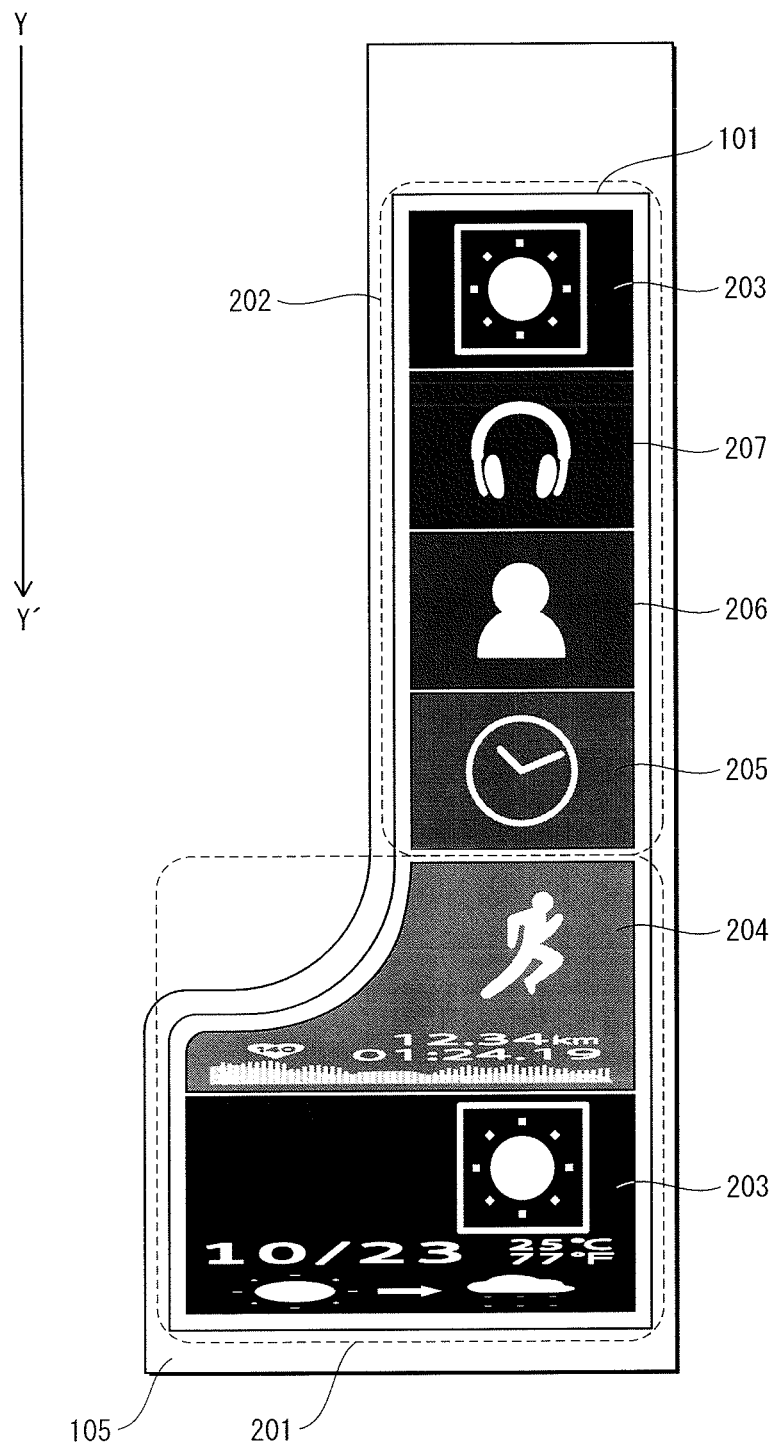
FIG. 8D is a diagram illustrating a change of display state of the display in response to a flick operation in the longitudinal direction.

In the state illustrated in FIG. 8D, in the portion of the first region 201 that gradually increases in width, the icon image indicating information of the program B corresponding to the image 204 is fixed, and in an upper part of the portion of the first region 201 that has a constant width, an image generated by execution of the program B corresponding to the image 204 has appeared and been caused to gradually expand in the longitudinal direction (Y-Y' direction). In a lower part of the portion of the first region 201 that has a constant width, the image 203 is displayed, but a display area thereof has been caused to shrink along with the expansion of the image 204.

In the state illustrated in FIG. 8E, in the first region 201, the image generated by execution of the program A has disappeared from the display 101, and only the icon image of the image 203 corresponding to the program A is displayed.

Figure 8F:
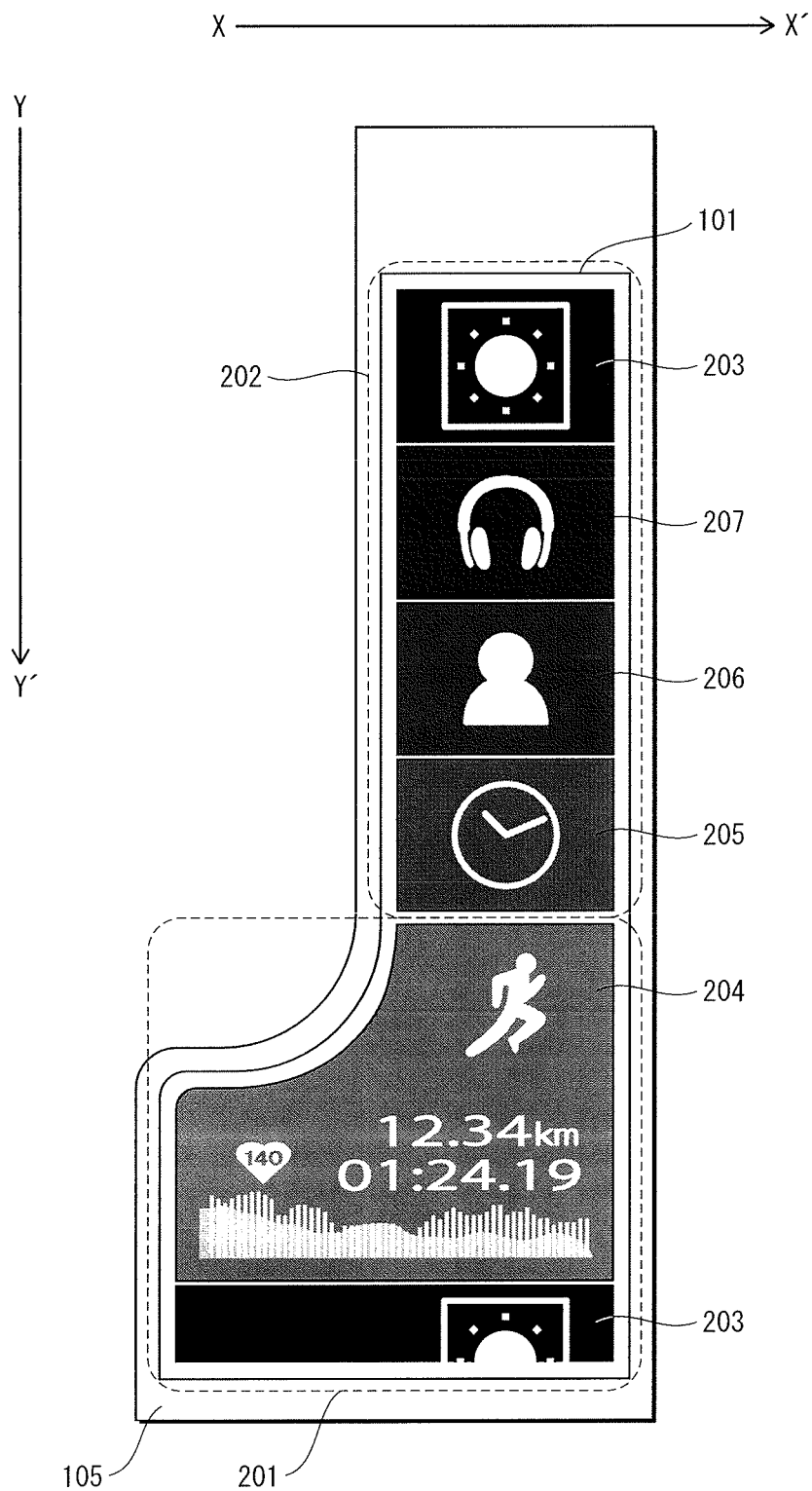
FIG. 8F is a diagram illustrating a change of display state of the display in response to a flick operation in the longitudinal direction.

In the state illustrated in FIG. 8F, in the first region 201, the icon image of the image 203 has gradually disappeared from the display 101.

Figure 8G:
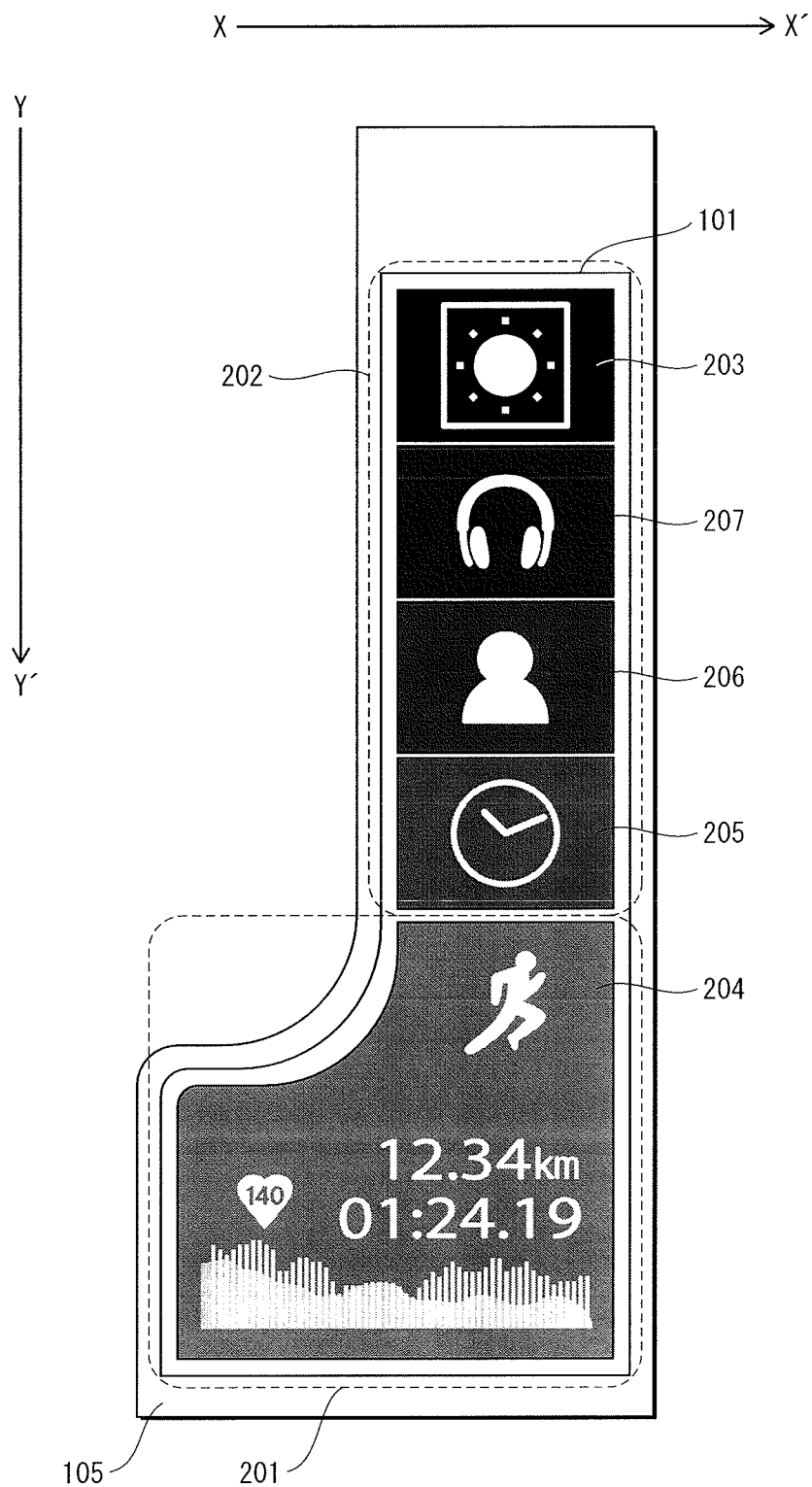
FIG. 8G is a diagram illustrating a change of display state of the display in response to a flick operation in the longitudinal direction.

FIG. 8G illustrates a display state after the scrolling has ended and each image corresponding to a program has moved one program position from the state prior to the beginning of the scrolling. Compared to the display state prior to the scrolling illustrated in FIG. 8A, in the display state illustrated in FIG. 8G the image 204 corresponding to the program B that was displayed closest to the first region 201 in the second region 202 has been moved to the first region 201, and the image 204 corresponding to the program B that was the icon image showing information of the program B in the second region 202 prior to the scrolling has become an execution image generated by execution of the program B and the icon image showing information of the program B in the first region 201 after the scrolling ends. In other words, due to one flick operation, the main program switches to the program B corresponding to the image 204.

(2) Flick Operation 2

The following is a description of another example of processing when a flick operation is detected. In this processing, different from the example described above as the flick operation 1, the processor 107 calculates speed of a flick operation detected by the touch panel 106, the processor 104 controls a scrolling amount in the longitudinal direction according to the speed of a flick operation, and the processor 103, at a timing when scrolling in the longitudinal direction (Y-Y' direction) ends, performs a control that specifies the program corresponding to the image positioned in the first region 201 as the new main program.

Figure 10:
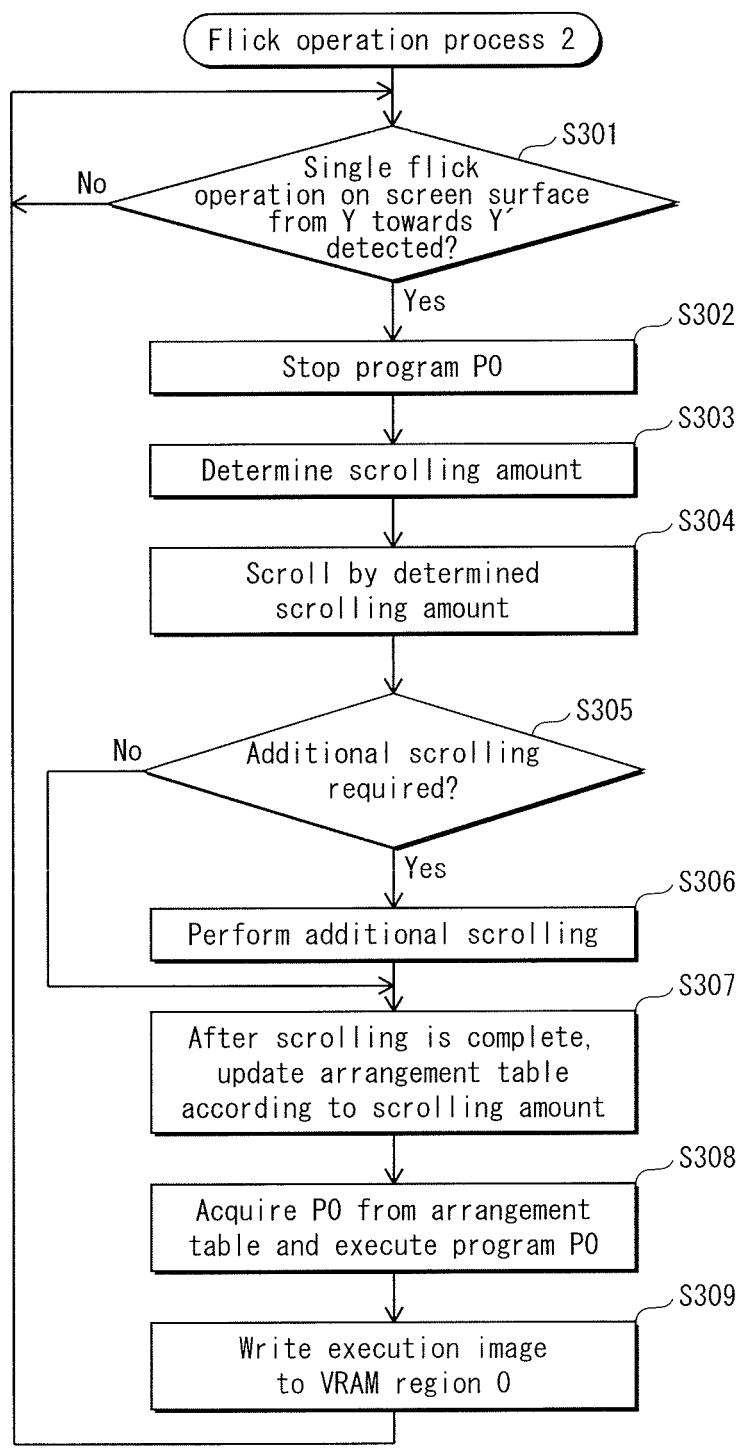
FIG. 10 is a flowchart illustrating another example of processing when a flick operation in the longitudinal direction is detected.

FIG. 10 is a flowchart illustrating processing related to display control at the display 101 and switching control of the main program. The following is a description, using the flowchart illustrated in FIG. 10, of another example of processing due to a flick operation.

First, in the initial state, due to the processing described in embodiment 1, the image 203 corresponding to the program A specified as the main program is displayed in the first region 201 of the display 101, and the images 204-207 corresponding to the programs B-E specified as sub-programs are displayed lined up in the longitudinal direction in the second region 202 of the display 101.

Here, as illustrated in FIG. 8A, a user contacts the screen surface of the display 101, i.e. the touch panel 106, with a finger, and upon performing a single flick operation in the longitudinal direction from Y towards Y', in the direction indicated by the dashed arrow, the touch panel 106 detects the flick operation ("Yes" at step S301). Based on the touch detection result of the touch panel 106, the processor 107 calculates a speed of movement of the flick operation and notifies the processor 103 and the processor 104 of the results of the calculation.

Upon receiving notification of detection of the flick operation, the processor 103 stops execution of the program A, which is the main program and has an ID registered at P0 in the arrangement table (step S302). The processor 104 determines, as a scrolling amount, a number of lines to scroll the display in the longitudinal direction (Y-Y' direction) of the display 101, according to the speed of movement of the touch position (step S303). In determining the scrolling amount, a method may be used in which, for example, speed is divided into levels and the scrolling amount is determined by referencing a table defining the scrolling amount for each level that is stored in advance in the memory 12. Alternatively, a method may be used in which the scrolling amount is calculated using a function provided in advance that has speed as a variable. In such methods, the table and the function define the scrolling amount such that, as speed increases, the scrolling amount increases, allowing a user to intuitively adjust the scrolling amount of the display.

Next, the processor 104, according to the scrolling amount determined, controls the display of the display 101 to scroll the images 203-207 corresponding to the programs A-E from Y towards Y' in the longitudinal direction (Y-Y' direction) (step S304).

Upon scrolling of the images being performed according to the scrolling amount determined, scrolling temporarily stops, and at this timing the processor 103 judges whether or not each image corresponding to a program is at a position such that the image fits into a predefined region (step S305).

A predefined region is a region in the display 101 in which an image corresponding to a program is positioned. The image corresponding to the main program is positioned to fit in the first region 201, and therefore the first region 201 is a predefined region. Images corresponding to sub-programs are positioned to fit in the second region 202, and therefore each image corresponding to a sub-program is positioned to fit in a predefined region allocated within the second region 202. Note that the timing at which the processor 103 judges whether or not each image fits into a predefined region is not limited to being the timing at which scrolling ends. Based on, a predefined scrolling amount, the processor 103 may judge before scrolling ends.

In step S305, when the processor 103 judges that each image corresponding to a program is positioned so as to fit in a predefined region ("Yes" at S305), no further movement of each image corresponding to a program is required. In such a case, the processor 103 updates the arrangement table according to the scrolling amount used in step S304 (step S307), and specifies the program corresponding to the image positioned at the first region 1 as the main program by acquiring the ID registered at P0 in the arrangement table after the update. Subsequently, the processor 103 executes the program corresponding to the ID so acquired (step S308).

Note that the timing at which the processor 103 determines the new main program is not limited to being the timing at which scrolling ends. Based on a predefined scrolling amount, the processor 103 may update the arrangement table and determine a program to become the new main program before scrolling ends. As a method of updating the arrangement table based on the scrolling amount, for example, the number of lines indicating the scrolling amount may be divided by the number of pixels in the Y-Y' direction of an icon image, and each item in the arrangement table may be shifted to the left an amount equivalent to the quotient.

On the other hand, in step S305, when the processor 103 judges that each image corresponding to a program is not positioned so as to fit in a predefined region ("No" at step S305), the processor 104 performs additional scrolling using image movement control so as to fit an image having high priority within a predefined region (step S306). In other words, when a single image corresponding to a program is not fitted within a predefined region set as a position of an image corresponding to a program in the first region 201 or the second region 202, and two images each corresponding to one of two programs is included with the predefined region, the position of each image corresponding to a program is adjusted.

In order to adjust a position of each image, a variety of methods are possible for assigning high priority to an image. For example, of two images positioned in a predefined region, the image having the greater number of lines in the longitudinal direction (Y-Y' direction) in the predefined region may be assigned a high priority. Further, of two images positioned in a predefined region, the image having the greater area drawn in the predefined region may be assigned a high priority. Further, of two images positioned in a predefined region, the image positioned towards the Y end of the longitudinal direction (Y-Y' direction) may always be assigned a high priority, or the image positioned towards the Y' end may always be assigned a high priority.

By any of the above-described methods, adjustment of image drawing positions is performed such that when an image positioned towards the Y end of the longitudinal direction (Y-Y' direction) is assigned a high priority, the image is scrolled from Y towards Y', and when an image positioned towards the Y' end is assigned a high priority, the image is scrolled from Y' towards Y.

When scrolling processing of step S306 ends, the processor 103 updates the arrangement table according to the scrolling amount that is the sum of scrolling in step S304 and step S306 (step S307), and specifies the program corresponding to the image positioned at the first region 1 as the main program by acquiring the ID registered at P0 in the arrangement table after the update. Subsequently, the processor 103 executes the program corresponding to the ID so acquired (step S308). Note that the timing at which the processor 103 determines the new main program is not limited to being the timing at which scrolling ends. Based on a scrolling amount that is the sum of scrolling of step S304 and step S306, the processor 103 may update the arrangement table and determine a program to become the new main program before scrolling in step S306 ends.

Finally the processor 104 generates image data of an image visualizing information generated by execution of the program in step S308, and writes the generated image data to the storage region 0 of the VRAM 14 (step S309).

According to the processing order described above with reference to FIG. 10, any image displayed in the second region is moved to the first region by a scrolling amount in response to speed of a flick operation, and at a timing at which the scrolling ends, the program corresponding to an image positioned in the first region 201 is specified as the new main program. Thus a user can switch any sub-program to being the new main program with one flick operation, and is not limited to only switching a sub-program indicated by an icon image positioned closest to the first region in the second region 202 prior to the flick operation to being the new main program.

Note that the electronic device may be configured to implement only one of the processing order described as the flick operation 1 and the processing order described as the flick operation 2, or may be configured to implement both of the processing orders. When the electronic device implements both of the processing orders, the electronic device may be configured with a setting screen such that a user may set execution of the processing order of any one of the flick operation 1 and the flick operation 2 to be performed when a flick operation is detected.

Note that so far, as the flick operation 1 and the flick operation 2, processing has been described when a flick operation is detected from Y towards Y', i.e. towards a lower end of the screen, along the longitudinal direction of the display 101 illustrated in FIG. 8A. However, a flick operation may also be from Y' towards Y, along the longitudinal direction.

For example, along the longitudinal direction of the display 101, when a flick operation is detected towards an upper end of the screen from Y' towards Y, the processor 104 controls the display of the display 101 so as to scroll the images 203-207 corresponding to the programs A-E from Y' towards Y in the longitudinal direction. In this image movement control, a scrolling amount is determined so as to move an icon image corresponding to a program whose image is displayed in the first region 201 prior to scrolling starting to a position closest to the first region 201 in the second region 202 after scrolling ends, and the IDs registered in the arrangement table in FIG. 4B are cyclically shifted one item to the left. According to such scrolling, the icon image displayed at the top end of the second region 202 prior to scrolling starting is drawn as if disappearing from the upper side of the display 101, and the program corresponding to the icon image is specified as the new main program after scrolling ends and an execution image thereof is drawn in the first region 201.

By implementing processing corresponding to a flick operation from Y' towards Y in a direction towards the upper end of the screen in addition to processing corresponding to a flick operation from Y towards Y' towards the lower end of the screen, ease of selection of the main program is increased.

(3) Drag Operation

Figure 11A:
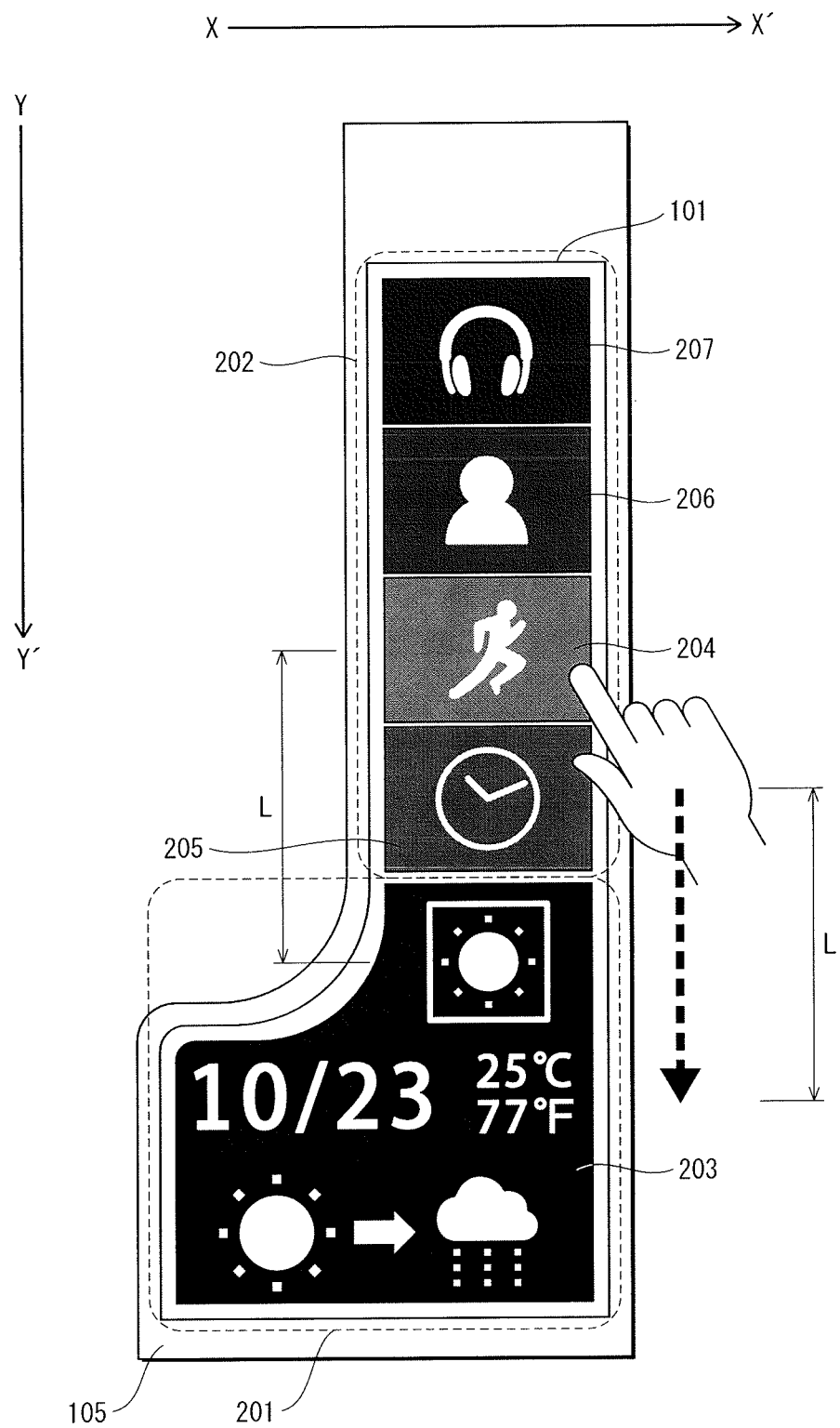
FIG. 11A is a diagram illustrating a change of display state of the display in response to a drag operation.
Figure 11B:
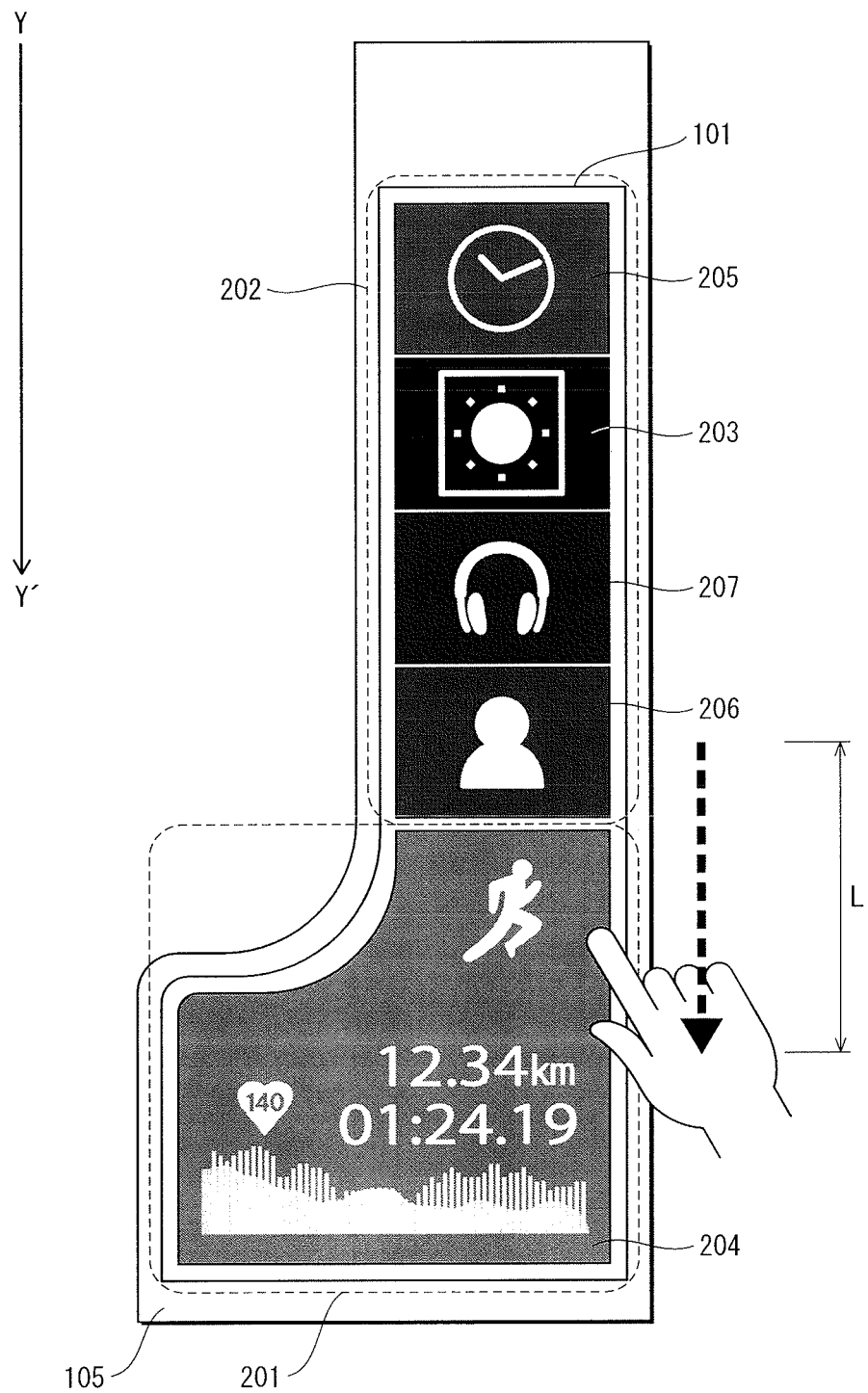
FIG. 11B is a diagram illustrating a change of display state of the display in response to the drag operation.
Figure 12:
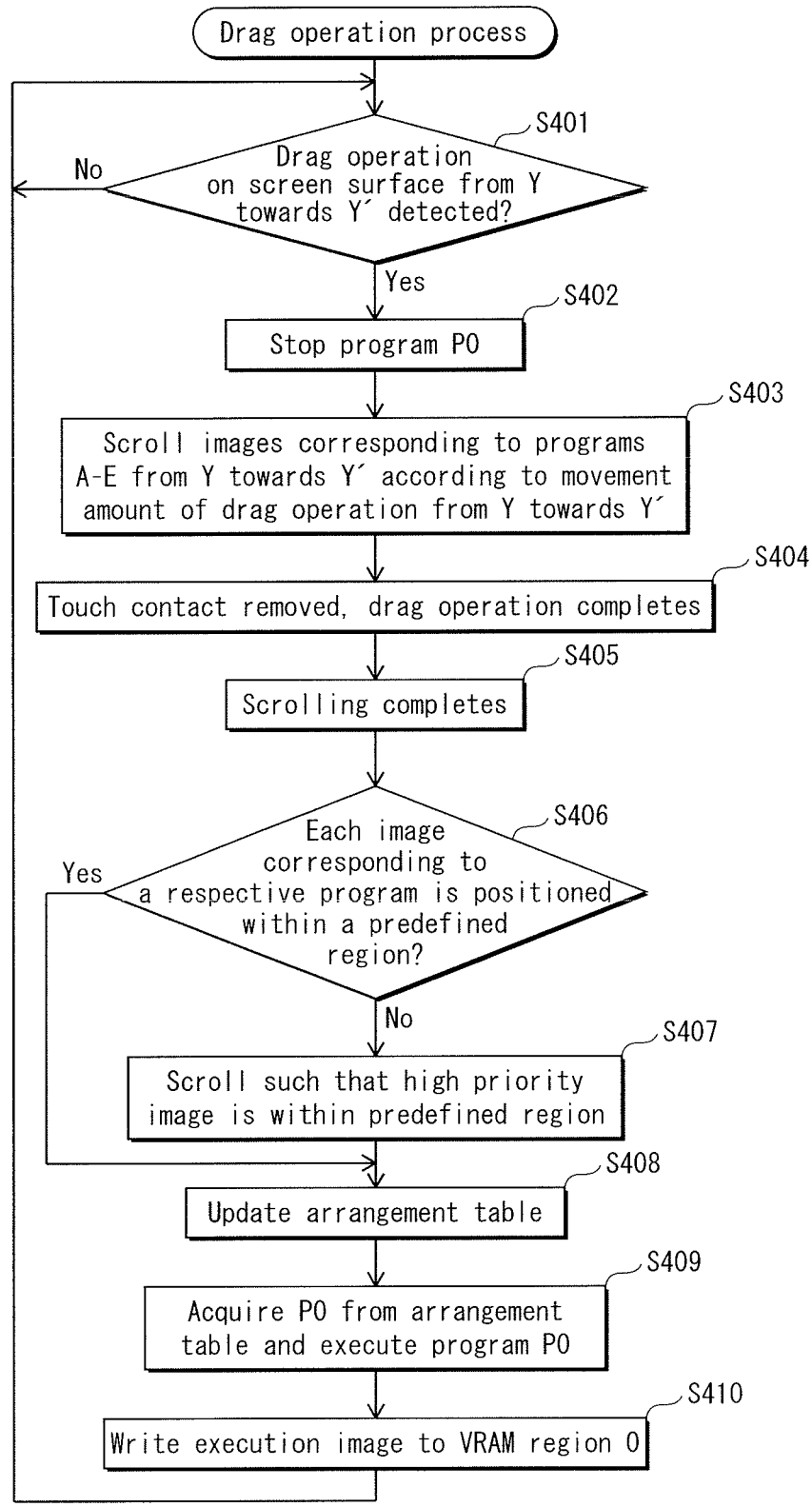
FIG. 12 is a flowchart illustrating processing when a drag operation is detected.

The following is a description, using FIGS. 11A, 11B and 12, of states of main program switching and display changes of the display 101 due to a drag operation, which is one type of touch operation.

FIGS. 11A and 11B are diagrams illustrating, in plan view of the display, a transition of display state due to a drag operation up until switching of the main program is performed. The basic configuration is the same as in FIG. 3B, and description of each symbol is omitted here.

FIG. 12 is a flowchart illustrating processing due to a drag operation. The following is a description, using the flowchart illustrated in FIG. 12, of processing due to a drag operation.

First, in an initial state, due to the processing described in embodiment 1, the image 203 corresponding to the program A that is specified as the main program, is displayed in the first region 201 of the display 101, and the images 204-207 corresponding to the programs B-E that are specified as sub-programs are displayed lined up in the longitudinal direction (Y-Y' direction) in the second region 202 of the display 101.

As illustrated in FIG. 11A, a user contacts the screen of the display 101, i.e. the touch panel 106, with an object such as a finger, etc., and upon performance of a drag operation in the direction indicated by the dashed arrow from Y towards Y' in the longitudinal direction (Y-Y' direction) for a distance L, the touch panel 106 detects the drag operation ("Yes" at step S401). The processor 107, based on a touch detection result of the touch panel 106, notifies the processor 103 and the processor 104 of a movement amount of the drag operation from Y towards Y' in the longitudinal direction (Y-Y' direction).

Upon receiving notification of detection of the drag operation, the processor 103 stops execution of the program A, which is the main program and has an ID registered at P0 in the arrangement table (step S402). The processor 104, in response to the movement amount of the drag operation, performs image movement control so as to scroll the images 203-207 corresponding to the programs A-E from Y towards Y' on the display of the display 101 (step S403). Note that in this case, the movement amount of the drag operation and the scrolling amount of the images 203-207 are preferably approximately the same. For example, if the drag operation is performed for the distance L, the scrolling amount of the images 203-207 also becomes approximately the distance L.

When a touching object separates from the touch panel 106, the processor 107 notifies the processor 103 and the processor 104 of the end of the drag operation (step S404), and the processor 104 that receives this notification ends the control causing scrolling of images (step S405).

At a timing of scrolling ending, the processor 103 judges whether or not each image corresponding to a program is at a position such that the image fits into a predefined region (step S406).

Then, cases in which adjustment of a position of an image is not required and cases in which adjustment of a position of an image is required are separated according to a result of the judgment of the processor 103. However, the processing at steps S407-S410 is the same as the processing at steps S306-S309 in the flowchart in FIG. 10, so description is omitted here.

The processing order in response to the drag operation makes it easy for a user to intuitively determine the scrolling amount of the display. In this way, determination of the main program becomes simple. For example, when a user wishes to make the program B corresponding to the image 204 in FIG. 11A the new main program, if the user touches a location where the image 204 is being displayed and performs a drag operation to the first region 201, the image 204 is moved to the first region 204 as shown in FIG. 11B, and therefore the program B corresponding to the image 204 is switched to being the new main program.

Note that so far, as the drag operation, processing has been described when a drag operation is detected from Y towards Y', i.e. towards a lower end of the screen, along the longitudinal direction of the display 101 illustrated in FIG. 11A. However, a drag operation may also be from Y' towards Y, along the longitudinal direction.

For example, in a drag operation from Y towards Y' in a direction towards the lower end of the screen, contact is detected at the icon image 311a in the state illustrated in FIG. 13A, and when a position of the contact moves to the first region 201, the processor 104 cyclically shifts the IDs of programs registered in the arrangement table in FIG. 4B to the left, controls the display of the display 101 to scroll the icon image 311a from Y towards Y' in the longitudinal direction, and causes the transition of the display illustrated in FIGS. 13A-13D.

On the other hand, in a drag operation from Y' towards Y in a direction towards the upper end of the screen, contact is detected at an image 311b that includes the execution image of the main program in the state illustrated in FIG. 13D, and when a position of the contact moves to the second region 202, the processor 104 cyclically shifts the IDs of programs registered in the arrangement table in FIG. 4B to the right, controls the display of the display 101 to scroll the icon image included in the image 311b from Y' towards Y in the longitudinal direction, and causes the transition of the display illustrated in FIGS. 13D-13A. As a result, in the state illustrated in FIG. 13A, a program corresponding to an icon image 312b becomes the main program, and an image 312a including the icon image 312b and an execution image is displayed in the first region 201. Further, a program corresponding to the image 311b that was displayed in the first region 201 prior to the drag operation starting becomes a sub-program after the drag operation ends, and the icon image 311a is drawn in the second region 202.

By implementing in the electronic device processing corresponding to a drag operation from Y' towards Y in the direction towards the upper end of the screen in addition to processing corresponding to a drag operation from Y towards Y' in the direction towards the lower end of the screen, a drag operation may be used not only to make a program for which an icon image is displayed in the second region 202 the new main program, but also to make a current main program a sub-program.

(4) Tap Operation, Long Tap Operation, and Double Tap Operation.

Figure 14A:
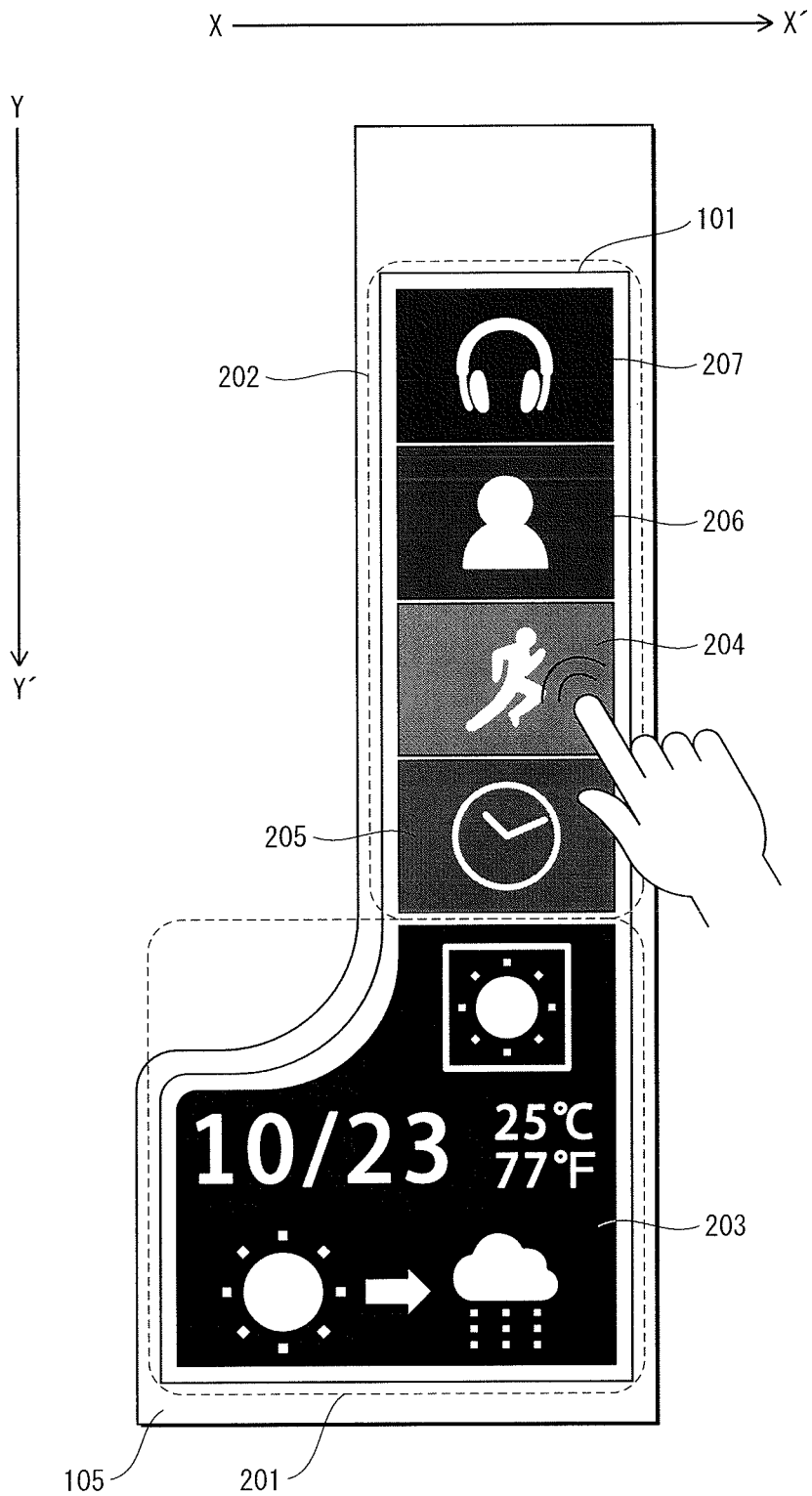
FIG. 14A is a diagram illustrating a change of display state of the display in response to a selection operation.
Figure 14B:
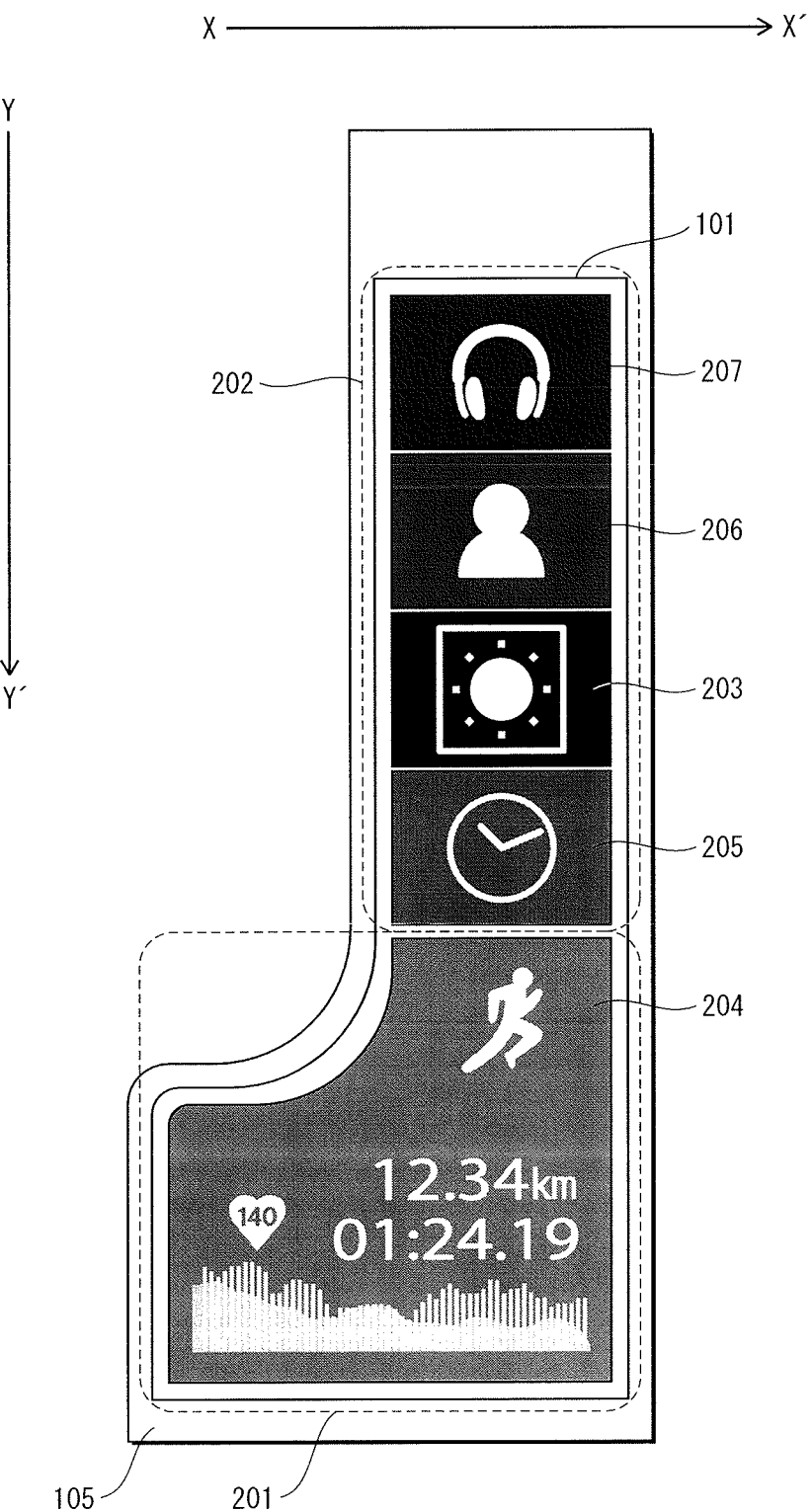
FIG. 14B is a diagram illustrating a change of display state of the display in response to the selection operation.
Figure 15:
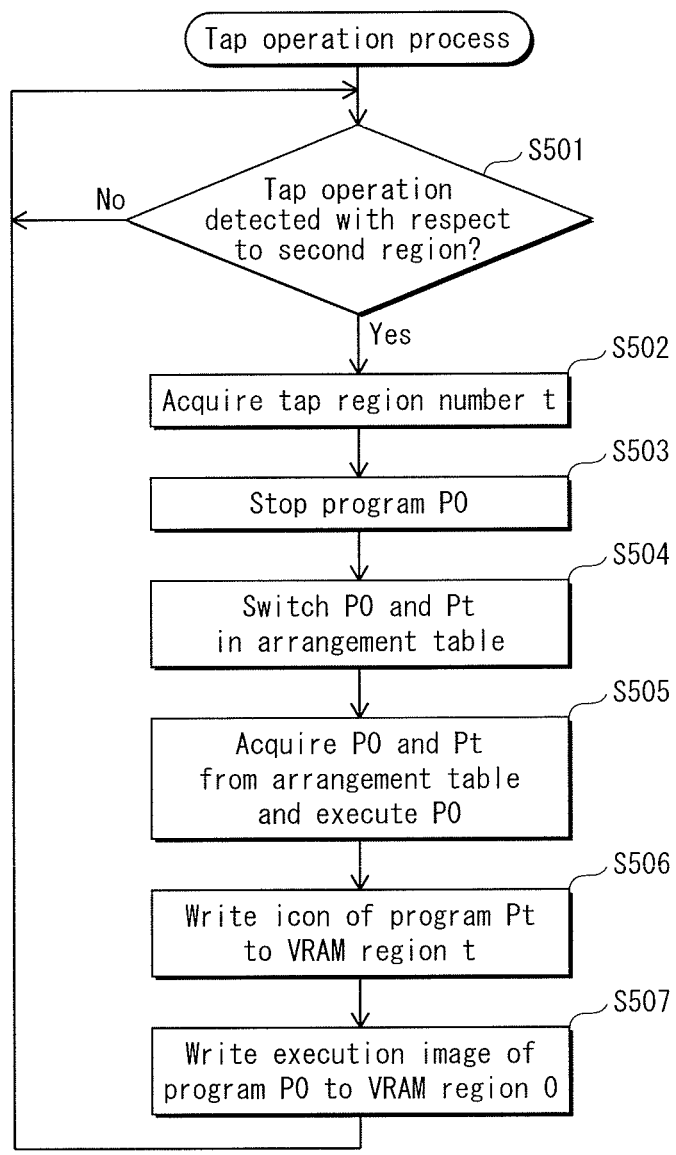
FIG. 15 is a flowchart illustrating processing when a tap operation is detected.

The following is a description, using FIGS. 14A, 14B and 15, of states of main program switching and display changes of the display 101 due to a tap operation, which is one type of touch operation.

FIGS. 14A and 14B are diagrams illustrating, in plan view of the display, a transition of display state due to a tap operation up until switching of the main program is performed. The basic configuration is the same as in FIG. 3B, and description of each symbol is omitted here.

FIG. 15 is a flowchart illustrating processing due to a tap operation. The following is a description, using the flowchart illustrated in FIG. 15, of processing due to a tap operation.

First, in an initial state, due to the processing described in embodiment 1, the image 203 corresponding to the program A that is specified as the main program is displayed in the first region 201 of the display 101, and the images 204-207 corresponding to the programs B-E that are specified as sub-programs are displayed lined up in the longitudinal direction (Y-Y' direction) in the second region 202 of the display 101.

Here, as illustrated in FIG. 14A, when a tap operation is performed by a user with respect to any one of the images 204-207 corresponding to the programs B-E displayed in the second region 202 of the display 101, the touch panel 106 detects the tap operation ("Yes" at step S501). Note that the tap operation described here is contact by an object for a short period of time at a point on the touch panel 106. The processor 107, based on a touch detection result by the touch panel 106, calculates a position selected by the tap operation, and notifies the processor 103 of a result of the calculation.

Upon receiving notification of a tap position, the processor 103 determines which of the storage regions 1-4 of the VRAM 14 illustrated in FIG. 4A, coordinates of the tap position correspond to, and acquires a value t indicating a number of the corresponding storage region (step S502). The processor 103 also stops execution of the main program that has an ID registered at P0 in the arrangement table (step S503), and updates the arrangement table by switching the ID registered at P0 with the ID registered at Pt (step S504).

After updating the arrangement table, the processor 103 acquires the ID registered at P0 and the ID registered at Pt, and executes the new main program corresponding to the ID acquired from P0 (step S505). According to such processing, as illustrated in FIG. 14A, upon selection of the image 204 by a tap operation, for example, the program B corresponding to the image 204 is specified as the new main program.

Subsequently, the processor 104 reads the image data of the icon image managed by the ID acquired from Pt, writes the image data to the storage region t of the VRAM 14 (step S506), generates image data of an image visualizing information generated by execution of the new main program,
and writes the generated image data to the storage region 0 of the VRAM 14 (step S507).

According to the processing order described above with reference to FIG. 15, a program corresponding to an icon image displayed at a position tapped by a user is specified as the main program, and an execution image of the program is displayed in the execution image display region of the first region 201.

Due to the tap operation, a user can easily, intuitively, determine the main program. Note that a method of selecting the main program by a tap operation is described in this example, but instead of the tap operation, methods of selecting the main program by a double-tap operation or long tap operation are also possible.

In the above embodiment, switching control of the main program in response to a touch operation at the display having the same shape as in FIG. 3B is described. However, the switching control of the main program in response to a touch operation may be used for any display having an elongated shape in which the first region and the second region are connected in the longitudinal direction of the elongated shape, such as the displays illustrated in FIGS. 3A, 3C, 3D, and 3E.

Embodiment 3

The following is a description, using FIGS. 16A, 16B, 16C, and 17, of an electronic device pertaining to embodiment 3 of the present disclosure. The electronic device pertaining to the present embodiment can switch images corresponding to a program specified as the main program, by operation of a portion corresponding to the first region 201 of the touch panel 106.

Figure 16A:
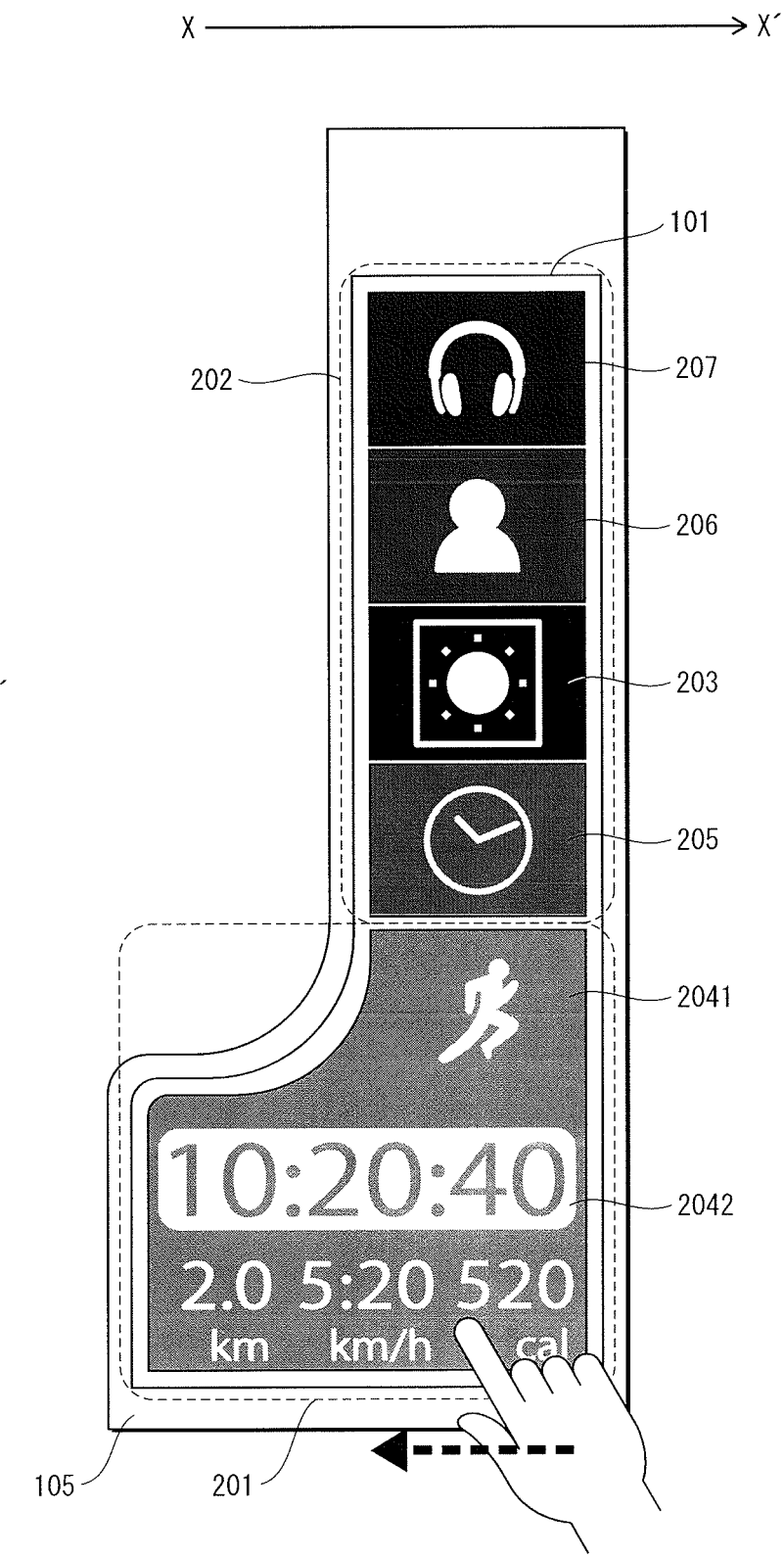
FIG. 16A is a diagram illustrating a change of display state of the display in response to a flick operation on an execution image.
Figure 16B:
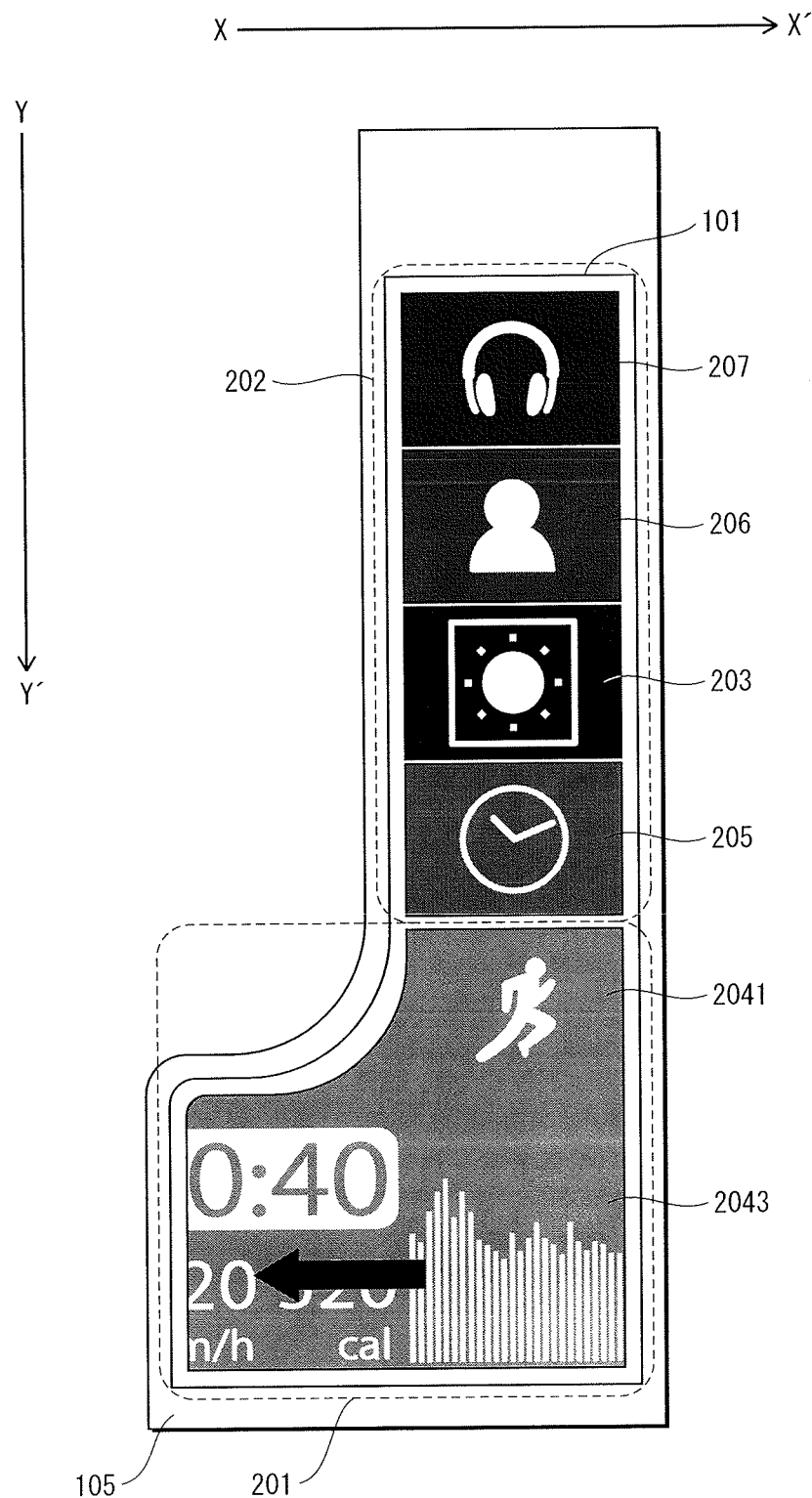
FIG. 16B is a diagram illustrating a change of display state of the display in response to a flick operation on the execution image.
Figure 16C:
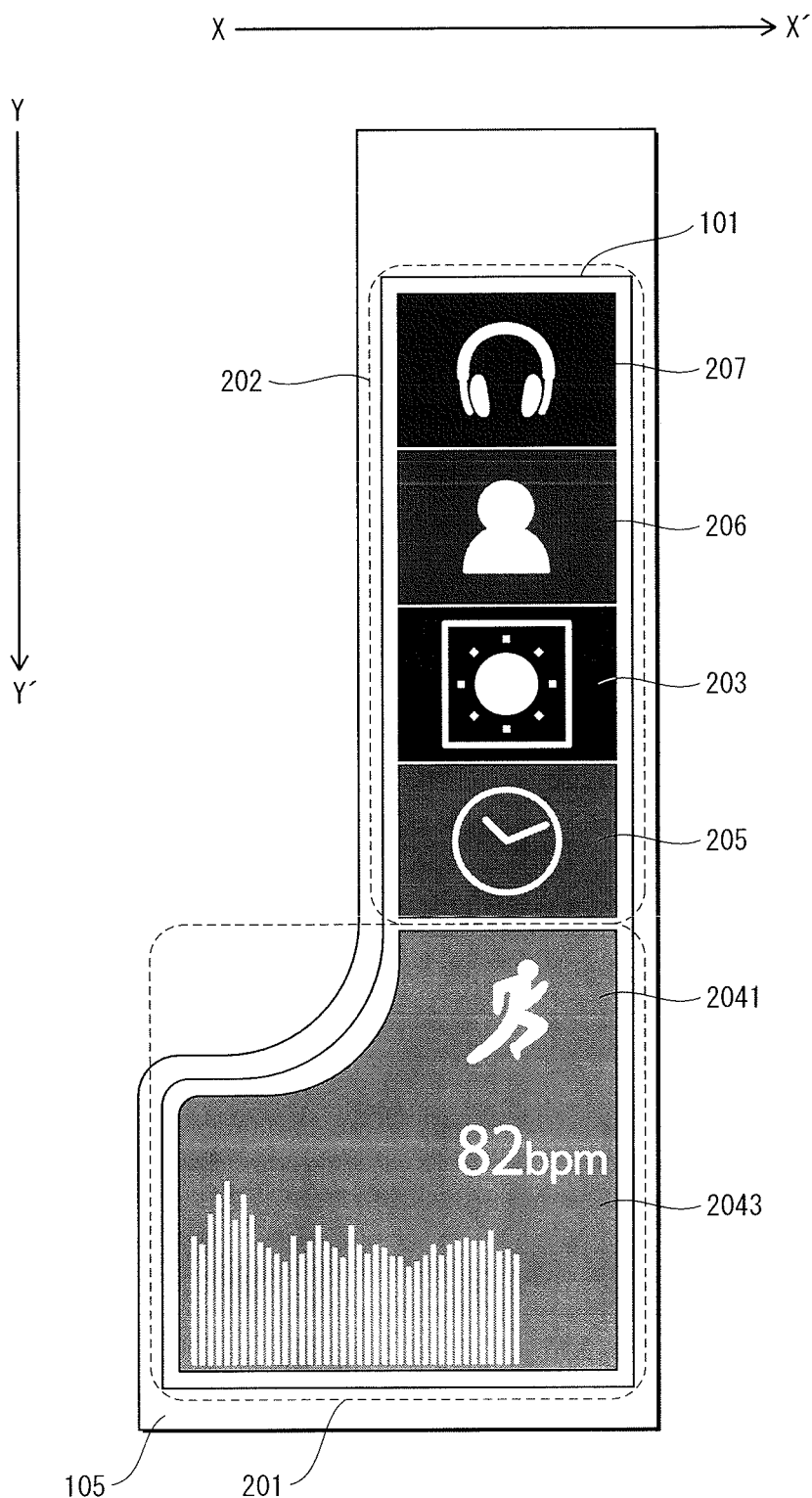
FIG. 16C is a diagram illustrating a change of display state of the display in response to a flick operation on the execution image.

FIGS. 16A-16C illustrate, in plan view of the display, states of display changes of the display due to a flick operation in the first region in the lateral direction (X-X' direction). The basic configuration is the same as in FIG. 3B, and description of each symbol is omitted here.

Figure 17:
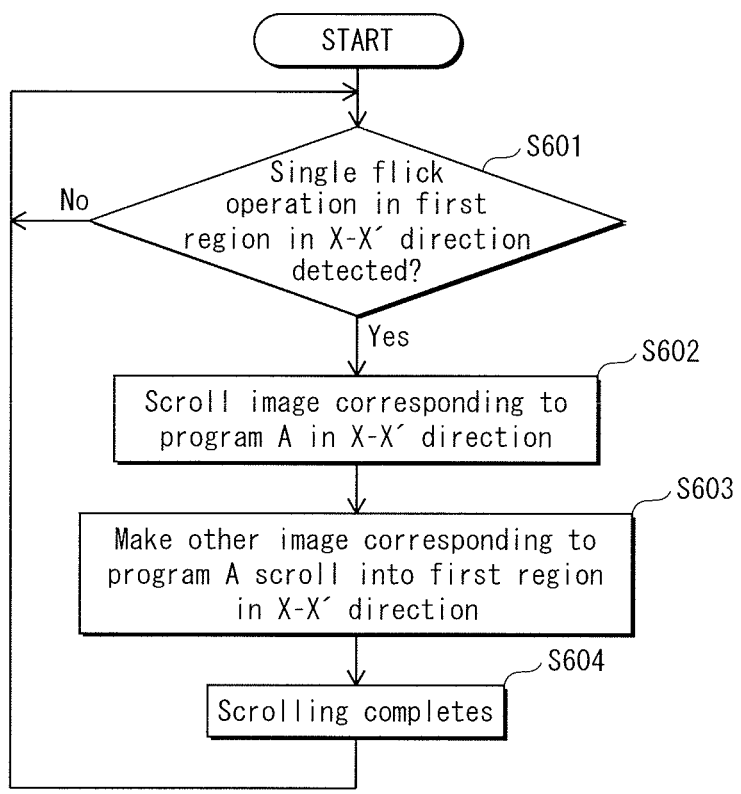
FIG. 17 is a flowchart illustrating processing when a flick operation on the execution image is detected.

FIG. 17 is a flowchart illustrating processing due to a flick operation in the first region in the lateral direction (X-X' direction). The following is a description using the flowchart illustrated in FIG. 17 of processing due to a flick operation in the first region in the lateral direction (X-X' direction).

First, in an initial state, due to the processing described in embodiment 1, an image 2041 and an image 2042 corresponding to the program B that is specified as the main program is displayed in the first region 201 of the display 101, and the images 203, 205-207 corresponding to the programs A, and C-E that are specified as sub-programs are displayed lined up in the longitudinal direction (Y-Y' direction) in the second region 202 of the display 101. The image 2041 displayed in the first region 201 is an icon image showing information of the program B that is specified as the main program, and the image 2042 is an execution image generated by execution of the program B that is specified as the main program.

Here, as illustrated in FIG. 16A, a user contacts the screen surface of the display 101 at the first region 201, i.e. the touch panel 106, with a finger, and upon performing a single flick operation in the lateral direction from X' towards X, in the direction indicated by the dashed arrow (X-X' direction), the touch panel 106 detects the flick operation ("Yes" at step S601). Based on the touch detection result of the touch panel 106, the processor 107 calculates a touch position, a speed of movement of the touch position, etc., and notifies the processor 104 of the results of the calculation.

The processor 104 that receives the notification controls display of the display 101 to scroll the execution image 2042 of the program B that is specified as the main program in the lateral direction from X' towards X (X-X' direction) (step S602).

Further, the processor 104 generates an execution image 2043 visualizing information generated by execution of the program B, and controls display of the display 101 so that the execution image 2043 appears from the left side of the display 101 while scrolling in the lateral direction (X-X' direction) from X' towards X (step S603). States of processing of steps S602 and S603 are illustrated in FIG. 16B.

When the image displayed in the first region 201 changes from the image 2042 to be completely replaced by the image 2043 due to the processing of steps S602 and S603, the scrolling processing ends (step S604). A state in which the scrolling processing has ended is illustrated in FIG. 16C.

The image 2042 and the image 2043 are both images generated by execution of the program B that is specified as the main program, and the execution of the program B is performed by the processor 103. Information shown by the image 2042 and the image 2043 may have completely different content, or may include a portion of identical content.

In the scrolling processing of images in response to a touch operation in the first region, as illustrated in FIGS. 16A-16C, while the execution image 2042 and the execution image 2043 of the main program move along the lateral direction of the display screen in the portion of the screen of the first region 201 having a constant width, the icon image 2041 displayed in the portion of the screen of the first region 201 that gradually increases in width does not change position.

The following is a description of an example of switching images generation by execution of the program B in the present embodiment. The program B is a program used for jogging. The image 2042 generated by execution of the program B is, for example, an image showing measurements of running time and running distance. Further, the image 2043 generated by execution of the program B is, for example, an image showing changes in heart rate while running.

Note that in the above example, causing scrolling in the lateral direction (X-X' direction) from X' towards X is described, but a flick operation from X towards X' may cause scrolling in the opposite direction, from X towards X'.

In order to return the image 2043 displayed in the first region 201 to the image 2042, a flick operation may be performed on the touch panel 106 in the first region 201, causing scrolling of the display.

Further, in the above example, description is given of replacing the image 2042 that is displayed in the first region and generated by execution of the program B that is specified as the main program with the image 2043 generated by the execution of the program B, but another image may be caused to scroll in and replace the image 2043.

Further, in the above example description is given of a single switching of an image corresponding to the program B that is specified as the main program in response to a single flick operation, but the switching of images may be performed by other methods. For example, in response to speed of a single flick operation, the scrolling amount may change, and depending on the scrolling amount, the number of images switched may change. Further, causing scrolling of images in the lateral direction (X-X' direction) by a drag operation may also be possible.

Further, among execution images corresponding to the program B that is specified as the main program, one image may be set as a main image, and when an image other than the main image is displayed in the first region 201, the image displayed in the first region 201 may be switched to the main image by a touch operation, etc., with respect to the image 2041 that is an icon image. In this way, an operation to return to displaying the main image is simplified.

According to the above embodiment, information obtained by executing a program specified as the main program is divided into multiple images, and a user can switch between images by a simple operation.

Note that in the present embodiment, description is given using the display with the same configuration as in FIG. 3B. However, an execution image of the main program may also be switched in response to a touch operation in the first region due to the same control as in the present embodiment using a display having any one of the shapes illustrated in FIGS. 3A, 3C-3E.

Embodiment 4

In embodiment 4, description is provided of control of a GUI in response to a touch operation performed with respect to an electronic device having the function described in embodiment 2 and embodiment 3.

Figure 18:
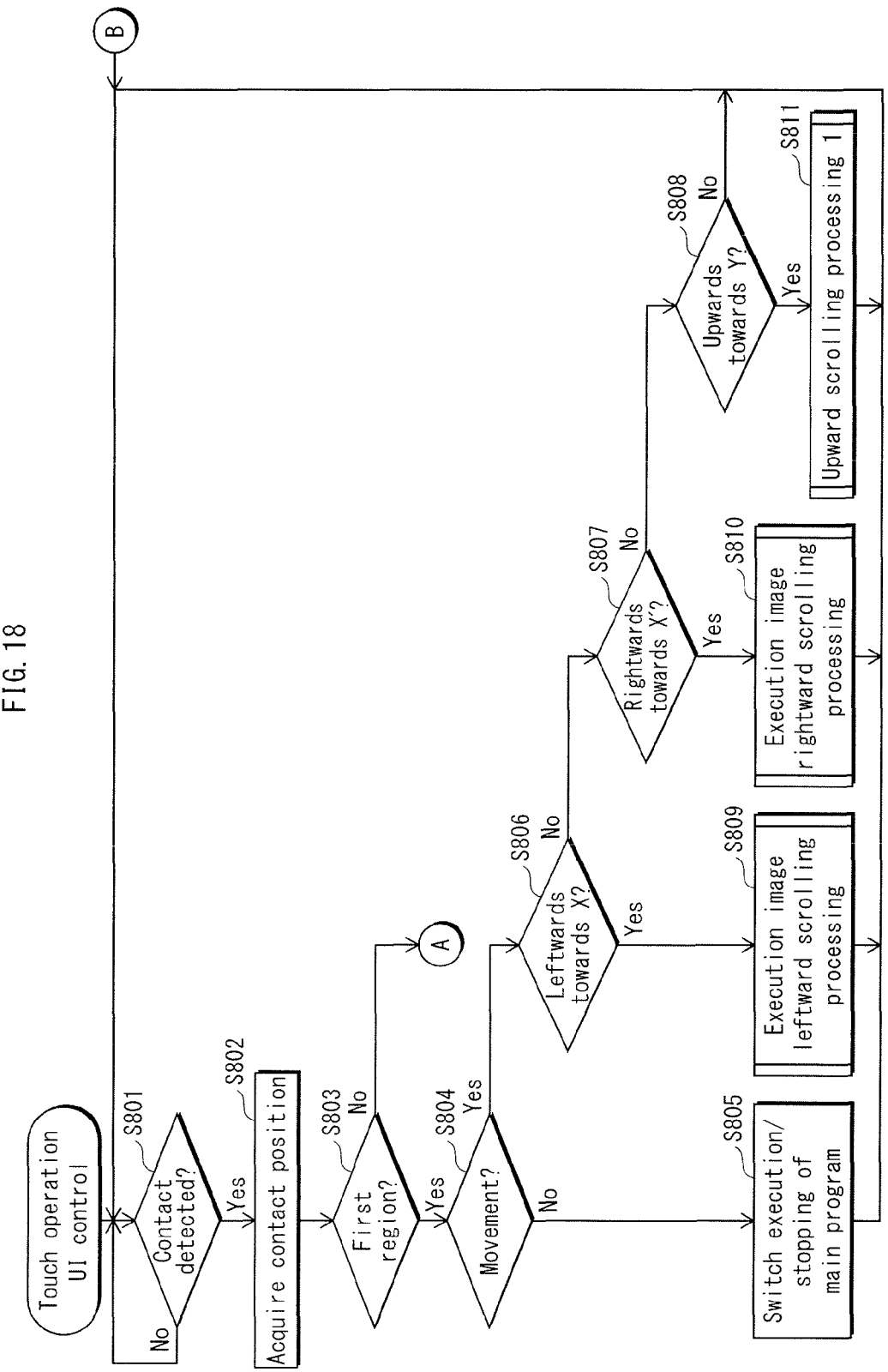
FIG. 18 is a flowchart illustrating processing order of a GUI control in response to a touch operation.
Figure 19:
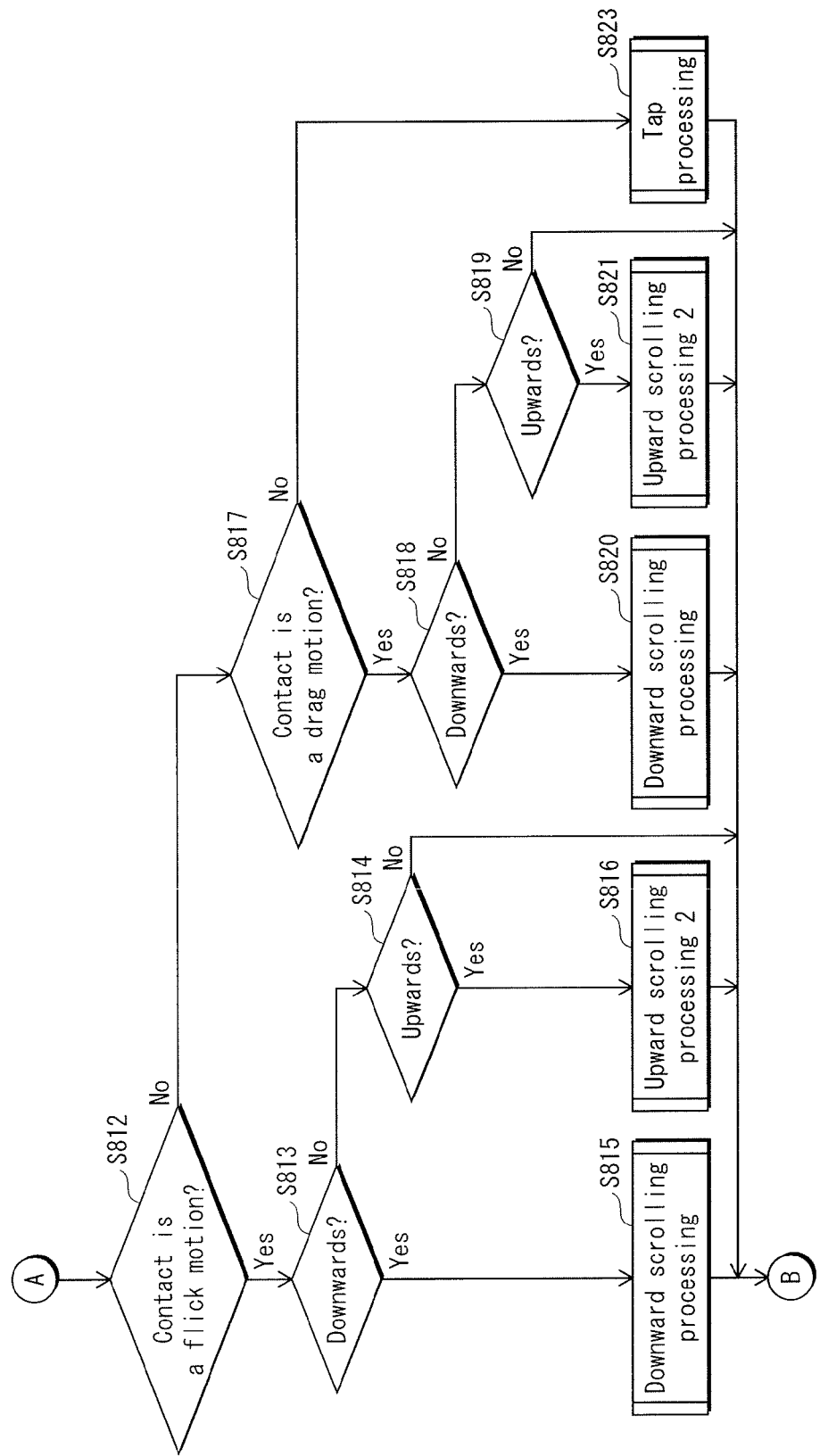
FIG. 19 is a flowchart illustrating processing order of a GUI control in response to a touch operation.

FIG. 18 and FIG. 19 are flowcharts illustrating processing order of a GUI control in response to a touch operation. In GUI control processing, first the processor 107, at the determination step S801, waits for contact with the touch panel 106 to be detected. When contact is detected, the processor 107 acquires a contact position from the touch panel 106 (step S802), and determines whether the contact position is included in one of the first region 201 and the second region 202 (step S803).

The following is a description of when the contact position is included in the first region 201. When the contact position is included in the first region 201 and the contact ends without changing position ("Yes" at step S803 and "No" at step S804), the processor 107 notifies the processor 103 that the touch operation is a tap operation with respect to the first region. When receiving notification of detection of the tap operation at the first region, the processor 103 switches the state of the main program between an execution state and a stopped state (step S805).

When the contact position is included in the first region and movement of the contact position is detected ("Yes" at step S803 and "Yes" at step S804), the processor 107 determines a movement direction of the contact position in steps S806, S807, and S808, and notifies the processor 103.

When the movement direction of the contact position is left along the lateral direction of the display surface (from X' towards X) ("Yes" at step S806), the processor 103 switches an image corresponding to the main program by scrolling in the left direction. When the movement direction of the contact position is right along the lateral direction of the display surface (from X towards X') ("No" at step S806 and "Yes" at step S807), the processor 103 switches an image corresponding to the main program by scrolling in the right direction. Scrolling of an image corresponding to the main program in steps S809 and S810 is described in embodiment 3, and subsequently processing returns to step S801, and the processor waits for detection of a new contact.

When the contact position is included in the first region 201 and the contact position moves along the longitudinal direction of the display surface from the first region 201 towards the second region 202 (from Y' towards Y) ("No" at step S806, "No" at step S807, and "Yes" at step S808), the display is caused to scroll such that an icon image portion in an image corresponding to the main program displayed in the first region 201 at the time of contact is moved to a lower end of the second region 202. A program displayed as an icon image at the top end of the second region 202 prior to scrolling starting is displayed as the new main program as the icon image and an execution image in the first region 201 after scrolling ends (step S811). After image display at step S811 is complete, or when the movement direction of the contact position at the first region is downwards in the longitudinal direction of the display surface (from Y towards Y') ("No" at step S806, "No" at step S807, and "No" at step S808), processing returns to step S801, and the processor 107 waits for detection of a new contact.

The following is a description of when a detected contact position is included in the second region 202. When the contact position is included in the second region ("No" at step S803), according to determination at step S812 and step S817, illustrated in FIG. 19, the processor 107 determines whether the contact is any one of a flick operation, a drag operation, and a tap operation.

At step S812, when movement of the contact position and cessation of contact is detected within a predefined time from detection of the contact (for example, one second), the processor 107 detects a flick operation, determines the movement direction of the contact position in steps S813 and S814, and notifies the processor 103.

When the movement direction of the contact position in a flick operation is from the second region 202 towards the first region 201 along the longitudinal direction of the display surface (from Y towards Y') ("Yes" at step S813), the processor 103 causes scrolling from the second region 202 towards the first region 201 along the longitudinal direction of the display (step S815) and processing subsequently returns to step S801. When the movement direction of the contact position in a flick operation is from the first region 201 towards the second region 202 along the longitudinal direction of the display surface (from Y' towards Y) ("No" at step S813 and "Yes" at step S814), the processor 103 causes scrolling from the first region 201 towards the second region 202 along the longitudinal direction of the display (step S816), and processing subsequently returns to step S801. When the movement direction of the contact position in a flick operation is along the lateral direction of the display surface ("No" at step S813 and "No" at step S814), processing returns to step S801 without any change in screen display, to wait for detection of a new contact. Scrolling of the display in steps S815 and S816 is the same as described in "(1) Flick operation 1" and "(2) Flick operation 2" in embodiment 2.

When movement of the contact position is detected, and contact ends after a predefined time (for example, 1 second) passes from detection of the contact ("No" at step S812 and "Yes" at step S817), the processor 107 detects a drag operation, determines the movement direction of the contact position in step S818 and step S819, and notifies the processor 103.

When the movement direction of the contact position in a drag operation is from the second region 202 towards the first region 201 along the longitudinal direction of the display surface (from Y towards Y') ("Yes" at step S818), the processor 103 causes scrolling from the second region 202 towards the first region 201 along the longitudinal direction of the display (step S820) and processing subsequently returns to step S801. When the movement direction of the contact position in a drag operation is from the first region 201 towards the second region 202 along the longitudinal direction of the display surface (from Y' towards Y) ("No" at step S818 and "Yes" at step S819), the processor 103 causes scrolling from the first region 201 towards the second region 202 along the longitudinal direction of the display (step S821), and processing subsequently returns to step S801. When the movement direction of the contact position in a drag operation is along the lateral direction of the display surface ("No" at step S818 and "No" at step S819), processing returns to step S801 without any change in screen display, to wait for detection of a new contact. Scrolling of the display in steps S820 and S821 is the same as described in "(3) Drag operation" in embodiment 2.

When the contact position is included in the second region ("No" in step S803) and contact is detected ending without the contact position moving ("No" at step S812 and "No" at step S817), the processor 107 detects a tap operation and notifies the processor 103. The processor 103 causes the icon image displayed at the contact position of the tap operation to be displayed as an image of the new main program in the first region 201 (step S823) and subsequently processing returns to step S801.

Note that switching of the main program at step S823 may be executed in the same way as described in "(4) Tap operation, long tap operation, double-tap operation" in embodiment 2, or may be executed by a touch-slide operation.

The touch-slide operation is a control whereby, when any one of the icon images in the second region are touched, the icon image of the program that was touched moves towards the first region such that a sequence of multiple programs cyclically shifts. Compared to the tap operation described in embodiment 2, the touch-slide operation has the effect of not changing the order of icon images of programs. Normally, when the number of programs is low, even if the order of icon images of programs changes, the programs indicated by the icon images in the second region are easy to understand. However, as the number of programs displayed increases, changing the order of icon images of programs with each tap operation invites user confusion. Thus, in the touch-slide operation, the icon image of the program touched moves cyclically to the first region, maintaining the order of icon images of programs in the first region and the second region and preventing user confusion.

In the touch-slide operation, as shown in FIG. 20, the icon image displayed at the contact position is moved from the second region to the first region, displayed scrolling downwards. In this control, the processor 107 specifies the icon image displayed in the contact position detected by the touch panel 106, and the processor 104 moves the specified icon image to the first region 201, and while causing all the icon images drawn in the second region 202 to be scrolled along the longitudinal direction, cyclically shifts the IDs registered in each item of the arrangement table in FIG. 4B to the left. The processor 103, at a timing of scrolling ending, specifies the program corresponding to the image positioned at the first region 201 as the new main program.

As a result, the icon image 302a displayed at the contact position in FIG. 20A scrolls downwards as illustrated in FIG. 20B. When the icon image moves as far as the first region 201, the program corresponding to the icon image becomes the new main program, and as illustrated in FIG. 20C, the image 302b of the new main program is displayed in the first display region.

According to the processing order described with reference to FIG. 18 and FIG. 19, the GUI is controlled in response to a touch operation at the touch panel, any one of the images displayed in the second region are moved to the first region 201, and the program corresponding to the image positioned at the first region 201 is specified as the new main program. Thus, a user can cause any sub-program corresponding to an icon image in the second region 202 to become the new main program by a flick operation, drag operation, and tap operation.

Embodiment 5

Figure 21:
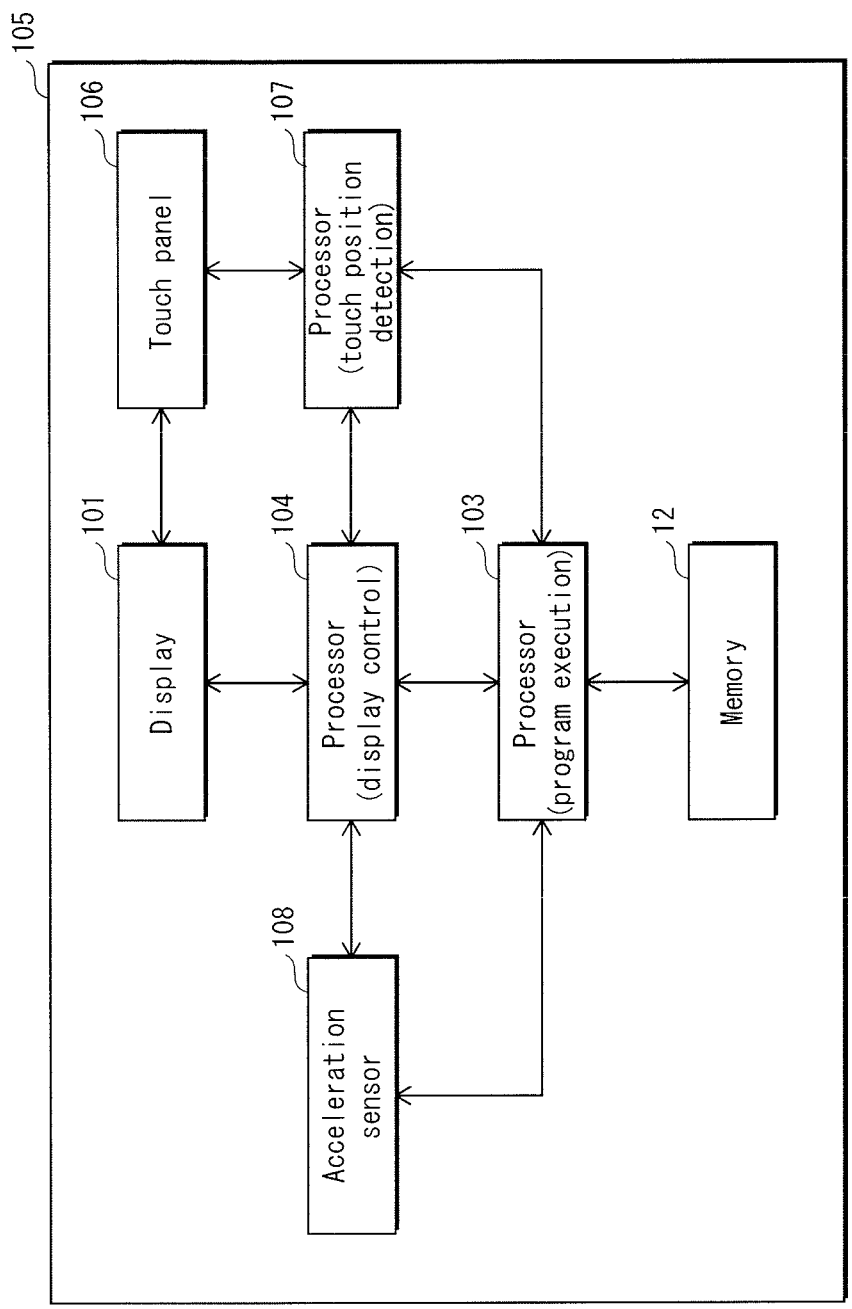
FIG. 21 is a diagram illustrating a configuration of an electronic device pertaining to embodiment 5.
Figure 22:
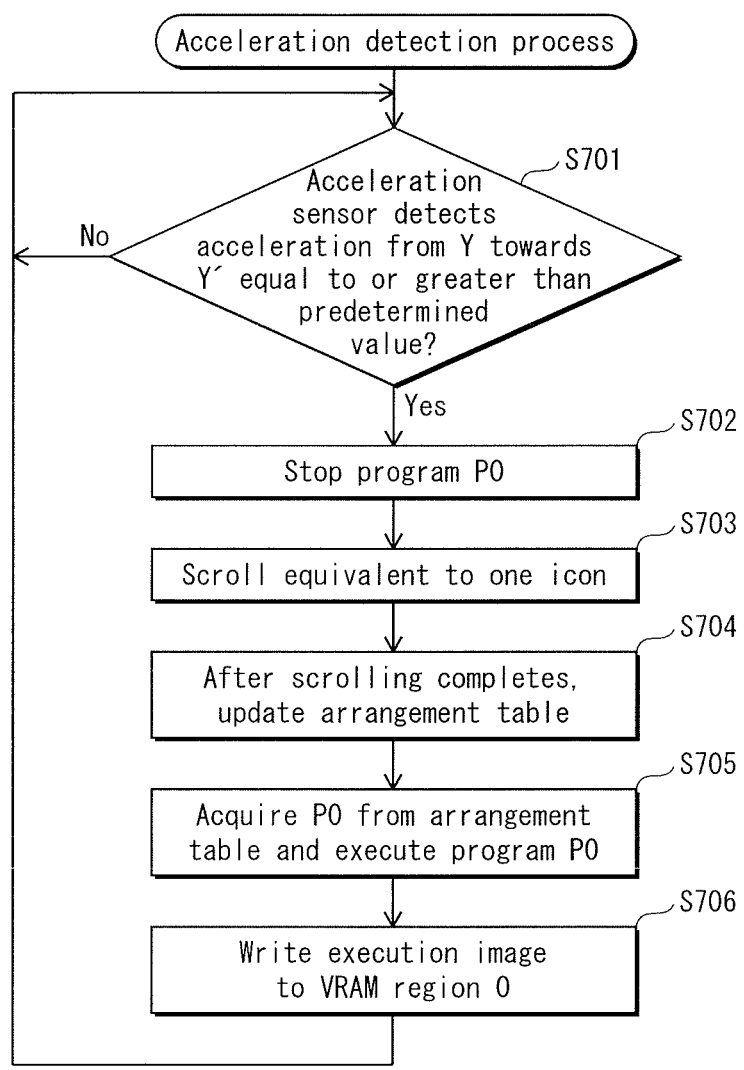
FIG. 22 is a flowchart illustrating processing when a detection is made by an acceleration sensor.

The following is a description, using FIGS. 21 and 22, of an electronic device pertaining to embodiment 5 of the present disclosure.

FIG. 21 is a diagram illustrating a configuration of an electronic device pertaining to embodiment 5 of the present disclosure. In FIG. 21, description of elements having the same symbols as in FIG. 7 are omitted, and only features that are different from FIG. 7 are described here.

In addition to the configuration illustrated in FIG. 7, the configuration illustrated in FIG. 21 has the addition of a acceleration sensor 108 held in the casing 105, which detects acceleration of the electronic device.

Embodiment 5 further includes, as a function implemented by execution of a control program in the processor 104, an image movement control that controls display of the display such that any one of the icon images displayed in the second region 202 is moved to the first region 201 in response to detection of acceleration by the acceleration sensor 108.

The following is an illustration, using FIG. 22, of an operation example of the electronic device due to detection of acceleration.

FIG. 22 is a flowchart illustrating one example of processing due to detection of acceleration in the longitudinal direction (Y-Y' direction).

First, in an initial state, due to the processing described in embodiment 1 and as illustrated in FIG. 3B, the image 203 corresponding to the program A that is specified as the main program is displayed in the first region 201 of the display 101, and the images 204-207 corresponding to the programs B-E that are specified as sub-programs are displayed lined up in the longitudinal direction (Y-Y' direction) in the second region 202 of the display 101.

Due to, for example, a user performing a shake operation of the electronic device, when some external force acts on the electronic device in the longitudinal direction (Y-Y' direction), the acceleration sensor 108 detects acceleration from Y towards Y' in the longitudinal direction (Y-Y' direction) that is equal to or greater than a predefined value ("Yes" at step S701).

Upon detection of the acceleration, the processor 103 stops execution of the program A that is the main program and has an ID registered at P0 in the arrangement table (step S702). The processor 104 performs image movement control so as to scroll the images 203-207 corresponding to the programs A-E from Y towards Y' on the display of the display 101 (step S703).

In the image movement control, a scrolling amount is adjusted such that the icon image 204 corresponding to the program B, which is displayed at a position closest to the first region 201 in the second region 202 prior to scrolling beginning, is moved to the first region 201 after the scrolling ends. Due to the scrolling, the image 203 corresponding to the program A, which is displayed in the first region 201 prior to the scrolling beginning, is moved towards the bottom of the display 101, and is drawn disappearing from the bottom end of the display 101. Further, the images 205-207 corresponding to the programs C-E that are specified as sub-programs each move in the second region 202 a distance of one icon image in the direction from Y towards Y'. Further, the icon image of the program A, which was specified as the main program, is drawn so as to appear from the top end of the second region.

When the scrolling due to the image movement control of the scrolling amount equal to a distance of one icon image ends, the processor 103 updates the arrangement table illustrated in FIG. 4B, by shifting the IDs registered therein one item to the left (step S704).

After updating the arrangement table, the processor 103 acquires the ID registered at P0 and executes the program corresponding to the acquired ID (step S705). The processor 104 generates image data for an image visualizing information generated by the execution of the program, and writes the generated image data to the storage region 0 of the VRAM 14 (step S706).

The example described above with reference to FIG. 22 has a feature that, when acceleration detected by the acceleration sensor 108 is greater than or equal to a predefined threshold, the processor 104 controls display of the display 101 to move the image closest to the first region 201 among the images corresponding to the programs specified as sub-programs in the second region 202 to the first region 201, and the processor 103 specifies the program corresponding to the image moved to the first region 201 as the new main program.

As another example of control of the electronic device in response to detection of acceleration, the acceleration sensor 108 may determine the scrolling amount in response to a degree of acceleration detected, similar to the determination of the scrolling amount in response to speed of a flick operation in the processing order described with reference to FIG. 10 in embodiment 2. In this example, the processor 103 controls the scrolling amount in the longitudinal direction (Y-Y' direction) in response to a degree of acceleration, and at a timing of scrolling ending, specifies the program corresponding to the image positioned at the first region 201 as the new main program.

Further, as another example of control of the electronic device in response to detection of acceleration, the acceleration sensor 108 may cause switching of execution images of the main program displayed in the region 1 in response to acceleration detected in the lateral direction (X-X' direction), similar to the switching of execution images of the main program displayed in the region 1 in response to a flick operation in the lateral direction (X-X' direction) in the processing order described with reference to FIG. 17 in embodiment 3. In this example, when the acceleration sensor 108 detects acceleration in the lateral direction (X-X' direction) equal to or greater than a predefined threshold, the processor 104 causes scrolling in the lateral direction (X-X' direction) of the execution image of a program that is specified as the main program in the first region 201, and controls the display 101 such that the execution image is replaced by another execution image corresponding to the program.

Further, it is also possible to use an acceleration detection result from the acceleration sensor other than as a trigger for causing scrolling of the display of the display 101. For example the acceleration detection result from the acceleration sensor 108 may be used to switch operating states of the display. Specifically, when the display 101 has two operating states, a sleep state in which images are not displayed and an active state in which images are displayed, when no operation is performed for more than a predefined time, the processor 104 limits power consumption by switching the operating state of the display 101 to the sleep state. Subsequently, when the acceleration sensor 108 detects acceleration greater than a predefined value, the operating state may be switched from the sleep state to the active state.

Embodiment 6

Figure 23:
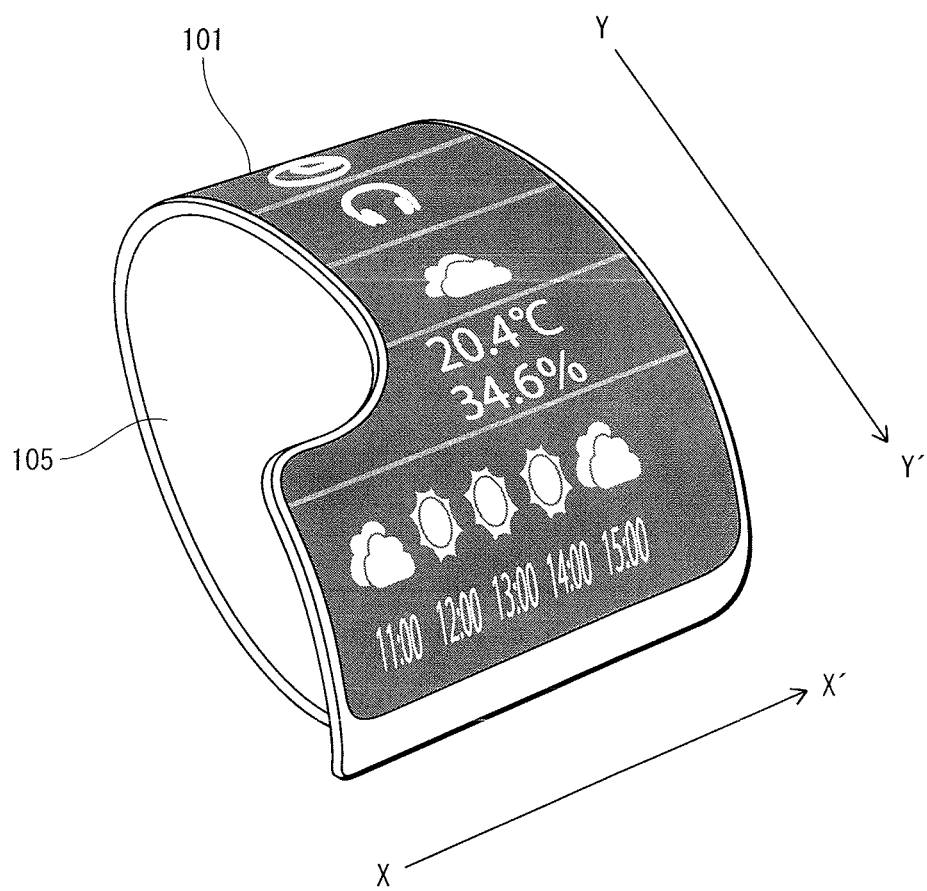
FIG. 23 is a diagram illustrating an external view of an electronic device pertaining to embodiment 6.

The following is a description, using FIGS. 23 and 24, of an electronic device pertaining to embodiment 6.

In the electronic device pertaining to embodiment 6, the casing 105 is formed from elastic material. The casing 105 further has an engaging member at both ends in the longitudinal direction. By bending the casing 105 and engaging the engaging members at both ends of the casing 105, the mounting surface of the display 101 of the electronic device can be deformed into an outer peripheral surface having a cylindrical shape.

The display 101 is an organic EL display. When the casing 105 is deformed into the cylindrical shape, the display 101 is deformed into a shape along the outer peripheral surface of the cylindrical shape.

FIG. 23 is a diagram illustrating a view of an electronic device pertaining to embodiment 6, in a state of being deformed into a cylindrical shape. By deforming the electronic device into the state illustrated in FIG. 23, and wrapping around a user's wrist, the electronic device may be attached to part of the body as a wristwatch.

Figure 24B:
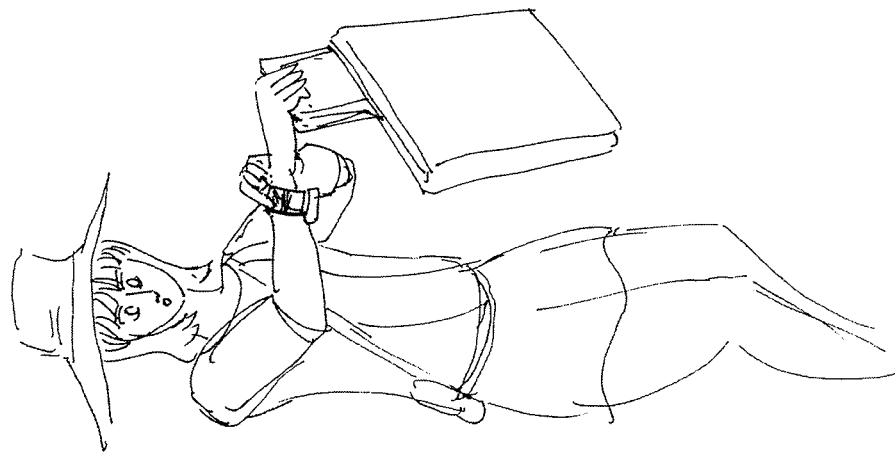
FIGS. 24A and 24B are diagrams illustrating types of use of the electronic device pertaining to embodiment 6.
Figure 24A:
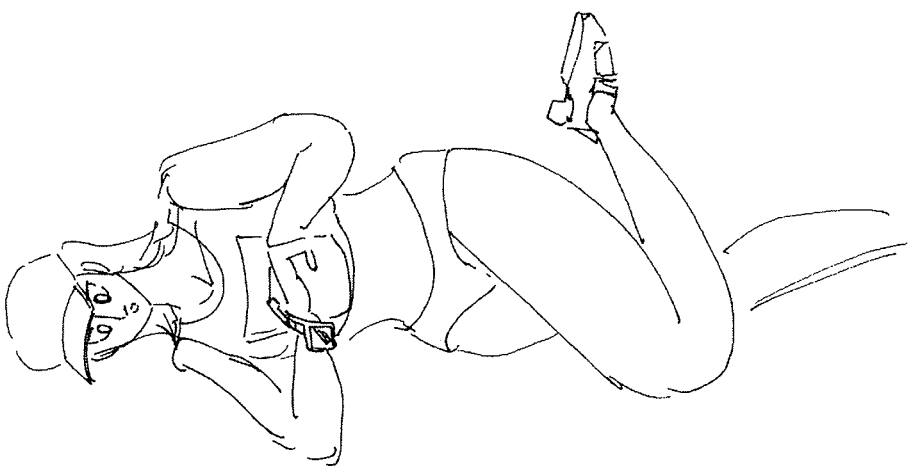

FIGS. 24A and 24B are diagrams illustrating types of use of the electronic device pertaining to embodiment 6. When used as a wristwatch wrapped around a user's wrist, the first region of the display 101 is positioned at a back of the wrist, and the second region is positioned so as to surround a side of the wrist.

As illustrated in FIG. 24A, when the electronic device pertaining to embodiment 6 is attached to a wrist of a user when training such as jogging is being performed, the user can turn the wrist and simply by touching a portion of the electronic device showing an image of a desired program, an instruction can be given to a sub-program corresponding to the second region. When three programs activated by the electronic device are weather forecast, health management, and music playback programs, the user can turn the wrist and instruct the electronic device to switch between the three programs simply by touching the screen, without disturbing the pace of training. In this way, training efficiency is increased.

Further, as illustrated in FIG. 24B, when a user goes out wearing the electronic device on a left hand holding a bag, a fingertip of a right hand holding something else can be used operate the electronic device by touching the display of the electronic device. Even in a state in which both hands are occupied, as long as one fingertip is free, operation with respect to the main program and sub-programs is possible, and therefore the electronic device is utilizable in a variety of outdoor situations.

Note that the electronic device may be configured such that luminance in each region in the display is changeable in order to control display of images. Specifically, when a user attaches the electronic device to a wrist, assuming a usage state in which the first region 201 is positioned at the back of the hand, the execution image of the main program displayed in the first region 201 that is most visible to the user is brightest, and icon images of sub-programs displayed in the second region 202 are displayed darker than the execution image of the main program displayed in the first region 201. Due to such display control, visibility of the execution image of the main program is not harmed, and power consumption of the electronic device is reduced. Further, display in the second region 202 may be controlled such that the farther a position is from the first region 201, the darker an image is displayed, such that luminance of the second region 202 has a gradation.

(Supplement)

Description has been provided based on the above embodiments 1-6, but the present invention is of course not limited to the above embodiments. The present invention also includes the following:

(a) The electronic device pertaining to the embodiments 1-6 may further include an orientation measurement unit that measures orientation. In this way, when a user carries the electronic device pertaining to the present invention, the user may install a program that informs the user of their orientation.

(b) The electronic device pertaining to embodiments 1-6 may further include a measurement unit that measures a heart rate of a person wearing the electronic device. In this way, when a user wears the electronic device pertaining to the present invention, the user may install a program that informs the user of their heart rate.

The shape and display state of the display 101 is not limited to that described in embodiments 1-6. For example, the shape of the display 101 may be as illustrated in FIG. 25A, FIG. 27A, FIG. 29A, or FIG. 31A.

In modification 1 of the shape of the display illustrated in FIG. 25A, the display surface of the display 101 is an elongated shape in which the second region 202a, the first region 201, and the second region 202b are lined up in the stated order in the longitudinal direction. The first region 201 and the second region 202a have sides that are aligned on the same line on the right side. The first region 201 and the second region 202b have sides that are aligned on the same line on the left side. Further, a width of the display surface in a direction perpendicular to the longitudinal direction is wider at the widest part of the first region 201 than at the widest part of either of the second region 202a and the second region 202b.

The electronic device illustrated in FIG. 25A has the casing 105 that is formed by elastic material and the display 101 that is a deformable organic EL display, as described in embodiment 6. A mounting surface of the display 101 illustrated in FIG. 25B is deformable such that a peripheral surface becomes a cylinder shape, allowing attachment of the electronic device to part of the body as a wristwatch.

Figure 26:
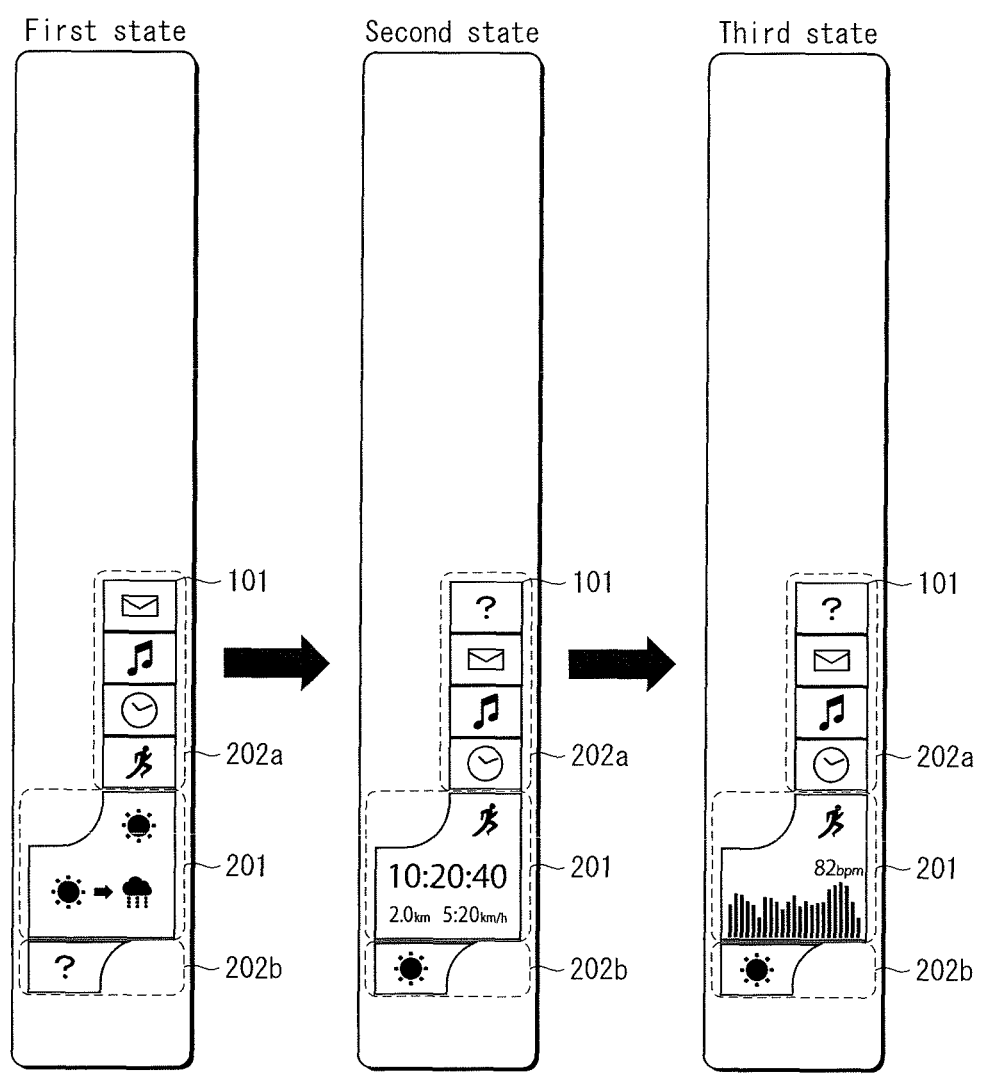
FIG. 26 is a diagram illustrating a change of display state of the display of the electronic device illustrated in FIG. 25A.

FIG. 26 is a diagram illustrating changes of display state of the display in modification 1 of the shape of the display. In a first state illustrated at the left end of FIG. 26, icon images corresponding to programs specified as sub-programs are displayed and divided between the second region 202a and the second region 202b, as in the display state of the display described using FIG. 3C. In the first region 201, an icon image and an execution image are displayed as images corresponding to a program specified as the main program. In the first state, when a flick operation in the longitudinal direction is detected on the screen surface of the display 101, the new main program is specified by a control that is the same as the processing order described with reference to FIG. 9 in embodiment 2, transitioning the display state to a second state illustrated in the center of FIG. 26. Further, in the second state, when a flick operation in a direction perpendicular to the longitudinal direction is detected in the first region on the screen surface of the display 101, execution images of the main program displayed in the first region are switched by a control that is the same as in the processing order described with reference to FIG. 17 in embodiment 3, transitioning the display state to a third state illustrated at the right end of FIG. 26.

Figure 27B:
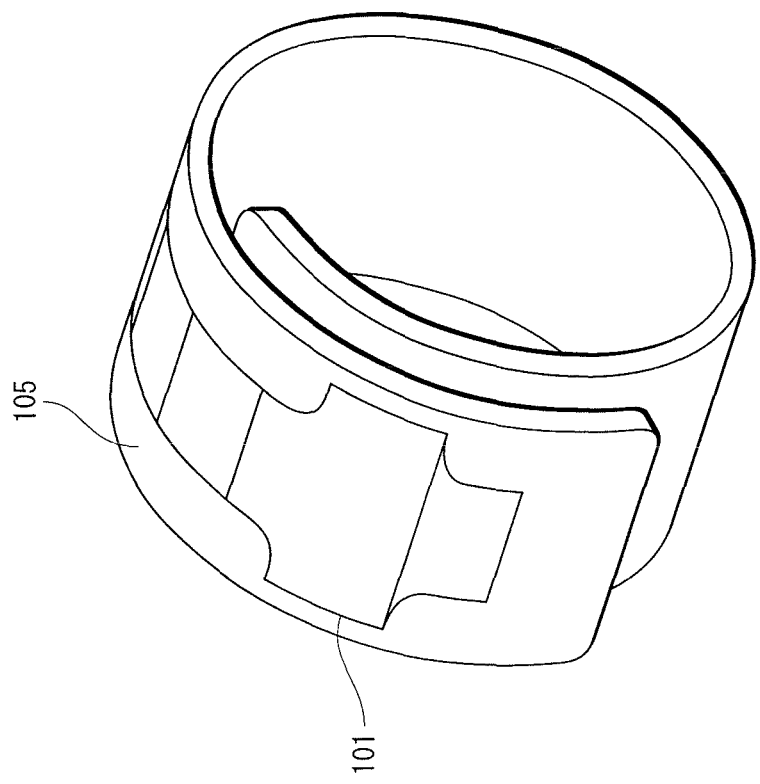
FIG. 27B is an external view of the electronic device illustrated in FIG. 27A, in a state of deformation into a cylindrical shape.
Figure 27A:
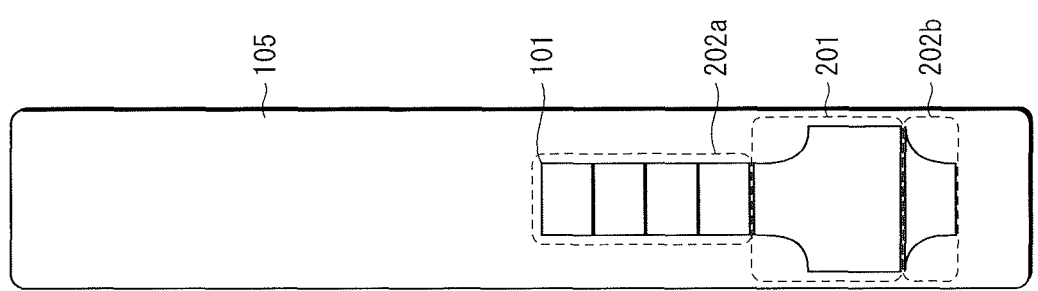
FIG. 27A is a plan view of the electronic device pertaining to modification 2 of a shape of a display.

Next is a description of modification 2 of a shape of the display. FIG. 27A is a plan view of an electronic device pertaining to modification 2 of a shape of the display. Modification 2 of the shape of the display, compared to the example illustrated in FIG. 25A, is different in that a center in the width direction of the first region 201, the second region 202a, and the second region 202a are all aligned along the same straight line, and that left and right sides of the first region 201 protrude outwards farther than extensions of the left and right sides of the second region 202a and the second region 202b. The example illustrated in FIG. 27A, as illustrated in FIG. 27B, is also possible to attach to part of the body as a wristwatch by deforming the mounting surface of the display 101 into a peripheral surface of a cylindrical shape.

Figure 28:
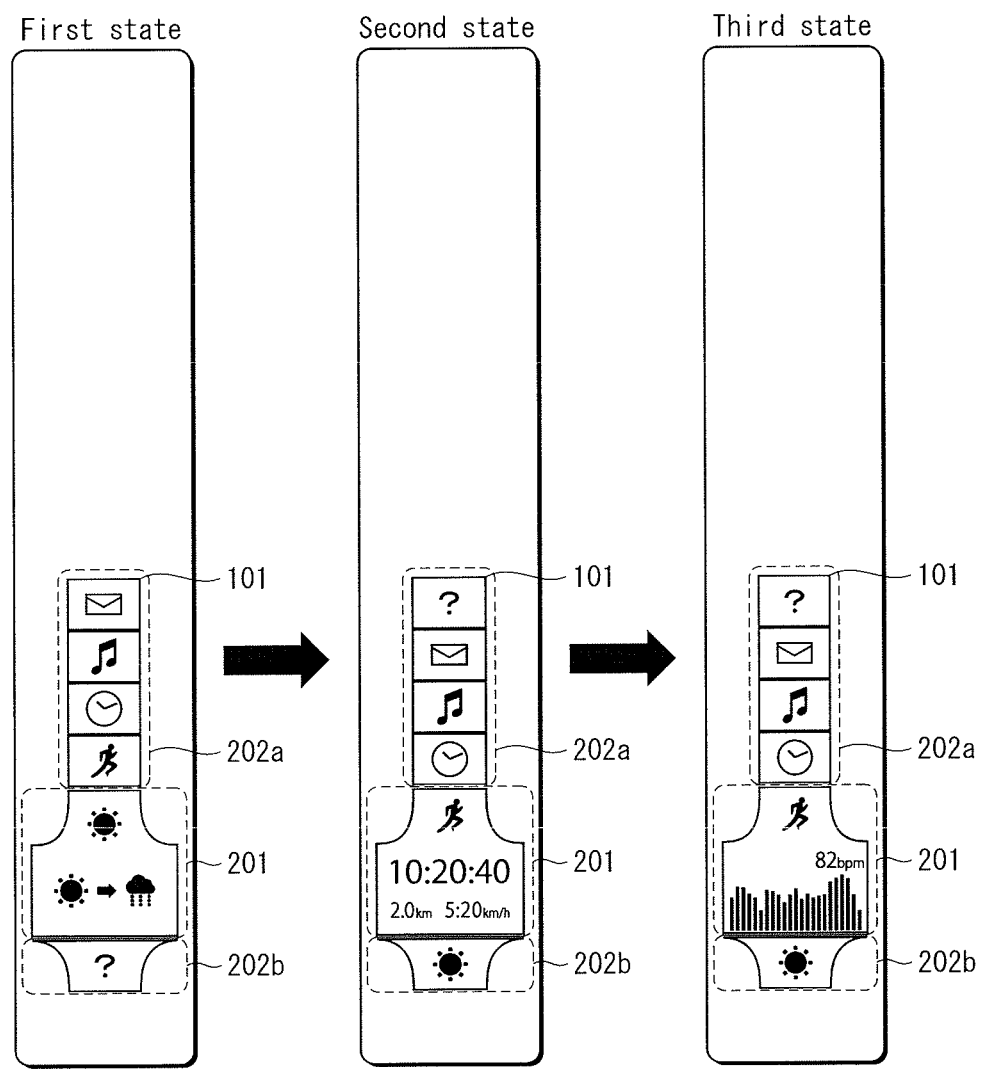
FIG. 28 is a diagram illustrating a change of display state of the display of the electronic device illustrated in FIG. 27A.

FIG. 28 is a diagram illustrating changes of display state of the display in modification 2 of the shape of the display. Changes of display state in modification 2 of the shape of the display are the same as the changes of display state in modification 1 of the shape of the display described with reference to FIG. 26.

Figure 29B:
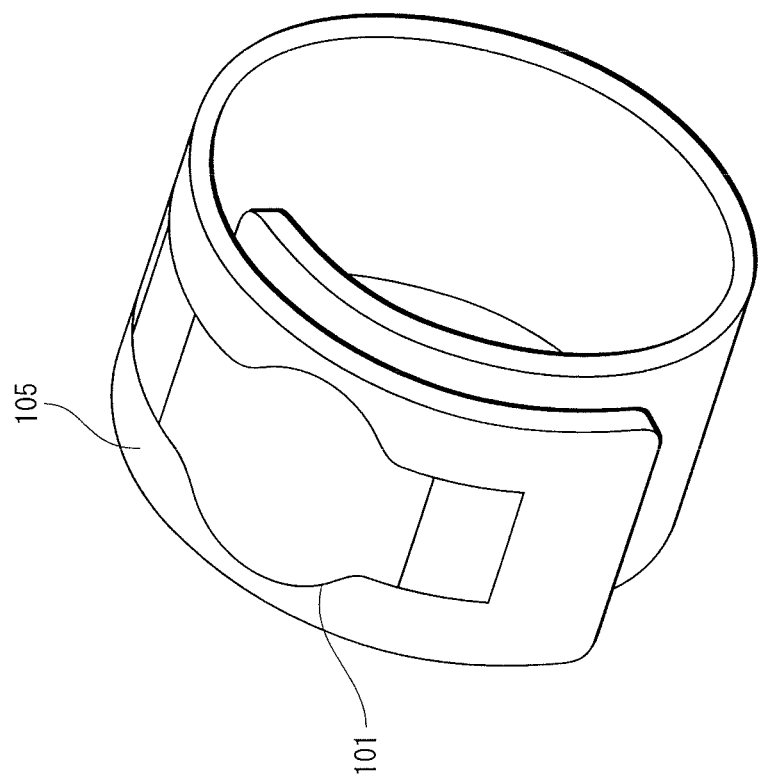
FIG. 29B is an external view of the electronic device illustrated in FIG. 29A, in a state of deformation into a cylindrical shape.
Figure 29A:
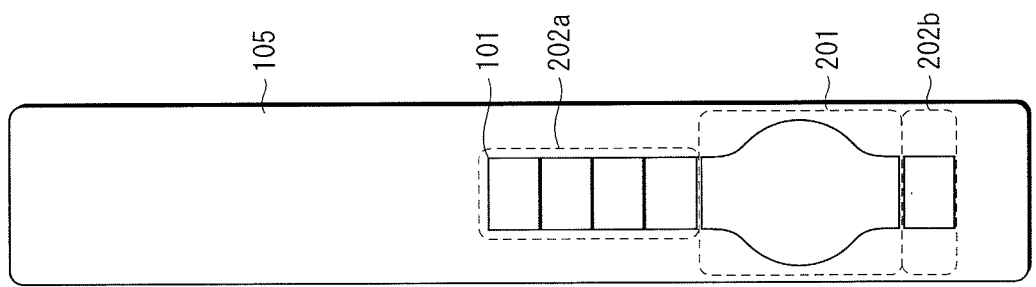
FIG. 29A is a plan view of the electronic device pertaining to modification 3 of a shape of a display.

Next is a description of modification 3 of a shape of the display. FIG. 29A is a plan view of an electronic device pertaining to modification 3 of a shape of the display. Modification 3 of the shape of the display is different from the example illustrated in FIG. 27A, in that both the left and right sides of the first region 201 are curved. The example illustrated in FIG. 29A, as illustrated in FIG. 29B, is also possible to attach to part of the body as a wristwatch by deforming the mounting surface of the display 101 into a peripheral surface of a cylindrical shape.

Figure 30:
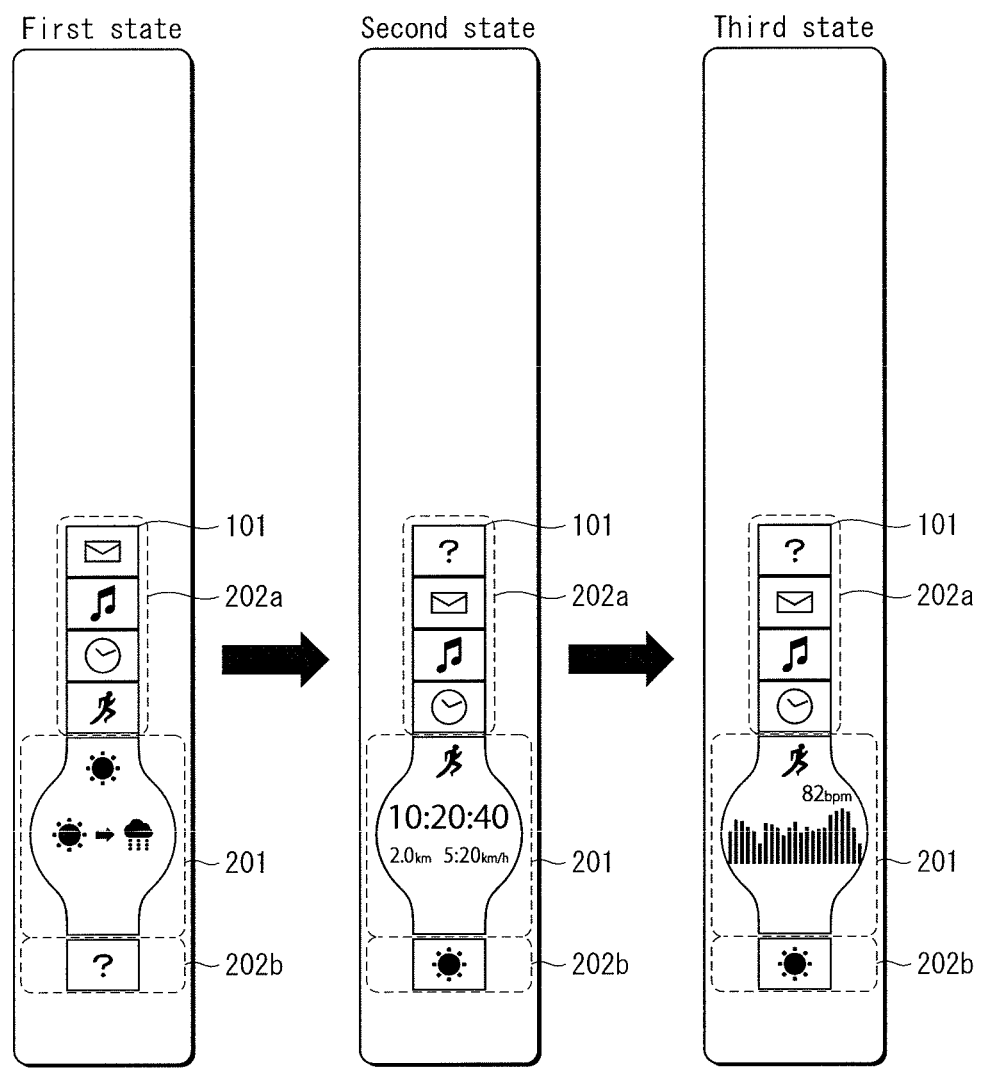
FIG. 30 is a diagram illustrating a change of display state of the display of the electronic device illustrated in FIG. 29A.

FIG. 30 is a diagram illustrating changes of display state of the display in modification 3 of the shape of the display. Changes of display state in modification 3 of the shape of the display are the same as the changes of display state in modification 1 of the shape of the display described with reference to FIG. 26.

Next is a description of modification 4 of a shape of the display. FIG. 31A is a plan view of an electronic device pertaining to modification 4 of a shape of the display. Modification 4 of the shape of the display, compared to the shape of the display illustrated in FIG. 3B, has the second region 202 further elongated in the longitudinal direction. The example illustrated in FIG. 31A, as illustrated in FIG. 31B, is also possible to attach to part of the body as a wristwatch by deforming the mounting surface of the display 101 into a peripheral surface of a cylindrical shape.

Figure 32:
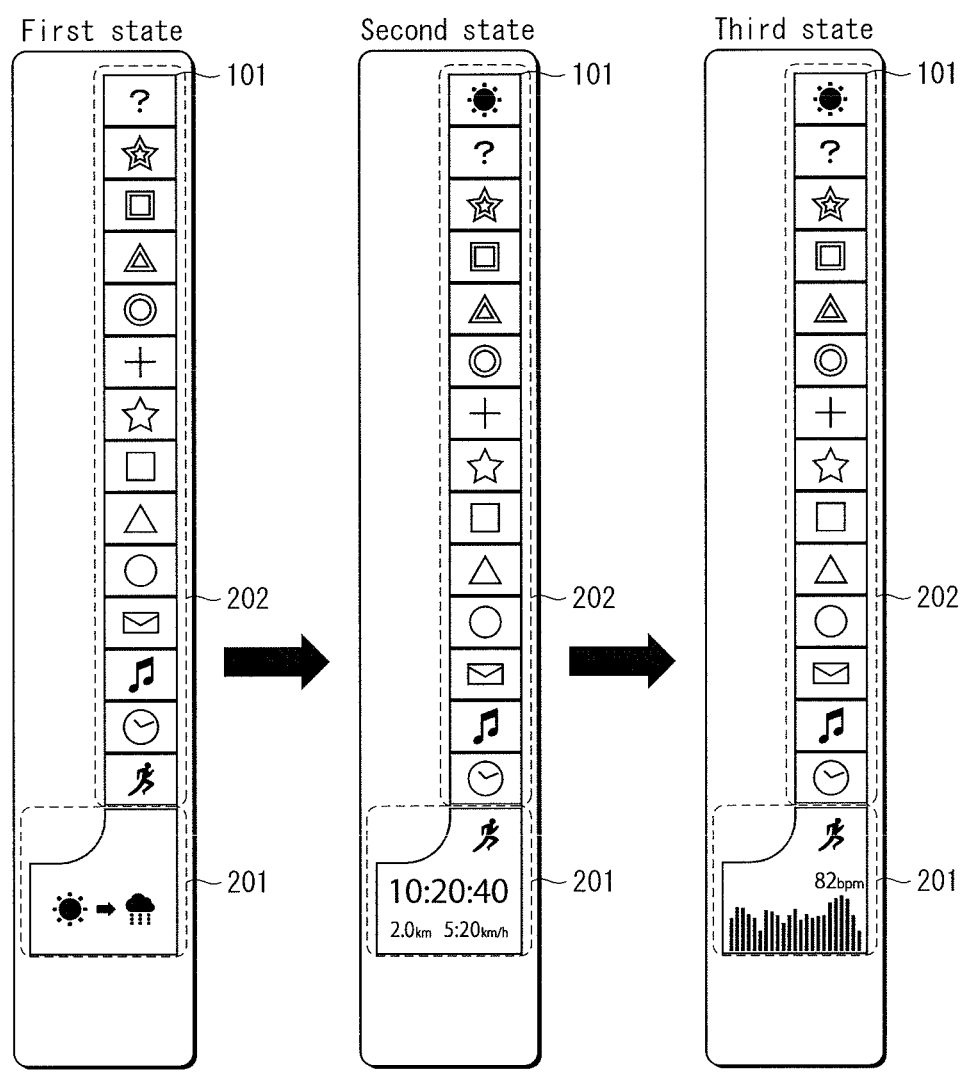
FIG. 32 is a diagram illustrating a change of display state of the display of the electronic device illustrated in FIG. 31A.

FIG. 32 is a diagram illustrating changes of display state of the display in modification 4 of the shape of the display. In the first state illustrated on the left end of FIG. 32, icon images corresponding to programs specified as sub-programs are displayed in the second region 202 the same as in the display state in the display described using FIG. 3B. In the first region 201, an icon image and an execution image are displayed as images corresponding to a program specified as the main program. The display state of the display in modification 4 is different from the example illustrated in FIG. 3B in that more icon images corresponding to programs can be displayed in the second region 202. In the first state, when a flick operation in the longitudinal direction is detected on the screen surface of the display 101, the new main program is specified by a control that is the same as the processing order described with reference to FIG. 9 in embodiment 2, transitioning the display state to a second state illustrated in the center of FIG. 32. Further, in the second state, when a flick operation in a direction perpendicular to the longitudinal direction is detected in the first region on the screen surface of the display 101, execution images of the main program displayed in the first region are switched by a control that is the same as in the processing order described with reference to FIG. 17 in embodiment 3, transitioning the display state to a third state illustrated at the right end of FIG. 32.

Figure 31B:
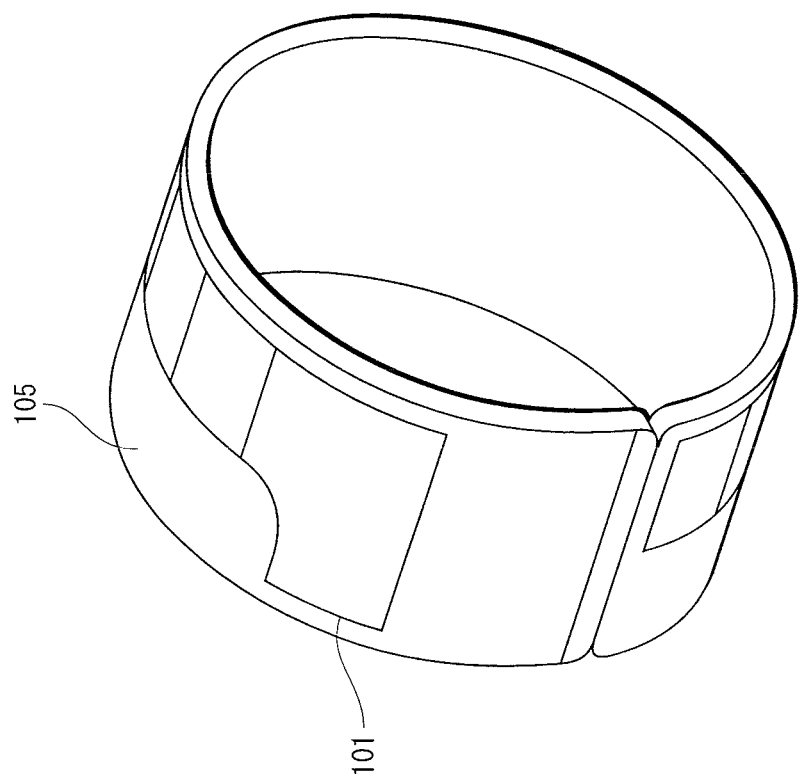
FIG. 31B is an external view of the electronic device illustrated in FIG. 31A, in a state of deformation into a cylindrical shape.
Figure 31A:
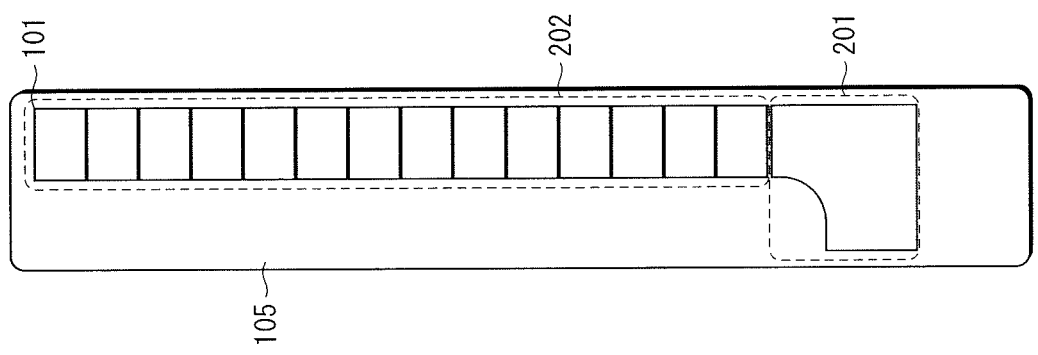
FIG. 31A is a plan view of the electronic device pertaining to modification 4 of a shape of a display.

In the electronic device pertaining to modification 4 of the shape of the display, because the display 101 covers substantially the entire outer peripheral surface illustrated in FIG. 31B achieved by deformation into a cylindrical shape, when a user uses the electronic device wrapped around a wrist, it is possible to obtain the feeling as if images are surrounding the wrist by scrolling images displayed on the display surface in the longitudinal direction.

(d) In the electronic device pertaining to embodiments 1-6, the number of images corresponding to programs that can be displayed on the display 101 may be set as a specific number of the electronic device, or may be changed as appropriate.

In the electronic device pertaining to embodiments 1-6, the number of programs stored in the memory 12 and the number of images corresponding to programs displayed on the display 101 do not necessarily have to match.

For example, when the number of programs stored in the memory 12 is greater than the sum of the number of images corresponding to sub-programs displayed in the second region and the number of images corresponding to the main program displayed in the first region, from the programs stored in the memory 12, a number of random programs may be selected equal to the number of images displayed in the first region and the second region, and displayed on the display 101. Further, the user may select programs to display on the display 101. Further, based on information of use history and use frequency of each program by a user, the processor 103 may select programs to be displayed as images on the display 101.

Further, when the number of programs stored in the memory 12 is greater than the number of corresponding images that can be displayed on the display 101, the following two methods are possible display controls when scrolling images displayed on the display 101 in the longitudinal direction (Y-Y' direction).

As a first method, from programs stored in the memory 12, only images corresponding to programs already displayed are repeatedly scrolled and displayed in succession on the display 101. This method, as described in embodiments 1 and 2, may be implemented by matching the number of storage regions of the VRAM 14 to which images corresponding to programs are written and the number of IDs of programs managed in the arrangement table.

As a second method, in accordance with scrolling, programs are sequentially replaced and corresponding images displayed. This method may be implemented by making the number of IDs of programs managed in the arrangement table greater than the number of storage regions of the VRAM 14 to which images corresponding to programs are written. For example, five storage regions 0-4 are provided to the VRAM 14 to which images corresponding to programs are written, as in embodiment 1, and ten items P0-P9 are provided to the arrangement table that manage the IDs of programs. Updating such an arrangement table as described in embodiment 2, by shifting the IDs registered thereto to the left in correspondence with movement of images due to scrolling from the second region towards the first region, starting from a state displaying images corresponding to programs having IDs registered at P0-P4, images corresponding to programs having IDs registered at P5-P9 can be displayed in sequential order from the top of the second region of the display 101 due to scrolling.

Figure 33:
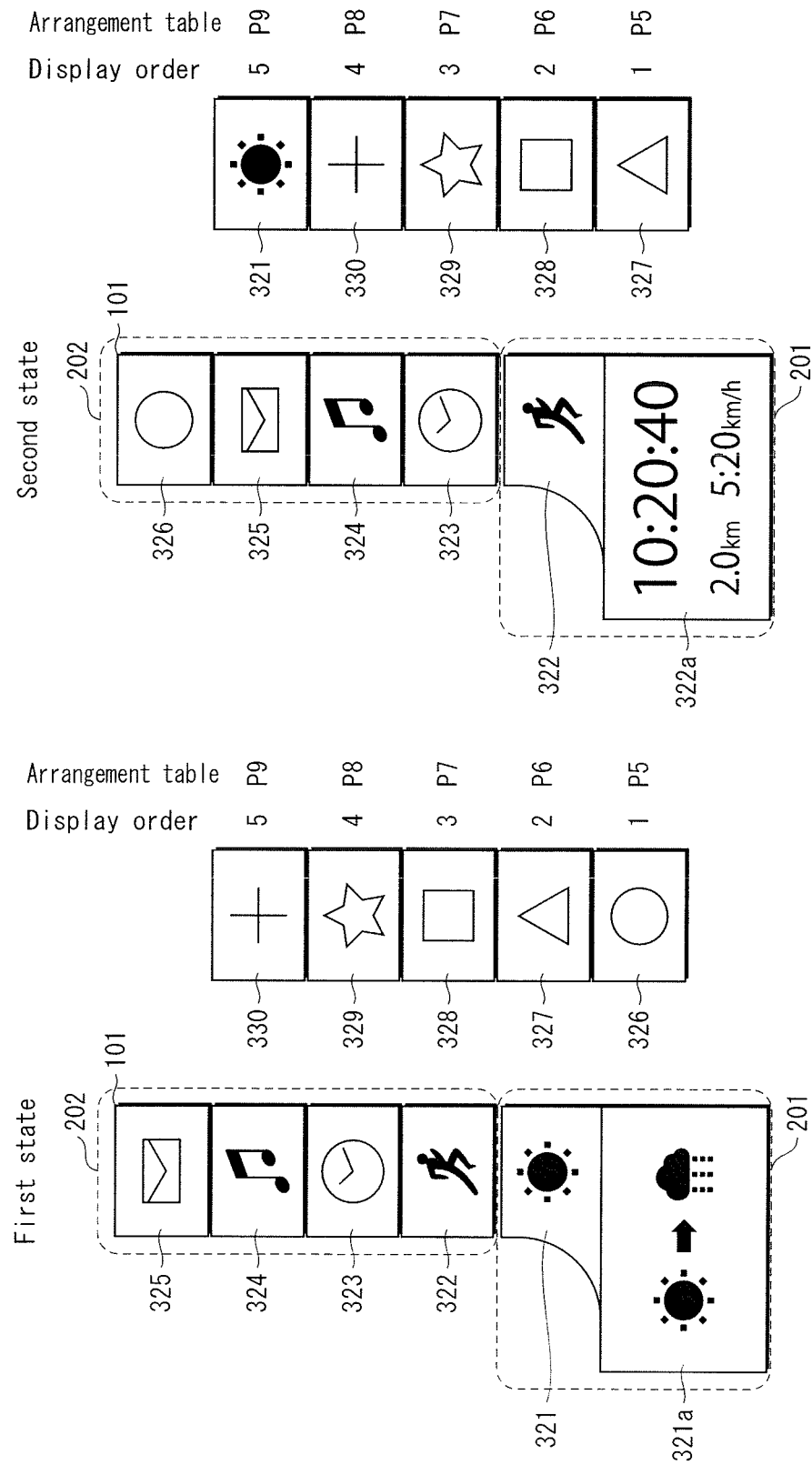
FIG. 33 illustrates a modification that manages a display order of programs that are not displayed on screen when the number of programs are greater than the number that may be displayed.

A display state in which scrolling of images is controlled according to the above-described second method in which the number of programs is greater than the number of programs that can be displayed is described below using FIG. 33. In the first state illustrated on the left side of FIG. 33, four icon images 322-325 corresponding to four programs specified as sub-programs are displayed in the second region 202. In the first region 201, an icon image 321 and an execution image 321*a* are displayed as images corresponding to a program specified as the main program. The icon images 326-330 illustrated to the side of the display 101 indicated programs having IDs registered to P5-P9 of the arrangement table. The programs corresponding to the icon images 326-330 are not displayed on the display in the first state and starting from the bottom of the drawing and moving upwards are associated with a display order 1-5 in the order P5-P9 of the arrangement table.

In the first state, when a flick operation is detected on the screen surface of the display 101 in the longitudinal direction from the second region towards the first region, scrolling of the display is caused equivalent to one icon image in the direction of the flick operation. Due to such scrolling the display transitions to the second state illustrated by the right side of FIG. 33.

In the second state, a program corresponding to the icon image 322 that in the first state was displayed in the second region 202 closest to the first region 201 is specified as the main program, and the icon image 322 and an execution image 322*a* are displayed in the first region 201 as an image corresponding to the main program.

In the second state, among the icon images displayed in the second region 202, three icon images 323-325 are icon images that were displayed in the second region 202 in the first state, that have moved one icon image length towards the first region 201 from their positions in the first state.

In the second state, the icon image 326 is displayed at a display position at the top end of the second region 202 that is opened up by the movement of the icon images 323-325. The icon image 326 corresponds to the program having a display order of 1 from among the programs not displayed on the display 101 in the first state.

The programs corresponding to the icon images 327-330 that had a display order of 2-5 in the first state move up the display order one-by-one, having a display order of 1-4 in the second state. Further, the program corresponding to the icon image 321 that was the main program in the first state disappears from the lower end side of the first region 201 due to the scrolling, is registered with an ID at P9 of the arrangement table associated with the last position, 5, in the display order, and is not displayed on the display in the second state.

By managing the display order as described above, and causing the display state to transition, programs may be sequentially replaced and corresponding images displayed on the display 101 in a state in which the number of programs is greater than the number which can be displayed on the display.

(f) In embodiments 2-5, execution of programs is controlled such that only the main program for which an image is displayed in the first region 201 is executed, and sub-programs for which icon images are displayed in the second region 202 are stopped. However, controls method of execution of programs is not limited to control methods described in the embodiments 1-6.

For example, in FIG. 20A, when a tap operation is detected in a region displaying the characters "Start" in the image 301*a*, the program corresponding to the image 301*a* in the first region 201 executes time measurement as a stopwatch function. While time is being measured, when the main program is switched in response to a flick operation, stopping the time measurement is not what a user would expect.

Thus, even when the main program is switched in response to a flick operation, a function being executed prior to the switching need not be stopped, and execution of the program may be controlled to continue execution as a sub-program. Specifically, in the flowchart of flick operation processing illustrated in FIG. 9, when a flick operation is detected in the determination of step S201 ("Yes" at step S201), the processing of step S202 that stops execution of the main program is omitted. By omitting the processing of step S202, a program that was the main program prior to switching due to a flick operation may continue to be executed after being switched to being a sub-program.

In the same way, by omitting the processing at each of step S302 in the flick operation 2 processing in FIG. 10, step S402 in the drag operation processing in FIG. 12, step S503 in the tap operation processing in FIG. 15, and step S702 in the acceleration detection processing in FIG. 22, a program that was the main program prior to detection of each operation may continue being executed after becoming a sub-program.

By such a method of controlling program execution, the main program is displayed as an execution image of the program in the first region 201, allowing a user to confirm an execution status thereof. However, a sub-program is only displayed as an icon image in the second region 202, and therefore a user cannot identify an execution status of such a program. Thus a user of the electronic device may forget that a sub-program is being executed. In such a case, for example, a battery of the electronic device may be wastefully depleted. Thus, it is preferable that a sub-program that is being executed display an icon image in the second region 202 that is in a different display format than a sub-program that is stopped.

As a display format of an icon image of a sub-program that is being executed, for example, a display format may be used in which an icon image is made to move within the display region of the icon image indicating a program that is being executed. Specifically, the icon image may be displayed scrolling repeatedly across the lateral direction of the display.

As a display format of an icon image of a sub-program that is being executed, a display format may be used in which the icon blinks on an off due to periodic changes in luminance of the display in a region displaying an icon image indicating a sub-program that is being executed.

Alternatively, as a display format of an icon image of a sub-program that is being executed, a display format may be used in which a size of the icon image is periodically increased and decreased.

Alternatively, as a display format of an icon image of a sub-program that is being executed, a display format may be used in which the icon image is replaced by an animated image. For example, the icon image 301*b* that is a stylized person displayed in the second region 202 in FIG. 20C, when being executed as a sub-program, may be replaced by an animated image showing the stylized person running.

Figure 34:
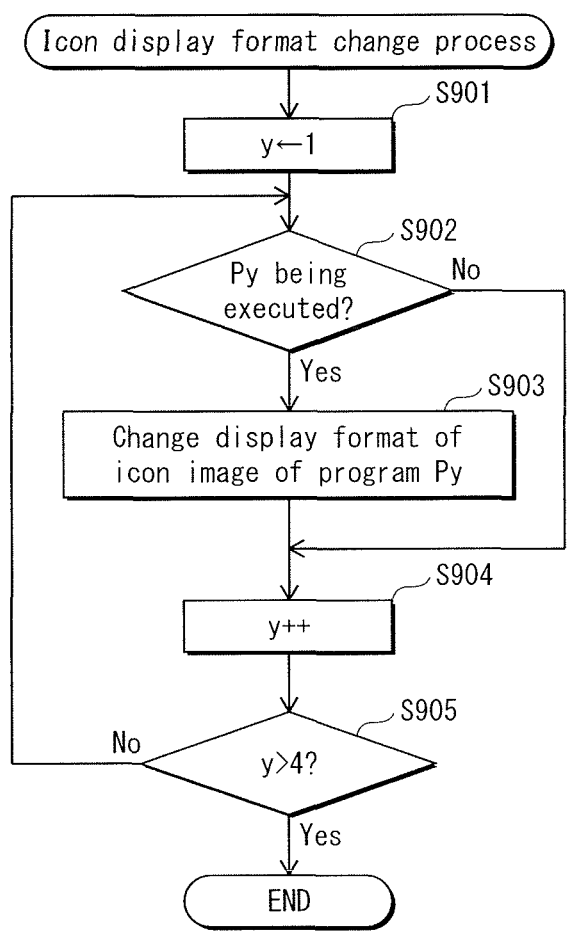
FIG. 34 is a flowchart illustrating icon display format change processing.
Figure 35A:
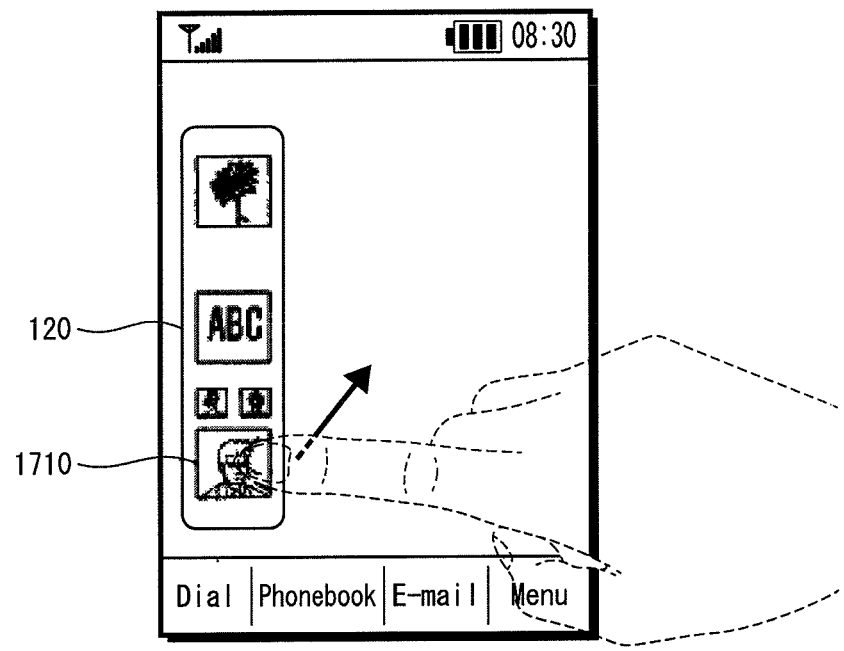
FIGS. 35A and 35B illustrate a display operation of a conventional electronic device.
Figure 35B:
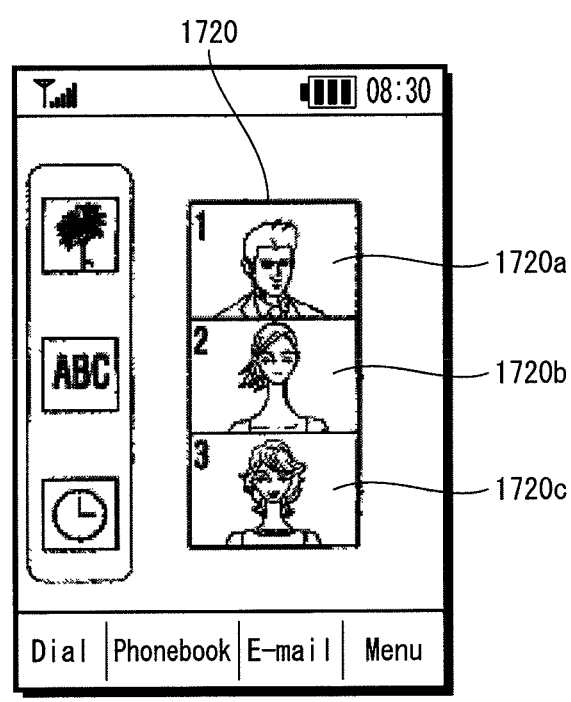

FIG. 34 is a flowchart illustrating icon display format change processing. The processor 104 that controls display of the display can change the display format of an icon image in the second region 202 in response to an execution state of a sub-program, by executing the processing order in FIG. 34. In the icon display format change processing, first, a variable y that indicates a storage region number of the VRAM 14 is initialized as 1 (step S901), and subsequently steps S902-S905 are executed as loop processing.

In the loop processing, whether or not a sub-program having an ID registered at Py in the arrangement table is currently being executed or not is determined (step S902). Only when the sub-program is being executed ("Yes" at step S902), the display format of the icon image at the storage region y of the VRAM 14 is changed to one of the above-mentioned display formats (step S903). Subsequently, the variable y is incremented, and the loop processing repeats until the variable y becomes 5. The above loop processing, when y is 1-4, changes only display formats of icon images of programs being executed from among sub-programs having IDs registered at P1-P4 of the arrangement table.

(g) "Program" in the present description is synonymous with "computer program", "application", "software", and similar.

(h) The processors 103, 104, and 107 in the present description each perform program execution controls, display controls, and touch position detection, but the processors 103, 104, and 107 are not limited to performing individual processing. One processor may be provided, on which all the processing may be performed, or two or more processors may be provided, on which the processing is appropriately allocated and performed.

(i) The memory 12 may use volatile memory or non-volatile memory, and may include two or more memories.

(j) In the display 101, an organic EL display, a liquid crystal display, or other known display may be used. A screen size of the display 101 may be any of a variety of sizes dependant on the use of the display 101.

(k) In embodiment 6, a wristwatch form of the electronic device is described, but the electronic device pertaining to the present invention may also be implemented in a microwave, refrigerator, etc., that has a display. In such a case, the casing 105 has a variety of sizes and forms according to usage.

(l) In the electronic device pertaining to embodiments 1-6, as images corresponding to programs specified as sub-programs icon images displayed in the second region 202 are described, but images displayed in the second region 202 are not limited to being the icon images. For example, as the images corresponding to programs specified as sub-programs, IDs of programs may be displayed in the second region 202.

(Summary of Each Aspect of the Present Disclosure)

As described above, the present disclosure includes, for example, each aspect of the invention described below.

An electronic device pertaining to an aspect of the present disclosure comprises: a display having a touch panel and an elongated shape, the display including a first display region and a second display region, the second display region being contiguous with the first display region in a longitudinal direction of the elongated shape and being narrower than the first display region in a lateral direction of the elongated shape; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, a display area of the first display image being larger than a display area of the first icon image, and when the processor detects a contact at the first icon image in the second display region and detects that the contact at the first icon image moves in a direction towards the first display region, the processor causes the display to display in the first display region a second display image generated by execution of the second program.

According to the present aspect, a display is used that has the elongated shape, including the first display region and the second display region that is contiguous with the first display region in the longitudinal direction of the elongated shape and narrower than the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be shown to a user of the electronic device.

Further, when movement of contact at the first icon image towards the first display region is detected, instead of simply causing display of the first icon image to move, the second display image generated by execution of the second program is displayed in the first display region, and therefore displaying operation buttons, etc., for executing the second program is not required. In other words, simply by causing contact at the first icon image to move towards the first display region, the second display image can be displayed in the first display region. As a result, a display surface of a display having a limited display region is effectively and fully utilized.

A second aspect of the present disclosure is the first aspect, in which, when the processor causes the display to display the second display image in the first display region, the processor may cause the display to display in the second display region a second icon image indicating the first program.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a third aspect of the present disclosure is the first aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a fourth aspect of the present disclosure is the first aspect, in which, when the processor detects that the contact at the first icon image moves in the direction towards the first display region, the processor may cause the first icon image to be moved towards the first display region, and when the first icon image is moved into the first display region, the processor may cause the display to display in the first display region, along with the first icon image, the first display image shrunk in the longitudinal direction of the elongated shape according to an extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, a fifth aspect of the present disclosure is the fourth aspect, in which, when the first icon image is moved into the first display region, the processor causes the display to display a second icon image indicating the first program in the second display region according to the extent that the first icon image is moved into the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, when the first icon image is moved into the first display region, the second icon image is displayed in the second display region according to the extent that the first icon image is moved into the first display region. Thus, even when a display region is limited, the second icon image is gradually displayed, and therefore the display surface is fully and effectively utilized while allowing, as much as possible, a user of the electronic device to confirm the existence of programs stored in the memory.

Further, a sixth aspect of the present disclosure is the fourth aspect, in which, when the first icon image is moved into the first display region, the processor may cause the display to display a second icon image that indicates the first program in the second display region while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, according to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a seventh aspect of the present disclosure is the fourth aspect, in which the display may display a predefined number of icon images in the second display region, each icon image indicating one of the plurality of programs, and, when the first icon image is moved into the first display region, the processor may cause the display to display a third icon image indicating a third program in the second display region according to the extent that the first icon image is moved into the first display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, when the first icon image is moved into the first display region, the third icon image is displayed in the second display region as a new icon image according to the extent that the first icon image is moved into the first display region. Thus, even when a display region is limited, the third icon image is gradually displayed, and therefore the display surface is fully and effectively utilized while allowing, as much as possible, a user of the electronic device to confirm the existence of programs stored in the memory.

Further, an eighth aspect of the present disclosure is the fourth aspect, in which the display may display a predefined number of icon images in the second display region, each icon image indicating one of the plurality of programs, and, when the first icon image is moved into the first display region, the processor may cause the display to display a third icon image indicating a third program to be displayed in the second display region, the third icon image being displayed subsequent to other displayed icon images within the predefined number of icon images, in accordance with a display order of the plurality of programs, while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, for example, when the number of icon images corresponding to programs is high, it may not be possible to display every icon image in the second display region. According to the present aspect, when the altered image of the first display image is displayed in the first display region, the third icon image indicating the third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a ninth aspect of the present disclosure is any one of the fourth through the eighth aspects, in which the first display image may include an image identical to the second icon image, and the image identical to the second icon image is not shrunk in the first display image.

According to the present aspect, the first display image is displayed in the first display region, along with the first icon image, in a state altered according to an extent that the first icon image is moved into the first display region. When this occurs, the image identical to the second icon image that is included in the altered image of the first display image is not shrunk, and therefore a user of the electronic device is kept informed of which program out of the plurality of programs the first display image corresponds to, up until the first display image disappears from the first display region. Thus, for example, when a user wishes to return the first display image to being the image displayed in the first display region, the user of the electronic device is already informed of which program among the plurality of programs corresponds to the first display image. Thus, when a desired program is the program corresponding to the first display image, the electronic device can determine to continue the return operation.

Further, a tenth aspect of the present disclosure is any one of the first through ninth aspects, wherein the first display image may include an image identical to the second icon image, and when the processor detects a contact at the first display image in the first display region and detects that the contact at the first display image moves in a lateral direction of the elongated shape, the processor may cause a portion of the first display image excluding the image identical to the second icon image to move in the lateral direction of the elongated shape without changing a display position corresponding to the image identical to the second icon image.

According to the present disclosure, even when the first display image is moved in the lateral direction of the elongated shape, the display position of the image identical to the second icon image included in the first display image is not moved. Thus, a user of the electronic device is informed as to whether a display image corresponding to a program among the plurality of programs is being displayed in the first display region, preventing misrecognition by the user.

Further, an eleventh aspect of the present disclosure is the first aspect, in which the display may display a plurality of icon images including the first icon image along the longitudinal direction of the elongated shape in the second display region, each icon image indicating one program from among the plurality of programs excluding the first program, and when the processor causes the display to display the second display image in the first display region, the processor may cause a plurality of icon images excluding the first icon image, each indicating one program from among a plurality of programs excluding the first program, to be moved towards the first display region and displayed in the second display region, filling a display region in which the first icon image was displayed.

According to the present aspect, the plurality of icon images, each indicating one program from among the plurality of programs, are displayed in the second display region. Thus, a display surface of a display having a limited display region is fully utilized, and a user of the electronic device is informed of functions of each of the plurality of programs stored in the memory.

Further, when the second display image is displayed in the first display region, a plurality of icon images, each indicating one program from among the plurality of programs are moved towards the first display region and displayed in the second display region. Thus, a display surface of a display having a limited display region is fully utilized, and, as much as possible, a plurality of icon images, each indicating one of the plurality of programs except for the program corresponding to the display image being displayed in the first display region, are displayed in the second display region. As a result, a user of the electronic device can be informed, as much as possible even when using a display having a limited display region, about the plurality of programs stored in the memory.

Further, a twelfth aspect of the present disclosure is the eleventh aspect, in which, when the second display image is displayed in the first display region, the second icon image indicating the first program may be displayed in an empty display region in the second display region, the empty display region being generated in the second display region when the plurality of icon images are moved towards the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, a thirteenth aspect of the present disclosure is any one of the first through the twelfth aspects, in which, when the processor detects that a contact at the second display image moves from the first display region to the second display region, the processor may cause the display to display in the first display region the first display image generated by execution of the first program.

If only movement of the contact from the second display region towards the first display region is detected, it may occur that when a user intends that the first display image be displayed in the first display region, scrolling goes too far and the second display image is displayed in the first display region. In order to once again have the first display image displayed in the first display region, the user would have to go through the complication of causing all of the display images generated by the execution of the plurality of programs to be displayed in the first display region. In other words, each of the display images generated by execution of the programs would have to be cycled through.

According to the present aspect, when the processor detects that a contact at the second display image in the first display region moves from the first display region to the second display region, the first display image generated by execution of the first program is displayed in the first display region. In this way, when a user intends that the first display image be displayed in the first display region, scrolling goes too far, and the second display image is displayed in the first display region, there is no need to cycle through each of the display images generated by execution of the programs. Thus, even when scrolling goes too far and a display image after a desired display image is displayed in the first display region, display of the desired display image can easily be restored.

A fourteenth aspect of the present disclosure is any one of the first through the thirteenth aspects, in which, when the second display image is displayed in the first display region, an icon image that is being displayed in the second display region and that indicates a corresponding program being executed may be displayed in a different display format than an icon image indicating a program that is not being executed.

Further, a fifteenth aspect of the present disclosure is the fourteenth aspect, in which the different display format may be that the icon image indicating the corresponding program that is being executed flashes.

Further, a sixteenth aspect of the present disclosure is the fourteenth aspect, in which the different display format may be that the icon image indicating the corresponding program that is being executed is moved within the second display region.

A user of the electronic device can confirm whether or not the second program corresponding to the second display image displayed in the first display region is currently being executed while in the first display region.

However, in the second display region icon images are displayed, and a user of the electronic device cannot identify from a displayed icon image whether or not a program corresponding to the displayed icon image is being executed or not. Thus a user of the electronic device may forget that a given program is being executed. In such a case, for example, a battery of the electronic device may be wastefully depleted.

According to any one of the fourteenth through sixteenth aspects, for example, when the second display image is being displayed in the first display region, an icon image that is being displayed in the second display region and that indicates a program being executed may be displayed in a different display format than an icon image indicating a program that is not being executed. Thus, even when an icon image is displayed in the second display region, a display having a limited display region does not require an additional supplementary display, and a user of the electronic device can identify whether or not a program corresponding to the displayed icon image is being executed. As a result, for example, a user of the electronic device forgetting that a program is being executed is prevented, and wasteful depletion of the battery of the electronic device is prevented.

Further, a seventeenth aspect of the present disclosure is any one of the first through the sixteenth aspects, in which the processor may cause the display to display in the first display region status information regarding the electronic device.

An electronic device pertaining to an eighteenth aspect of the present disclosure comprises: a display having a touch panel and an elongated shape, the display including a first display region and a second display region, the second display region being contiguous with the first display region in a longitudinal direction of the elongated shape and being narrower than the first display region in a lateral direction of the elongated shape; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, a display area of the first display image being larger than a display area of the first icon image, and when the processor detects a contact at the first icon image in the second display region and detects that the contact at the first icon image moves into the first display region, the processor causes the display to display in the first display region a second display image generated by execution of the second program.

According to the present aspect, a display is used that has the elongated shape, including the first display region and the second display region that is contiguous with the first display region in the longitudinal direction of the elongated shape and narrower than the first display region. Even when using a display that has a limited display region, the first display image generated by execution of the first program is displayed in the first display region, and the first icon image indicating the second program other than the first program is displayed in the second display region. Thus, even when using a display that has a limited display region, not only the first display image corresponding to the first program but also the first icon image corresponding to the second program is displayed, and therefore multiple programs stored in the memory can be shown to a user of the electronic device.

Further, when movement of contact at the first icon image into the first display region is detected, instead of simply causing display of the first icon image to move, the second display image generated by execution of the second program is displayed in the first display region, and therefore displaying operation buttons, etc., for executing the second program is not required. In other words, simply by causing contact at the first icon image to move into the first display region, the second display image can be displayed in the first display region. As a result, a display surface of a display having a limited display region is effectively and fully utilized.

Further, a nineteenth aspect of the present disclosure is the eighteenth aspect, in which, when the processor causes the display to display the second display image in the first display region, the processor may cause the display to display in the second display region a second icon image indicating the first program.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a twentieth aspect of the present disclosure is the eighteenth aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a twenty-first aspect of the present disclosure is the eighteenth aspect, in which, when the contact at the first icon image is moved into the first display region, the processor may cause the display to display in the first display region, along with the first icon image, the first display image shrunk in the longitudinal direction of the elongated shape according to the extent that the contact at the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, a twenty-second aspect of the present disclosure is the twenty-first aspect, in which, when the contact at the first icon image is moved into the first display region, the processor causes the display to display in the second display region a second icon image indicating the first program according to the extent that the contact at the first icon image is moved into the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, when the first icon image is moved into the first display region, the second icon image is displayed in the second display region according to the extent that the first icon image is moved into the first display region. Thus, even when a display region is limited, the second icon image is gradually displayed, and therefore the display surface is fully and effectively utilized while allowing, as much as possible, a user of the electronic device to confirm the existence of programs stored in the memory.

Further, a twenty-third aspect of the present disclosure is the twenty-first aspect, in which, when the contact at the first icon image is moved into the first display region, the processor may cause the display to display a second icon image in the second display region that indicates the first program while causing the display to display in the first display region, along with the first icon image, the first display image shrunk in the longitudinal direction of the elongated shape according to the extent that the contact at the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, according to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a twenty-fourth aspect of the present disclosure is the twenty-first aspect, in which the display may display a predefined number of icon images in the second display region, each icon image indicating one of the plurality of programs, and, when the first icon image is moved into the first display region, the processor may cause the display to display a third icon image indicating a third program in the second display region according to the extent that the first icon image is moved into the first display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, when the first icon image is moved into the first display region, the third icon image is displayed in the second display region as a new icon image according to the extent that the first icon image is moved into the first display region. Thus, even when a display region is limited, the third icon image is gradually displayed, and therefore the display surface is fully and effectively utilized while allowing, as much as possible, a user of the electronic device to confirm the existence of programs stored in the memory.

Further, a twenty-fifth aspect of the present disclosure is the twenty-first aspect, in which the display may display a predefined number of icon images in the second display region, each icon image indicating one of the plurality of programs, and, when the first icon image is moved into the first display region, the processor may cause the display to display a third icon image indicating a third program to be displayed in the second display region, the third icon image being displayed subsequent to other displayed icon images within the predefined number of icon images, in accordance with a display order of the plurality of programs, while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, for example, when the number of icon images corresponding to programs is high, it may not be possible to display every icon image in the second display region. According to the present aspect, when the altered image of the first display image is displayed in the first display region, the third icon image indicating the third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a twenty-sixth aspect of the present disclosure is any one of the twenty-first through the twenty-fifth aspects, in which the first display image may include an image identical to the second icon image, and the image identical to the second icon image is not shrunk in the first display image.

According to the present aspect, the first display image is displayed in the first display region, along with the first icon image, in a state altered according to an extent that the first icon image is moved into the first display region. When this occurs, the image identical to the second icon image that is included in the altered image of the first display image is not altered, and therefore a user of the electronic device is kept informed of which program out of the plurality of programs the first display image corresponds to, up until the first display image disappears from the first display region. Thus, for example, when a user wishes to return the first display image to being the image displayed in the first display region, the user of the electronic device is already informed of which program among the plurality of programs corresponds to the first display image. Thus, when a desired program is the program corresponding to the first display image, the electronic device can determine to continue the return operation.

Further, a twenty-seventh aspect of the present disclosure is any one of the eighteenth through the twenty-sixth aspects, in which the first display image may include an image identical to the second icon image, and the processor may detect a contact at the first display image in the first display region, and when the processor detects that the contact at the first display image moves in a lateral direction of the elongated shape, the processor may cause a portion of the first display image excluding the image identical to the second icon image to move in the lateral direction of the elongated shape without changing a display position corresponding to the image identical to the second icon image.

According to the present disclosure, even when the first display image is moved in the lateral direction of the elongated shape, the display position of the image identical to the second icon image included in the first display image is not moved. Thus, a user of the electronic device is informed as to whether a display image corresponding to a program among the plurality of programs is being displayed in the first display region, preventing misrecognition by the user.

Further, a twenty-eighth aspect of the present disclosure is the eighteenth aspect, in which the display may display in the second display region a plurality of icon images including the first icon image along the longitudinal direction of the elongated shape, each icon image indicating one program from among the plurality of programs excluding the first program, and when the processor causes the display to display the second display image in the first display region, the processor may cause a plurality of icon images excluding the first icon image, each indicating one program from among a plurality of programs excluding the first program, to be moved towards the first display region and displayed in the second display region, filling a display region in which the first icon image was displayed According to the present aspect, the plurality of icon images, each indicating one program from among the plurality of programs, are displayed in the second display region. Thus, a display surface of a display having a limited display region is fully utilized, and a user of the electronic device is informed of functions of each of the plurality of programs stored in the memory.

Further, when the second display image is displayed in the first display region, a plurality of icon images, each indicating one program from among the plurality of programs are moved towards the first display region and displayed in the second display region. Thus, a display surface of a display having a limited display region is fully utilized, and, as much as possible, a plurality of icon images, each indicating one of the plurality of programs except for the program corresponding to the display image being displayed in the first display region, are displayed in the second display region. As a result, a user of the electronic device can be informed, as much as possible even when using a display having a limited display region, about the plurality of programs stored in the memory.

Further, a twenty-ninth aspect of the present disclosure is the twenty-eighth aspect, in which, when the processor causes the display to display the second display image in the first display region, the processor may cause the display to display a second icon image indicating the first program in an empty display region in the second display region, the empty display region being generated in the second display region when the plurality of icon images are moved towards the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, a thirtieth aspect of the present disclosure is any one of the eighteenth through the twenty-ninth aspects, in which, when the processor detects that a contact at the second display image moves from the first display region to the second display region, the processor may cause the display to display in the first display region the first display image generated by execution of the first program.

If only movement of the contact from the second display region towards the first display region is detected, it may occur that when a user intends that the first display image be displayed in the first display region, scrolling goes too far and the second display image is displayed in the first display region. In order to once again have the first display image displayed in the first display region, the user would have to go through the complication of causing all of the display images generated by the execution of the plurality of programs to be displayed in the first display region In other words, each of the display images generated by execution of the programs would have to be cycled through.

According to the present aspect, when the processor detects that a contact at the second display image in the first display region moves from the first display region to the second display region, the first display image generated by execution of the first program is displayed in the first display region. In this way, when a user intends that the first display image be displayed in the first display region, scrolling goes too far, and the second display image is displayed in the first display region, there is no need to cycle through each of the display images generated by execution of the programs. Thus, even when scrolling goes too far and a display image after a desired display image is displayed in the first display region, display of the desired display image can easily be restored.

Further, a thirty-first aspect of the present disclosure is any one of the eighteenth through the thirtieth aspects, in which, when the second display image is displayed in the first display region, an icon image that is being displayed in the second display region and that indicates a corresponding program being executed may be displayed in a different display format than an icon image indicating a program that is not being executed.

Further, a thirty-second aspect of the present disclosure is the thirty-first aspect, in which the different display format may be that the icon image indicating the corresponding program that is being executed flashes.

Further, a thirty-third aspect of the present disclosure is the thirty-first aspect, in which the different display format may be that the icon image indicating the corresponding program that is being executed is moved within the second display region.

A user of the electronic device can confirm whether or not the second program corresponding to the second display image displayed in the first display region is currently being executed while in the first display region.

However, in the second display region icon images are displayed, and therefore a user of the electronic device cannot identify from a displayed icon image whether or not a program corresponding to the displayed icon image is being executed or not. Thus a user of the electronic device may forget that a given program is being executed. In such a case, for example, a battery of the electronic device may be wastefully depleted.

According to any one of the thirty-first through thirty-third aspects, for example, when the second display image is being displayed in the first display region, an icon image that is being displayed in the second display region and that indicates a program being executed may be displayed in a different display format than an icon image indicating a program that is not being executed. Thus, even when an icon image is displayed in the second display region, a display having a limited display region does not require an additional supplementary display, and a user of the electronic device can identify whether or not a program corresponding to the displayed icon image is being executed. As a result, for example, a user of the electronic device forgetting that a program is being executed is prevented, and wasteful depletion of the battery of the electronic device is prevented.

Further, a thirty-fourth aspect of the present disclosure is any one of the eighteenth through the thirty-third aspects, in which the processor may cause the display to display in the first display region status information regarding the electronic device.

An electronic device pertaining to a thirty-fifth aspect of the present disclosure comprises: a display having a touch panel and an elongated shape, the display including a first display region and a second display region, the second display region being contiguous with the first display region in a longitudinal direction of the elongated shape and being narrower than the first display region in a lateral direction of the elongated shape; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, a display area of the first display image being larger than a display area of the first icon image, and when the processor detects a contact at the first icon image in the second display region and detects the contact at the first icon image, the processor causes the display to switch display of the first display image to display of a second display image generated by execution of the second program in the first display region.

According to the present aspect, a display is used that has the elongated shape, including the first display region and the second display region that is contiguous with the first display region in the longitudinal direction of the elongated shape and narrower than the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be shown to a user of the electronic device.

Further, when contact at the first icon image is detected in the second display region, the second display image generated by execution of the second program is displayed in the first display region, and therefore displaying operation buttons, etc., for executing the second program is not required. As a result, a display surface of a display having a limited display region is effectively and fully utilized.

Further, a thirty-sixth aspect of the present disclosure is the thirty-fifth aspect, in which, when the processor causes the display to display the second display image in the first display region, the processor may cause the display to display in the second display region a second icon image indicating the first program where the first icon image had been displayed.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a thirty-seventh aspect of the present disclosure is the thirty-fifth aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region where the first icon image had been displayed, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Next, as aspects pertaining to the electronic device pertaining to the modification illustrated in FIG. 3E, the present disclosure includes, for example, each aspect of the invention described below.

An electronic device pertaining to an aspect of the present disclosure comprises: a display having a touch panel and an elongated shape, the display including a first display region and a second display region, the second display region being contiguous with the first display region in a longitudinal direction of the elongated shape and having a display width identical to a display width of the first display region; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, and when the processor detects a contact at the first icon image in the second display region and detects that the contact at the first icon image moves in a direction towards the first display region, the processor causes the display to display in the first display region a second display image generated by execution of the second program.

According to the present aspect, a display is used that has the elongated shape, including the first display region and the second display region that is contiguous with the first display region in the longitudinal direction of the elongated shape and has the display width identical to the display width of the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be shown to a user of the electronic device.

Further, when movement of contact at the first icon image towards the first display region is detected, instead of simply causing display of the first icon image to move, the second display image generated by execution of the second program is displayed in the first display region, and therefore displaying operation buttons, etc., for executing the second program is not required. In other words, simply by causing contact at the first icon image to move towards the first display region, the second display image can be displayed in the first display region. As a result, a display surface of a display having a limited display region is effectively and fully utilized.

Further, a thirty-ninth aspect of the present disclosure is the thirty-eighth aspect, in which, when the processor causes the display to display the second display image in the first display region, the processor may cause the display to display in the second display region a second icon image indicating the first program.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a fortieth aspect of the present disclosure is the thirty-eighth aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a forty-first aspect of the present disclosure is the thirty-eighth aspect, in which, when the processor detects that the contact at the first icon image moves in the direction towards the first display region, the processor may cause the first icon image to be moved towards the first display region, and when the first icon image is moved into the first display region, the processor may cause the display to display in the first display region, along with the first icon image, the first display image shrunk in the longitudinal direction of the elongated shape according to an extent that the first image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, a forty-second aspect of the present disclosure is the forty-first aspect, in which, when the first icon image is moved into the first display region, the processor causes the display to display a second icon image indicating the first program in the second display region according to the extent that the first icon image is moved into the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, when the first icon image is moved into the first display region, the second icon image is displayed in the second display region according to the extent that the first icon image is moved into the first display region. Thus, even when a display region is limited, the second icon image is gradually displayed, and therefore the display surface is fully and effectively utilized while allowing, as much as possible, a user of the electronic device to confirm the existence of programs stored in the memory.

Further, a forty-third aspect of the present disclosure is the forty-first aspect, in which, when the first icon image is moved into the first display region, the processor may cause the display to display a second icon image that indicates the first program in the second display region while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, according to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a forty-fourth aspect of the present disclosure is the forty-first aspect, in which the display may display a predefined number of icon images in the second display region, each icon image indicating one of the plurality of programs, and, when the first icon image is moved into the first display region, the processor may cause the display to display a third icon image indicating a third program in the second display region according to the extent that the first icon image is moved into the first display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, when the first icon image is moved into the first display region, the third icon image is displayed in the second display region as a new icon image according to the extent that the first icon image is moved into the first display region. Thus, even when a display region is limited, the third icon image is gradually displayed, and therefore the display surface is fully and effectively utilized while allowing, as much as possible, a user of the electronic device to confirm the existence of programs stored in the memory.

Further, a forty-fifth aspect of the present disclosure is the forty-first aspect, in which the display may display a predefined number of icon images in the second display region, each icon image indicating one of the plurality of programs, and, when the first icon image is moved into the first display region, the processor may cause the display to display a third icon image indicating a third program to be displayed in the second display region, the third icon image being displayed subsequent to other displayed icon images within the predefined number of icon images, in accordance with a display order of the plurality of programs, while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, for example, when the number of icon images corresponding to programs is high, it may not be possible to display every icon image in the second display region. According to the present aspect, when the altered image of the first display image is displayed in the first display region, the third icon image indicating the third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a forty-sixth aspect of the present disclosure is any one of the forty-first through the forty-fifth aspects, in which the first display image may include an image identical to the second icon image, and the image identical to the second icon image is not shrunk in the first display image.

According to the present aspect, the first display image is displayed in the first display region, along with the first icon image, in a state altered according to an extent that the first icon image is moved into the first display region. When this occurs, the image identical to the second icon image that is included in the altered image of the first display image is not shrunk, and therefore a user of the electronic device is kept informed of which program out of the plurality of programs the first image icon corresponds to, up until the first image icon disappears from the first display region. Thus, for example, when a user wishes to return the first display image to being the image displayed in the first display region, the user of the electronic device is already informed of which program among the plurality of programs corresponds to the first display image. Thus, when a desired program is the program corresponding to the first display image, the electronic device can determine to continue the return operation.

Further, a forty-seventh aspect of the present disclosure is any one of the thirty-eighth through the forty-sixth aspects, in which the first display image may include an image identical to the second icon image, and when the processor detects a contact at the first display image and detects that the contact at the first display image moves in a lateral direction of the elongated shape, the processor may cause a portion of the first display image excluding the image identical to the second icon image to move in the lateral direction of the elongated shape without changing a display position corresponding to the image identical to the second icon image.

According to the present disclosure, even when the first display image is moved in the lateral direction of the elongated shape, the display position of the image identical to the second icon image included in the first display image is not moved. Thus, a user of the electronic device is informed as to whether a display image corresponding to a program among the plurality of programs is being displayed in the first display region, preventing misrecognition by the user.

Further, a forty-eighth aspect of the present disclosure is the thirty-eighth aspect, in which the display may display in the second display region a plurality of icon images including the first icon image along the longitudinal direction of the elongated shape, each icon image indicating one program from among the plurality of programs excluding the first program, and when the processor causes the display to display the second display image in the first display region, the processor may cause a plurality of icon images excluding the first icon image, each indicating one program from among a plurality of programs excluding the first program, to be moved towards the first display region and displayed in the second display region, filling a display region in which the first icon image was displayed.

According to the present aspect, the plurality of icon images, each indicating one program from among the plurality of programs, are displayed in the second display region. Thus, a display surface of a display having a limited display region is fully utilized, and a user of the electronic device is informed of functions of each of the plurality of programs stored in the memory.

Further, when the second display image is displayed in the first display region, a plurality of icon images, each indicating one program from among the plurality of programs are moved towards the first display region and displayed in the second display region. Thus, a display surface of a display having a limited display region is fully utilized, and, as much as possible, a plurality of icon images, each indicating one of the plurality of programs except for the program corresponding to the display image being displayed in the first display region, are displayed in the second display region. As a result, a user of the electronic device can be informed, as much as possible even when using a display having a limited display region, about the plurality of programs stored in the memory.

Further, a forty-ninth aspect of the present disclosure is the forty-eighth aspect, in which, when the processor causes the display to display the second display image in the first display region, the processor may cause the display to display a second icon image indicating the first program in an empty display region in the second display region, the empty display region being generated in the second display region when the plurality of icon images are moved towards the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, a fiftieth aspect of the present disclosure is any one of the thirty-eighth through the forty-ninth aspects, in which, when the processor detects that a contact at the second display image moves from the first display region to the second display region, the processor causes the display to display in the first display region the first display image generated by execution of the first program.

If only movement of the contact from the second display region towards the first display region is detected, it may occur that when a user intends that the first display image be displayed in the first display region, scrolling goes too far and the second display image is displayed in the first display region. In order to once again have the first display image displayed in the first display region, the user would have to go through the complication of causing all of the display images generated by the execution of the plurality of programs to be displayed in the first display region. In other words, each of the display images generated by execution of the programs would have to be cycled through.

According to the present aspect, when the processor detects that a contact at the second display image in the first display region moves from the first display region to the second display region, the first display image generated by execution of the first program is displayed in the first display region. In this way, when a user intends that the first display image be displayed in the first display region, scrolling goes too far, and the second display image is displayed in the first display region, there is no need to cycle through each of the display images generated by execution of the programs. Thus, even when scrolling goes too far and a display image after a desired display image is displayed in the first display region, display of the desired display image can easily be restored.

Further, a fifty-first aspect of the present disclosure is any one of the thirty-eighth through the fiftieth aspects, in which, when the second display image is displayed in the first display region, an icon image that is being displayed in the second display region and that indicates a corresponding program being executed may be displayed in a different display format than an icon image indicating a program that is not being executed.

Further, a fifty-second aspect of the present disclosure is the fifty-first aspect, in which the different display format may be that the icon image indicating the corresponding program that is being executed flashes.

Further, a fifty-third aspect of the present disclosure is the fifty-first aspect, in which the different display format may be that the icon image indicating the corresponding program that is being executed is moved within the second display region.

A user of the electronic device can confirm whether or not the second program corresponding to the second display image displayed in the first display region is currently being executed while in the first display region.

However, in the second display region icon images are displayed, and therefore a user of the electronic device cannot identify from a displayed icon image whether or not a program corresponding to the displayed icon image is being executed or not. Thus a user of the electronic device may forget that a given program is being executed. In such a case, for example, a battery of the electronic device may be wastefully depleted.

According to any one of the fifty-first through fifty-third aspects, for example, when the second display image is being displayed in the first display region, an icon image that is being displayed in the second display region and that indicates a program being executed may be displayed in a different display format than an icon image indicating a program that is not being executed.

Thus, even when an icon image is displayed in the second display region, a display having a limited display region does not require an additional supplementary display, and a user of the electronic device can identify whether or not a program corresponding to the displayed icon image is being executed. As a result, for example, a user of the electronic device forgetting that a program is being executed is prevented, and wasteful depletion of the battery of the electronic device is prevented.

Further, a fifty-fourth aspect of the present disclosure is any one of the thirty-eighth through the fifty-third aspects, in which the processor may cause the display to display in the first display region status information regarding the electronic device.

Further, a fifty-fifth aspect of the present disclosure is any one of the thirty-eighth through the fifty-fourth aspects, in which a luminance of the first display region may be higher than a luminance of the second display region.

According to the present aspect, even if the display width of the first display region is the same as the display width of the second display region, because the luminance of the first display region is higher than the luminance of the second display region, a user can easily recognize which region is the first display region in the longitudinal direction of the display.

An electronic device pertaining to a fifty-sixth aspect of the present disclosure comprises: a display having a touch panel and an elongated shape, the display including a first display region and a second display region, the second display region being contiguous with the first display region in a longitudinal direction of the elongated shape and having a display width identical to a display width of the first display region; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, and when the processor detects a contact at the first icon image in the second display region and detects that the contact at the first icon image moves into the first display region, the processor causes the display to display in the first display region a second display image generated by execution of the second program.

According to the present aspect, a display is used that has the elongated shape, including the first display region and the second display region that is contiguous with the first display region in the longitudinal direction of the elongated shape and has the display width identical to the display width of the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be indicated to a user of the electronic device.

Further, when movement of contact at the first icon image into the first display region is detected, instead of simply causing display of the first icon image to move, the second display image generated by execution of the second program is displayed in the first display region, and therefore displaying operation buttons, etc., for executing the second program is not required. In other words, simply by causing contact at the first icon image to move into the first display region, the second display image can be displayed in the first display region. As a result, a display surface of a display having a limited display region is effectively and fully utilized.

Further, a fifty-seventh aspect of the present disclosure is the fifty-sixth aspect, in which, when the processor causes the display to display the second display image in the first display region, the processor may cause the display to display in the second display region a second icon image indicating the first program.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a fifty-eighth aspect of the present disclosure is the fifty-sixth aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a fifty-ninth aspect of the present disclosure is the fifty-sixth aspect, in which, when the contact at the first icon image is moved into the first display region, the processor may cause the display to display in the first display region, along with the first icon image, the first display image shrunk in the longitudinal direction of the elongated shape according to the extent that the contact at the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, a sixtieth aspect of the present disclosure is the fifty-ninth aspect, in which, when the contact at the first icon image is moved into the first display region, the processor causes the display to display a second icon image indicating the first program in the second display region according to the extent that the contact at the first icon image is moved into the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, when the first icon image is moved into the first display region, the second icon image is displayed in the second display region according to the extent that the first icon image is moved into the first display region. Thus, even when a display region is limited, the second icon image is gradually displayed, and therefore the display surface is fully and effectively utilized while allowing, as much as possible, a user of the electronic device to confirm the existence of programs stored in the memory.

Further, a sixty-first aspect of the present disclosure is the fifty-ninth aspect, in which, when the contact at the first icon image is moved into the first display region, the processor may cause the display to display in the second display region a second icon image that indicates the first program while causing the display to display in the first display region, along with the first icon image, the first display image shrunk in the longitudinal direction of the elongated shape according to the extent that the contact at the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, according to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a sixty-second aspect of the present disclosure is the fifty-ninth aspect, in which the display may display a predefined number of icon images in the second display region, each icon image indicating one of the plurality of programs, and, when the first icon image is moved into the first display region, the processor may cause the display to display a third icon image indicating a third program in the second display region according to the extent that the first icon image is moved into the first display region, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, when the first icon image is moved into the first display region, the third icon image is displayed in the second display region as a new icon image according to the extent that the first icon image is moved into the first display region. Thus, even when a display region is limited, the third icon image is gradually displayed, and therefore the display surface is fully and effectively utilized while allowing, as much as possible, a user of the electronic device to confirm the existence of programs stored in the memory.

Further, a sixty-third aspect of the present disclosure is the fifty-ninth aspect, in which the display may display a predefined number of icon images in the second display region, each icon image indicating one of the plurality of programs, and, when the first icon image is moved into the first display region, the processor may cause the display to display a third icon image indicating a third program to be displayed in the second display region, the third icon image being displayed subsequent to other displayed icon images within the predefined number of icon images, in accordance with a display order of the plurality of programs, while causing the display to display in the first display region, along with the first icon image, the first display image shrunk in the longitudinal direction of the elongated shape according to the extent that the first icon image is moved into the first display region.

According to the present aspect, the first display image is displayed in the first display region, along with the first icon image, in a state altered according to an extent that the first icon image is moved into the first display region. Thus, while confirming that display content of the first display image disappears, the first icon image indicating the second program that is next to be displayed can be displayed in the first display region. As a result, even while the second program is executed and the second display image is being displayed in the first display region, display content of the first display image is displayed for as long as possible, fully utilizing a display surface of a display having a limited display region.

Further, for example, when the number of icon images corresponding to programs is high, it may not be possible to display every icon image in the second display region. According to the present aspect, when the altered image of the first display image is displayed in the first display region, the third icon image indicating the third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

Further, a sixty-fourth aspect of the present disclosure is any one of the fifty-ninth through the sixty-third aspects, in which the first display image may include an image identical to the second icon image, and the image identical to the second icon image is not shrunk in the first display image.

According to the present aspect, the first display image is displayed in the first display region, along with the first icon image, in a state altered according to an extent that the first icon image is moved into the first display region. When this occurs, the image identical to the second icon image that is included in the first display image is not shrunk, and therefore a user of the electronic device is kept informed of which program out of the plurality of programs the first image icon corresponds to, up until the first image icon disappears from the first display region. Thus, for example, when a user wishes to return the first display image to being the image displayed in the first display region, the user of the electronic device is already informed of which program among the plurality of programs corresponds to the first display image. Thus, when a desired program is the program corresponding to the first display image, the electronic device can determine to continue the return operation.

Further, a sixty-fifth aspect of the present disclosure is any one of the fifty-sixth through sixty-fourth aspects, wherein the first display image may include an image identical to the second icon image, and when the processor detects a contact at the first display image in the first display region and detects that the contact at the first display image moves in a lateral direction of the elongated shape, the processor may cause a portion of the first display image excluding the image identical to the second icon image to move in the lateral direction of the elongated shape without changing a display position corresponding to the image identical to the second icon image.

According to the present disclosure, even when the first display image is moved in the lateral direction of the elongated shape, the display position of the image identical to the second icon image included in the first display image is not moved. Thus, a user of the electronic device is informed as to whether a display image corresponding to a program among the plurality of programs is being displayed in the first display region, preventing misrecognition by the user.

Further, a sixty-sixth aspect of the present disclosure is the fifty-sixth aspect, in which the display may display a plurality of icon images including the first icon image along the longitudinal direction of the elongated shape in the second display region, each icon image indicating one program from among the plurality of programs excluding the first program, and when the processor causes the display to display the second display image in the first display region, the processor may cause a plurality of icon images excluding the first icon image, each indicating one program from among a plurality of programs excluding the first program, to be moved towards the first display region and displayed in the second display region, filling a display region in which the first icon image was displayed.

According to the present aspect, the plurality of icon images, each indicating one program from among the plurality of programs, are displayed in the second display region. Thus, a display surface of a display having a limited display region is fully utilized, and a user of the electronic device is informed of functions of each of the plurality of programs stored in the memory.

Further, when the second display image is displayed in the first display region, a plurality of icon images, each indicating one program from among the plurality of programs are moved towards the first display region and displayed in the second display region. Thus, a display surface of a display having a limited display region is fully utilized, and, as much as possible, a plurality of icon images, each indicating one of the plurality of programs except for the program corresponding to the display image being displayed in the first display region, are displayed in the second display region. As a result, a user of the electronic device can be informed, as much as possible even when using a display having a limited display region, about the plurality of programs stored in the memory.

Further, a sixty-seventh aspect of the present disclosure is the sixty-sixth aspect, in which, when the processor causes the display to display the second display image in the first display region, the processor may cause the display to display a second icon image indicating the first program in an empty display region in the second display region, the empty display region being generated in the second display region when the plurality of icon images are moved towards the first display region.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can be indicated to a user of the electronic device.

Further, a sixty-eighth aspect of the present disclosure is any one of the fifty-sixth through the sixty-seventh aspects, in which, when the processor detects that a contact at the second display image in the first display region moves from the first display region to the second display region, the processor may cause the display to display in the first display region the first display image generated by execution of the first program.

If only movement of the contact from the second display region towards the first display region is detected, it may occur that when a user intends that the first display image be displayed in the first display region, scrolling goes too far and the second display image is displayed in the first display region. In order to once again have the first display image displayed in the first display region, the user would have to go through the complication of causing all of the display images generated by the execution of the plurality of programs to be displayed in the first display region. In other words, each of the display images generated by execution of the programs would have to be cycled through.

According to the present aspect, when the processor detects that a contact at the second display image in the first display region moves from the first display region to the second display region, the first display image generated by execution of the first program is displayed in the first display region. In this way, when a user intends that the first display image be displayed in the first display region, scrolling goes too far, and the second display image is displayed in the first display region, there is no need to cycle through each of the display images generated by execution of the programs. Thus, even when scrolling goes too far and a display image after a desired display image is displayed in the first display region, display of the desired display image can easily be restored.

Further, a sixty-ninth aspect of the present disclosure is any one of the fifty-sixth through the sixty-eighth aspects, in which, when the second display image is displayed in the first display region, an icon image that is being displayed in the second display region and that indicates a corresponding program being executed may be displayed in a different display format than an icon image indicating a program that is not being executed.

Further, a seventieth aspect of the present disclosure is the sixty-ninth aspect, in which the different display format may be that the icon image indicating the corresponding program that is being executed flashes.

Further, a seventy-first aspect of the present disclosure is the sixty-ninth aspect, in which the different display format may be that the icon image indicating the corresponding program that is being executed is moved within the second display region.

A user of the electronic device can confirm whether or not the second program corresponding to the second display image displayed in the first display region is currently being executed while in the first display region.

However, in the second display region icon images are displayed, and therefore a user of the electronic device cannot identify from a displayed icon image whether or not a program corresponding to the displayed icon image is being executed or not. Thus a user of the electronic device may forget that a given program is being executed. In such a case, for example, a battery of the electronic device may be wastefully depleted.

According to any one of the sixty-ninth through seventy-first aspects, for example, when the second display image is being displayed in the first display region, an icon image that is being displayed in the second display region and that indicates a program being executed may be displayed in a different display format than an icon image indicating a program that is not being executed.

Thus, even when an icon image is displayed in the second display region, a display having a limited display region does not require an additional supplementary display, and a user of the electronic device can identify whether or not a program corresponding to the displayed icon image is being executed. As a result, for example, a user of the electronic device forgetting that a program is being executed is prevented, and wasteful depletion of the battery of the electronic device is prevented.

Further, a seventy-second aspect of the present disclosure is any one of the fifty-sixth through the seventy-first aspects, in which the processor may cause the display to display in the first display region status information regarding the electronic device.

Further, a seventy-third aspect of the present disclosure is any one of the fifty-sixth through the seventy-second aspects, in which a luminance of the first display region may be higher than a luminance of the second display region.

According to the present aspect, even if the display width of the first display region is the same as the display width of the second display region, because the luminance of the first display region is higher than the luminance of the second display region, a user can easily recognize which region is the first display region in the longitudinal direction of the display.

An electronic device pertaining to an aspect of the present disclosure comprises: a display having a touch panel and an elongated shape, the display including a first display region and a second display region, the second display region being contiguous with the first display region in a longitudinal direction of the elongated shape and having a display width identical to a display width of the first display region; a memory storing a plurality of programs; and a processor that controls execution of each of the plurality of programs stored in the memory, and controls the display, wherein the display displays in the first display region a first display image generated by execution of a first program among the plurality of programs, and the display displays in the second display region a first icon image indicating a second program other than the first program among the plurality of programs, and when the processor detects a contact at the first icon image in the second display region, the processor causes the display to switch display in the first display region of the first display image for display of a second display image generated by execution of the second program.

According to the present aspect, a display is used that has the elongated shape, including the first display region and the second display region that is contiguous with the first display region in the longitudinal direction of the elongated shape and has the display width identical to the display width of the first display region. Even when using a display that has a limited display region, the first display image generated by execution of the first program is displayed in the first display region, and the first icon image indicating a second program other than the first program is displayed in the second display region. Thus, even when using a display that has a limited display region, not only the first display image corresponding to the first program but also the first icon image corresponding to the second program is displayed, and therefore multiple programs stored in the memory can be indicated to a user of the electronic device.

Further, when contact at the first icon image is detected in the second display region, the second display image generated by execution of the second program is displayed in the first display region, and therefore displaying operation buttons, etc., for executing the second program is not required. As a result, a display surface of a display having a limited display region is effectively and fully utilized.

Further, a seventy-fifth aspect of the present disclosure is the seventy-fourth aspect, in which, when the processor causes the display to display the second display image in the first display region, the processor may cause the display to display a second icon image indicating the first program in the second display region where the first icon image had been displayed.

According to the present aspect, when the second display image is displayed in the first display region, even when display of the first display image disappears from the first display region, the second icon image indicating the first program is displayed in the second display region instead of the first display image. Thus, even when a display having a limited display region is used, the fact that multiple programs, including the first program, are stored in the memory can continuously be indicated to a user of the electronic device.

Further, a seventy-sixth aspect of the present disclosure is the seventy-fourth aspect, in which the display may display a predefined number of icon images in the second display region, each icon image indicating one of the plurality of programs, and, when the processor causes the display to display the second display image in the first display region, the processor may cause the display to display a third icon image indicating a third program in the second display region where the first icon image had been displayed, the third icon image being displayed subsequent to other displayed icon images within the predefined number of icon images, in accordance with a display order of the plurality of programs.

For example, when the number of icon images corresponding to programs is high, it may not be possible to display every icon image in the second display region. According to the present aspect, when the second display image is displayed in the first display region, a third icon image indicating a third program is displayed in the second display region, the plurality of programs having a display order and the third program being next in the display order. In this way, by causing display of the third icon image as a new icon image in the second display region, programs stored in the memory other than programs whose icon images are being displayed in the second display region can also be indicated to a user of the electronic device even when using a display having a limited display region.

INDUSTRIAL APPLICABILITY

The electronic device pertaining to the present invention has excellent user interface functionality in displays, and is applicable to mobile terminals, wearable terminals, digital signage, etc.

REFERENCE SIGNS LIST 11 controller
12 memory
13 graphics controller
14 VRAM
15 sensor unit
16 GPS unit
17 Input device
18 communication unit
101 display
103, 104, 107 processor
105 casing
106 touch panel
108 acceleration sensor
201 first region
202 second region
203 image corresponding to program A
204 image corresponding to program B 205 image corresponding to program C
206 image corresponding to program D
207 image corresponding to program E

The invention claimed is:
1. An electronic device, comprising:
a display having a touch panel and an elongated shape, the display including a first display region and a second display region, the second display region being contiguous with the first display region in a longitudinal direction of the elongated shape and being narrower than the first display region in a lateral direction of the elongated shape;
a memory storing a plurality of programs; and
a processor that controls execution of each of the plurality of programs stored in the memory, and controls the display, wherein
the display displays in the first display region a first display image generated by execution of a first program among the plurality of programs, and the display displays in the second display region a first icon image indicating a second program other than the first program among the plurality of programs, a display area of the first display image being larger than a display area of the first icon image,
when the processor detects a contact at the first icon image in the second display region and detects that the contact at the first icon image moves in a direction towards the first display region, the processor causes the display to display in the first display region a second display image generated by execution of the second program,
the electronic device is a wearable terminal, having an external shape of which a portion is a wide rectangular shape, a narrow portion extending from one side of the wide rectangular shape,
the narrow portion includes a belt member for attachment to a user, and
the first display region corresponds to the wide rectangular portion and the second display region corresponds to the narrow portion.
2. The electronic device of claim 1,
wherein when the processor causes the display to display the second display image in the first display region, the processor causes the display to display in the second display region a second icon image indicating the first program.
3. The electronic device of claim 1,
wherein the display displays a predefined number of icon images in the second display region, each icon image indicating one of the plurality of programs, and
when the processor causes the display to display the second display image in the first display region, the processor causes the display to display a third icon image indicating a third program in the second display region, the third icon image being displayed subsequent to other displayed icon images within the predefined number of icon images, in accordance with a display order of the plurality of programs.
4. The electronic device of claim 1,
wherein when the processor detects that the contact at the first icon image moves in the direction towards the first display region, the processor causes the first icon image to be moved towards the first display region, and when the first icon image is moved into the first display region, the processor causes the display to display in the first display region, along with the first icon image, the first display image shrunk in the longitudinal direction of the elongated shape according to an extent that the first icon image is moved into the first display region.
5. The electronic device of claim 4,
wherein when the first icon image is moved into the first display region, the processor causes the display to display a second icon image indicating the first program in the second display region according to the extent that the first icon image is moved into the first display region.
6. The electronic device of claim 4,
wherein when the first icon image is moved into the first display region, the processor causes the display to display a second icon image that indicates the first program in the second display region while causing the display to display in the first display region, along with the first icon image, the first display image shrunk in the longitudinal direction of the elongated shape according to the extent that the first icon image is moved into the first display region.
7. The electronic device of claim 4,
wherein the display displays a predefined number of icon images in the second display region, each icon image indicating one of the plurality of programs, and
when the first icon image is moved into the first display region, the processor causes the display to display a third icon image indicating a third program in the second display region according to the extent that the first icon image is moved into the first display region, the third icon image being displayed subsequent to other displayed icon images within the predefined number of icon images, in accordance with a display order of the plurality of programs.
8. The electronic device of claim 4,
wherein he display displays a predefined number of icon images in the second display region, each icon image indicating one of the plurality of programs, and
when the first icon image is moved into the first display region, the processor causes the display to display a third icon image indicating a third program to be displayed in the second display region, the third icon image being displayed subsequent to other displayed icon images within the predefined number of icon images in accordance with a display order of the plurality of programs, while causing the display to display in the first display region, along with the first icon image, the first display image shrunk in the longitudinal direction of the elongated shape according to the extent that the first icon image is moved into the first display region.
9. The electronic device of claim 4,
wherein the first display image includes an image identical to the second icon image, and
the image identical to the second icon image is not shrunk in the first display image.
10. The electronic device of claim 1,
wherein the first display image includes an image identical to the second icon image, and
when the processor detects a contact at the first display image in the first display region and detects that the contact at the first display image moves in the lateral direction of the elongated shape, the processor causes a portion of the first display image excluding the image identical to the second icon image to move in the lateral direction of the elongated shape without changing a display position corresponding to the image identical to the second icon image.

11. The electronic device of claim 1,
wherein the display displays a plurality of icon images including the first icon image along the longitudinal direction of the elongated shape in the second display region, each icon image indicating one program from among the plurality of programs excluding the first program, and
when the processor causes the display to display the second display image in the first display region, the processor causes a plurality of icon images excluding the first icon image, each indicating one program from among a plurality of programs excluding the first program, to be moved towards the first display region and displayed in the second display region, filling a display region in which the first icon image was displayed.

12. The electronic device of claim 11,
wherein when the processor causes the display to display the second display image in the first display region, the processor causes the display to display a second icon image indicating the first program in an empty display region in the second display region, the empty display region being generated in the second display region when the plurality of icon images are moved towards the first display region.

13. The electronic device of claim 1,
wherein when the processor detects that a contact at the second display image moves from the first display region to the second display region, the processor causes the display to display in the first display region the first display image generated by execution of the first program.

14. The electronic device of claim 1,
wherein when the second display image is displayed in the first display region, an icon image that is being displayed in the second display region and that indicates a corresponding program being executed is displayed in a different display format than an icon image indicating a program that is not being executed.

15. The electronic device of claim 14,
wherein the different display format is that the icon image indicating the corresponding program that is being executed flashes.

16. The electronic device of claim 14,
wherein the different display format is that the icon image indicating the corresponding program that is being executed is moved within the second display region.

17. The electronic device of claim 1,
wherein the processor causes the display to display in the first display region status information regarding the electronic device.

18. An electronic device, comprising:
a display having a touch panel and an elongated shape, the display including a first display region and a second display region, the second display region being contiguous with the first display region in a longitudinal direction of the elongated shape and being narrower than the first display region in a lateral direction of the elongated shape;
a memory storing a plurality of programs; and
a processor that controls execution of each of the plurality of programs stored in the memory, and controls the display, wherein
the display displays in the first display region a first display image generated by execution of a first program among the plurality of programs, and the display displays in the second display region a first icon image indicating a second program other than the first program among the plurality of programs, a display area of the first display image being larger than a display area of the first icon image,
when the processor detects a contact at the first icon image in the second display region and detects that the contact at the first icon image moves into the first display region, the processor causes the display to display in the first display region a second display image generated by execution of the second program,
the electronic device is a wearable terminal, having an external shape of which a portion is a wide rectangular shape, a narrow portion extending from one side of the wide rectangular shape,
the narrow portion includes a belt member for attachment to a user, and
the first display region corresponds to the wide rectangular portion and the second display region corresponds to the narrow portion.

19. The electronic device of claim 18,
wherein when the processor causes the display to display the second display image in the first display region, the processor causes the display to display in the second display region a second icon image indicating the first program.

20. The electronic device of claim 18,
wherein the display displays a predefined number of icon images in the second display region, each icon image indicating one of the plurality of programs, and
when the processor causes the display to display the second display image in the first display region, the processor causes the display to display a third icon image indicating a third program in the second display region, and the third icon image being displayed subsequent to other displayed icon images within the predefined number of icon images, in accordance with a display order of the plurality of programs.

21. An electronic device, comprising:
a display having a touch panel and an elongated shape, the display including a first display region and a second display region, the second display region being contiguous with the first display region in a longitudinal direction of the elongated shape and being narrower than the first display region in a lateral direction of the elongated shape;
a memory storing a plurality of programs; and
a processor that controls execution of each of the plurality of programs stored in the memory, and controls the display, wherein
the display displays in the first display region a first display image generated by execution of a first program among the plurality of programs, and the display displays in the second display region a first icon image indicating a second program other than the first program among the plurality of programs, the first display image occupying a larger display area than the first icon image,
when the processor detects a contact at the first icon image in the second display region, the processor causes the display to switch display of the first display image to display of a second display image generated by execution of the second program in the first display region,
the electronic device is a wearable terminal, having an external shape of which a portion is a wide rectangular shape, a narrow portion extending from one side of the wide rectangular shape, the narrow portion includes a belt member for attachment to a user, and the first display region corresponds to the wide rectangular portion and the second display region corresponds to the narrow portion.

22. The electronic device of claim 21, wherein when the processor causes the display to display the second display image in the first display region, the processor causes the display to display a second icon image indicating the first program in the second display region where the first icon image had been displayed.

23. The electronic device of claim 21, wherein the display displays a predefined number of icon images in the second display region, each icon image indicating one of the plurality of programs, and when the processor causes the display to display the second display image in the first display region, the processor causes displayed icon images other than the first icon image to move towards an area in which the first icon image had been displayed, and causes the display to display a third icon image indicating a third program in the second display region in an open region of the second display region, the third icon image being displayed subsequent to other displayed icon images within the predefined number of icon images, in accordance with a display order of the plurality of programs.

\* \* \* \* \*